US007725779B2

(12) United States Patent
Lablans

(10) Patent No.: US 7,725,779 B2
(45) Date of Patent: May 25, 2010

(54) MULTI-VALUED SCRAMBLING AND DESCRAMBLING OF DIGITAL DATA ON OPTICAL DISKS AND OTHER STORAGE MEDIA

(75) Inventor: Peter Lablans, Morris Township, NJ (US)

(73) Assignee: Ternarylogic LLC, Morristown, NJ (US)

( * ) Notice: Subject to any disclaimer, the term of this patent is extended or adjusted under 35 U.S.C. 154(b) by 1247 days.

(21) Appl. No.: 11/042,645

(22) Filed: Jan. 25, 2005

(65) Prior Publication Data

US 2006/0164883 A1    Jul. 27, 2006

(51) Int. Cl.
*G06F 11/00* (2006.01)

(52) U.S. Cl. .......................... 714/701; 326/59; 714/778; 380/275

(58) Field of Classification Search ................. 714/701, 714/778; 326/59; 380/275
See application file for complete search history.

(56) References Cited

U.S. PATENT DOCUMENTS

| | | | | |
|---|---|---|---|---|
| 3,988,538 | A | * | 10/1976 | Patten ......................... 380/268 |
| 5,007,037 | A | | 4/1991 | Lindmayer |
| 5,136,573 | A | | 8/1992 | Kobayashi |
| 5,144,615 | A | | 9/1992 | Kobayashi |
| 5,195,082 | A | | 3/1993 | Revay et al. |
| 5,537,382 | A | | 7/1996 | McLaughlin et al. |
| 5,745,522 | A | | 4/1998 | Heegard |
| 5,748,117 | A | | 5/1998 | McLaughlin |
| 5,850,382 | A | * | 12/1998 | Koishi et al. ............. 369/275.3 |
| 6,148,428 | A | | 11/2000 | Welch et al. |
| 6,201,870 | B1 | | 3/2001 | Medard et al. |
| 6,275,458 | B1 | | 8/2001 | Wong et al. |
| 6,389,080 | B1 | | 5/2002 | Barnes |
| 6,430,246 | B1 | | 8/2002 | Ozluturk |
| 6,459,722 | B2 | | 10/2002 | Sriram et al. |
| 6,463,448 | B1 | | 10/2002 | Mo |
| 6,563,881 | B1 | * | 5/2003 | Sakoda et al. ............... 375/260 |
| 6,574,283 | B1 | | 6/2003 | Sakoda et al. |
| 6,590,860 | B1 | | 7/2003 | Sakoda et al. |
| 6,608,807 | B1 | | 8/2003 | Lee |
| 6,657,933 | B2 | | 12/2003 | Wong et al. |

(Continued)

OTHER PUBLICATIONS

Steven McLaughlin, et al., 'Advanced Coding and Signal Processing for Multilevel Write-Once and ReWritable Optical Storage.', ODS 2001, Santa Fe, NM, 3 pages.

(Continued)

*Primary Examiner*—M. Mujtaba K Chaudry
*Assistant Examiner*—Enam Ahmed
(74) *Attorney, Agent, or Firm*—Diehl Servilla LLC; Glen M. Diehl

(57) ABSTRACT

Method and apparatus for writing scrambled multi-value data to a physical media and for reading scrambled multi-value data from a physical media, are disclosed. The physical media can be an optical disk. The scrambling can be performed by a multi-valued LFSR scrambler and the descrambling can be performed by a multi-valued LFSR descrambler. Further, the multi-valued data that is scrambled can include synchronization data and/or user data. Error correction coding can be used during the writing process and processing to correct for errors can be used during the reading process. Also, methods and apparatus for synchronizing multi-valued data written to and read from physical media are disclosed. Multi-value correlation methods and apparatus are also disclosed.

23 Claims, 32 Drawing Sheets

U.S. PATENT DOCUMENTS

| | | | |
|---|---|---|---|
| 6,763,363 | B1 | 7/2004 | Driscoll |
| 6,816,408 | B2 | 11/2004 | Blodgett |
| 6,816,447 | B1 | 11/2004 | Lee et al. |
| 6,816,555 | B2 | 11/2004 | Sakoda |
| 6,907,062 | B2 | 6/2005 | Carlson |
| 6,909,704 | B2 | 6/2005 | Sakoda |
| 6,961,369 | B1 | 11/2005 | Tzannes |
| 6,983,413 | B2 * | 1/2006 | Otake et al. .................. 714/764 |
| 7,061,888 | B2 | 6/2006 | Sakoda |
| 7,099,469 | B2 * | 8/2006 | Kuhlman et al. ............... 380/28 |
| 7,133,458 | B2 | 11/2006 | Sakoda |
| 7,177,424 | B1 | 2/2007 | Furuya et al. |
| 7,236,433 | B2 | 6/2007 | Kando et al. |
| 7,346,165 | B2 * | 3/2008 | Seo et al. .................... 380/252 |
| 2002/0054682 | A1 | 5/2002 | Di Bernardo et al. |
| 2003/0063677 | A1 | 4/2003 | Mix et al. |
| 2003/0072445 | A1 * | 4/2003 | Kuhlman et al. ............... 380/42 |
| 2004/0156284 | A1 | 8/2004 | Wong et al. |

OTHER PUBLICATIONS

Data Interchange on Read-Only 120 MM Optical Data Disks (CD-ROM); Standard ECMA-130, 2nd Edition—Jun. 1996, 57 pages.

Hirofumi Haeiwa et al., 'Precise formation of fine pits on birefringent film for multi-level optical data storage.', Jpn. J. Appl. Phys, 2002, vol. 41 (1), n°7B, pp. 4841-4844.

Mathworks, "Communications Blockset Descrambler", http://www.mathworks.de/access/helpdeskr13/help/toolbox/commblks/ref/descrambler.html, website, 1994-2007.

Mathworks, "Communications Blockset Scrambler", http://www.mathworks.de/access/helpdeskr14/help/toolbox/commblks/ref/scrambler.html, (before 2003),1-2.

Mathworks, "Descrambler Blocks (Communications Blockset)", *Matlab 7.1.0 R14 Help Screen*, (2005).

* cited by examiner

Auto-correlation of binary sequence, generated by 6 elements LFSR.

sequence output sequence output sequence output sequence output sequence output

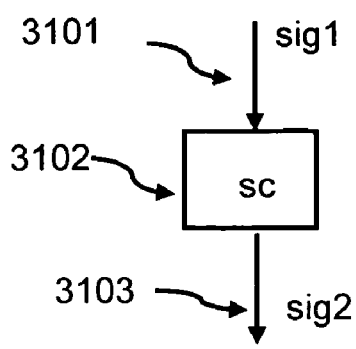
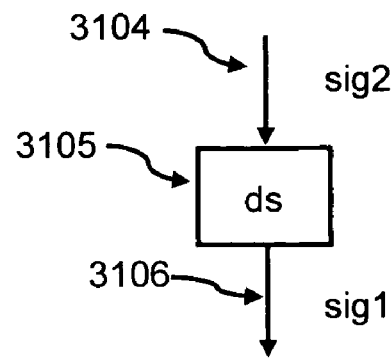
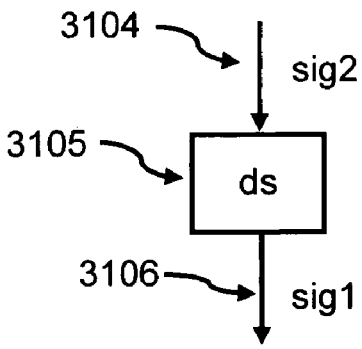
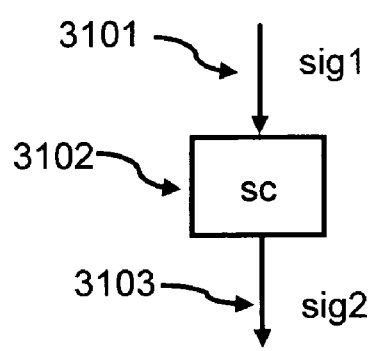
Figure 31
Figure 32
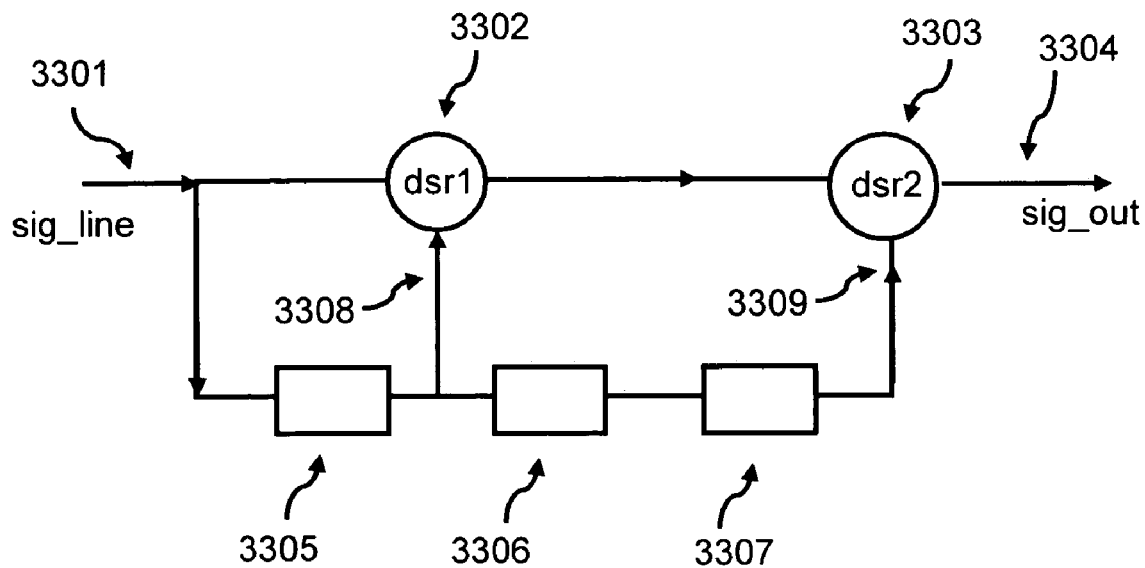
Figure 33

MULTI-VALUED SCRAMBLING AND DESCRAMBLING OF DIGITAL DATA ON OPTICAL DISKS AND OTHER STORAGE MEDIA

BACKGROUND OF THE INVENTION

This invention generally relates to the scrambling and descrambling of digital data on storage media such as optical disks. Several aspects of the invention relate to scrambling ternary and multi-valued data by way of Linear Feedback Shift Register (LFSR) and non-LFSR scramblers and the creation of scrambling sequences and descrambling of the scrambled data by way of multi-valued LFSR and non LFSR descramblers and descrambling sequences.

Non-volatile storage of digital data currently takes predominantly place in binary form in physical media, such as magnetic, optical and magneto-optical media. These media are often manufactured and used in rotating disks and tapes. The advantage of these media is the ability to store large amounts of data on very small surfaces, and to write data in a relatively short time frame and provide rapid reading access to the data.

Optical disks are especially popular, because of their data capacity, combined with their relatively inexpensive manufacturing cost, and the flexibility of transportability and distribution.

The physical principles of writing data to a disk are different for different media. For magnetic disks, the writing of binary data involves the changing of local magnetic properties of the material. In optical media it involves the changing of optical properties, such as reflection of light, of the material.

Writing and reading of data on and off the disk, respectively, may take place while the disk rotates at a relatively high speed. Several physical effects can influence the accuracy of the data storage and data retrieval.

The quality of data storage and retrieval can be expressed at the reading stage as Bit-error ratio or BER. The BER can be determined by storing a known binary sequence on a data storage disk and retrieving it. After retrieval, the retrieved data can be compared with the original sequence. The ratio of incorrectly recovered bits to the total number of bits in the sequence is an indication for the overall error performance of a disk and is called the bit-error-ratio. There are several phenomena that can influence the BER. The correct detection of the written symbols can be influenced by noise. The correct and optimal moment of symbol detection also may influence the bit-error-ratio. A clock signal may be needed to optimize correct detection moments. Inter-symbol-interference can also influence the error ratio.

Rotating storage media, such as optical disks, may contain operational data used for the correct operation of the medium as a storage device. These data can either be invariant or may be predictive in nature, so that the system can anticipate their presence. These data can be separate and different from user-data. It is important for the system to distinguish between 'maintenance/control' data and user-data, or be able to use the 'maintenance/control' aspects of user-data. The storage system should not change the information content of user-data. The system may change the user-data's statistical properties, without changing its information content, so it acquires useful system operational properties from the user data.

Data symbols representing user-data are written on and read from tracks on a disk. These tracks can be of concentric or of a spiral design. The system needs to know which track or which part of a track it is using and be able to align reading and writing mechanisms with these tracks. Tracks and/or segments or sectors of tracks can be identified by a code or a sequence of symbols. In many cases the tracking signal and the clock signal that control the symbol detection circuits are derived from the actual data-signal. In those cases it is important that long series of identical symbols and especially long series of 0 symbols are avoided. This can be achieved in the binary case by coding and scrambling mechanisms.

There are a number of known physical and electronic mechanisms to optimize the performance of writing to and reading from storage media such as optical disks.

A widely known method and mechanism to optimize the error performance of storage drives is by coding of data written to the disk. Usually an error correcting coding (ECC) mechanism is used that can correct, to a certain extent, errors that occur during reading of the symbols from the drive medium.

Certain repetitive patterns or long series of identical symbols are undesirable.

Furthermore there is a need for some measure of security that will protect the raw data from being read directly from the storage disk.

In view of the more limited possibilities of the prior art in applying binary technology in scrambling and descrambling and synchronization of multi-valued data, there is a need for a method to perform ternary and multi-valued data scrambling and descrambling.

SUMMARY OF THE INVENTION

The general purpose of the present invention, which will be described subsequently in greater detail, is to provide methods of creating multi-valued scrambling, descrambling and sequence generating methods and devices which can scramble and descramble multi-valued data going to and taken from optical and other data storage disks. The multi-valued sequences can also be used for synchronization purposes. There is a need for creating ternary and other multi-valued data sequences with good correlation properties which can be used to synchronize the data reading and writing process.

In accordance with one aspect of the present invention, method and apparatus for storing multi-valued data on an optical disk is provided. The multi-valued data having 3 or more possible states. The method includes scrambling the multi-valued data and then writing the scrambled multi-valued data on the physical media the optical disk. The multi-valued data can be encoded with error correction codes.

In accordance with another aspect of the present invention, the scrambling is performed by a multi-value LFSR scrambler. Non-LFSR scramblers can also be used. Further, the multi-value LFSR scrambler may or may not use a multiplier.

In accordance with a further aspect of the present invention, the multi-valued data that is scrambled can be synchronization data, user data or both.

In accordance with another aspect of the present invention, method and apparatus is provided for reading the scrambled data from the optical disk. The method includes reading the scrambled multi-valued data from the optical disk and descrambling the scrambled multi-valued data.

The method in accordance with another aspect of the present invention includes the step of processing the multi-valued data read from the optical disk to correct possible errors in the multi-valued data.

The present invention is also applicable to writing and reading scrambled data to and from physical media other than optical disks. Such physical media includes rotating physical media such as magnetic disks and other hard drives. Physical media also includes other memory elements, such as memory sticks.

Before explaining several embodiments of the present invention in detail, it is to be understood that the invention is not limited in its application to the details of construction and to the arrangements of the components set forth in the following description or illustrated in the drawings. The invention is capable of other embodiments and of being practiced and carried out in various ways. Sequences may be generated and processed in multi-level form by multi-valued logic circuits. Instead of being generated real-time by circuitry, sequences may also be generated first and stored in memory elements for later use. Multi-level sequences may be processed as multi-valued symbols in multi-valued logic circuitry. Multi-level symbols may also be translated into, and processed as binary multi-bit words by binary circuitry. Processing of multilevel symbols may also take place by way of computer programs, dedicated or general microprocessors, assisted by Analog/Digital and Digital/Analog converters. Processing may take place by way of electronic, optical, mechanical or other switching means. Also, it is to be understood that the phraseology and terminology employed herein are for the purpose of the description and should not be regarded as limiting.

Multi-value and n-value in the context of this application mean a number n, with n being a positive integer greater than two.

A primary object of the present invention is to provide new methods and apparatus for scrambling and descrambling multi-valued data to be written to and read from multi-valued rotating storage devices such as magnetic and optical disks.

An object of the present invention is to provide methods and apparatus for synchronization of multi-valued data transfers by using ternary data sequences, wherein symbols in the ternary sequence have one of 3 states.

Another object of the present invention is to provide n-valued sequences for synchronization of multi-valued data transfer from a digital data storage disk by comparing n-valued data sequences, wherein symbols in the n-valued sequence have one of n states.

Another object of the present invention is to provide methods and apparatus for synchronization of multi-valued data transfer from a digital data storage disk by comparing n-valued data sequences stored on the storage medium, with a separately locally generated n-valued sequence.

Another object of the present invention is to provide methods and apparatus for synchronization of multi-valued data transfer from a digital storage disk by determining a digital sum derived from a data sequence stored on the storage medium.

Another object of the present invention is to provide methods and apparatus for synchronization of multi-valued data transfer from a digital storage disk by a method or data provided from an external source not being the storage disk.

Another object of the present invention is to provide methods and apparatus for determining the correlation value between two multi-valued sequences, wherein only values are accumulated to a sum when symbols are identical.

Another object of the present invention is to provide methods and apparatus for determining the correlation value between two multi-valued sequences, wherein only values are accumulated to a sum when symbols are identical, by applying multi-valued logic circuits.

Another object of the present invention is to provide methods and apparatus for determining the correlation value between two multi-valued sequences, wherein values are accumulated to a sum when symbols are identical, and values are subtracted when symbols are not identical.

Another object of the present invention is to provide methods and apparatus for determining the correlation value between two multi-valued sequences, wherein values are accumulated to a sum when symbols are identical, and values are subtracted when symbols are not identical, by applying multi-valued logic circuits.

Another object of the present invention is to provide methods and apparatus for determining the correlation value between two multi-valued sequences, wherein values are accumulated to a sum when symbols are identical, and values are subtracted when symbols are not identical, wherein the values that are added or subtracted are relative to the value of at least one of the compared symbols.

Another object of the present invention is to provide methods and apparatus for determining the correlation value between two multi-valued sequences, wherein values are accumulated to a sum when symbols are identical, and values are subtracted when symbols are not identical, wherein the values that are added or subtracted are relative to the value of at least one of the compared symbols, by applying multi-valued logic circuits.

BRIEF DESCRIPTION OF THE DRAWINGS

Various other objects, features and attendant advantages of the present invention will become fully appreciated as the same becomes better understood when considered in conjunction with the accompanying drawings, and wherein:

FIG. 31 is a block diagram of a scrambler/descrambler pair.

FIG. 32 is a block diagram of a scrambler/descrambler pair.

FIG. 33 is a diagram of an n-valued shift-register based circuit with no feedback.

DETAILED DESCRIPTION OF THE INVENTION

Tracking and Synchronization Patterns on Multi-Level Storage Disks

Different multilevel symbol storage technologies have already been described for optical disks. Technologies such as "trapped electron" technology (See, U.S. Pat. No. 5,007,037 titled: 'Optical disk drive system utilizing electron trapping media for data storage' by Lindmayer, which is hereby incorporated by reference in its entirety) and "phase change" technology (See U.S. Pat. No. 5,136,573, titled 'Information recording apparatus and method', by Kobyashi, which is hereby incorporated by reference in its entirety) disclose technologies for writing and reading multilevel data symbols to and from optical disks. It is understood that an aspect of this invention is concerned with multilevel or multi-value data symbols. These terms mean that each symbol can have one of n states, wherein n is an integer greater than 2. Multi-valued symbols can also be represented by a plurality of binary symbols. In that case the invention may require additional means to synchronize the plurality as a single symbol.

Several aspects of coding, decoding and processing of multilevel data symbols as they relate to for instance multi-level optical disk storage have been described by others:

1. U.S. Pat. No. 6,148,428 titled: 'Method and Apparatus for Modulation Encoding Data for Storage on Multi-level, Optical Recording Medium' by Welch et al, which is hereby incorporated by reference in its entirety.

2. United States Patent Application No. 20040085878, titled, 'Multi-level data processing method and apparatus' by Sakagami et al, which is hereby incorporated by reference in its entirety.

3. U.S. Pat. No. 5,657,014 titled 'M=7(3,7) Run Length Limited Code for Multilevel Data' by McLaughlin, which is hereby incorporated by reference in its entirety.

4. United States Patent Application 20040156284, "Method and apparatus for reading and writing a multilevel signal from an optical disc oscillators" by Wong et. al., which is hereby incorporated by reference in its entirety.

Figure 1A:
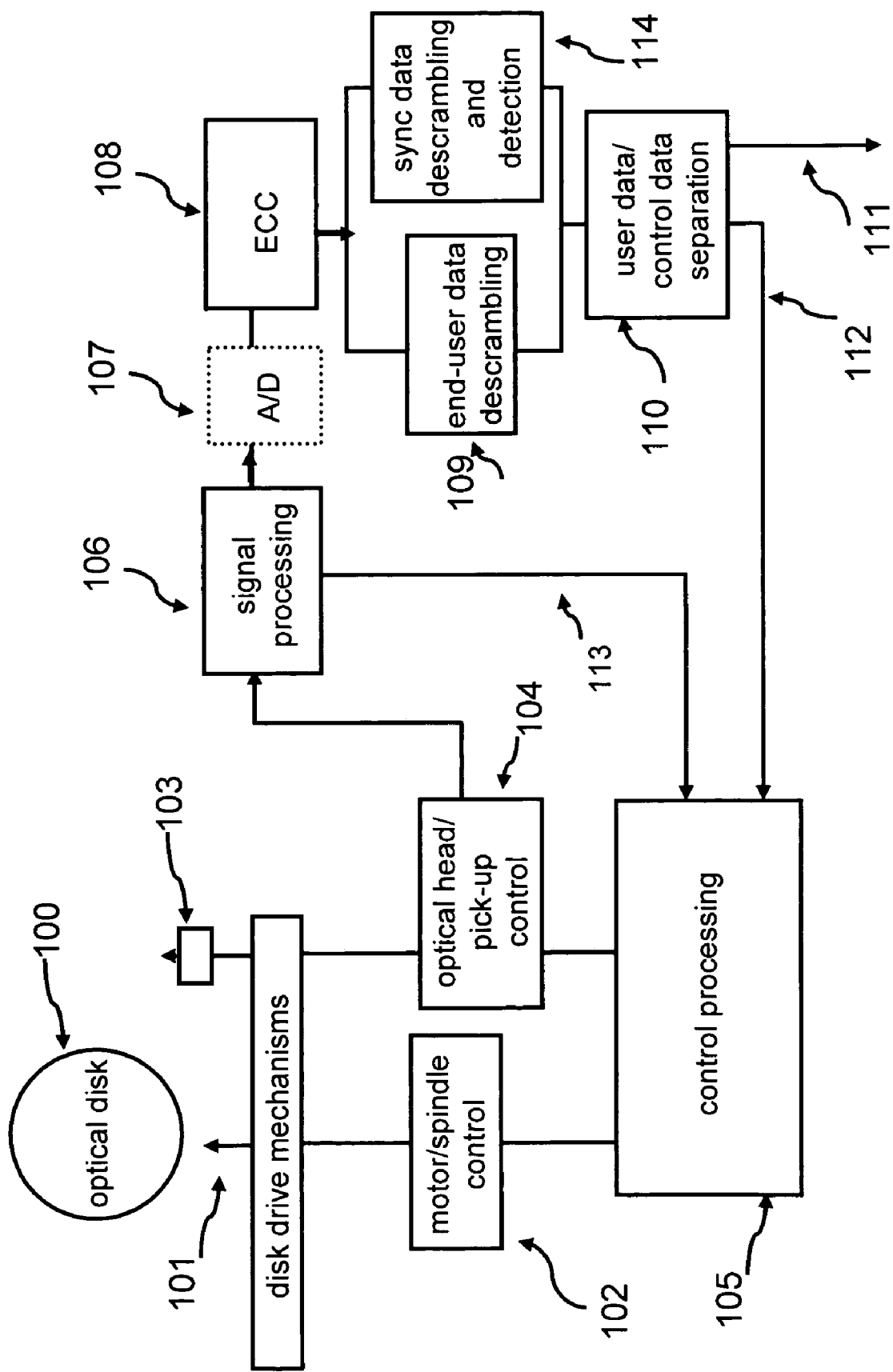
FIG. 1a is a diagram of an optical disk reading system.

FIG. 1a shows a diagram of a reading process of a multi-level optical digital data disk in accordance with an aspect of the present invention. The reading of the optical disk is controlled by the mechanism of the disk drive. This mechanism comprises a rotating spindle 101 of which the rotation speed can be controlled by a controller 102. The mechanism also comprises a pick-up or optical head 103. This pick-up 103 contains the light source and the light detector. Another mechanism 104 controls the tracking of the pick-up. These mechanisms are controlled by circuitry 105 that generates the appropriate control signals. Some of the control signals may be autonomous of the content of the end-user signal. After detection and processing by a signal processor 106 (which may include a demodulation circuit), the raw (un-decoded) detected signal may be provided via connection 113 to control part 105 of the drive and pick-up mechanisms.

In accordance with one aspect of the present invention, multi-value data is written to and read from the optical disk 100. The detected multilevel signal may be processed by an A/D converter 107 to generate binary signals for further processing. According to one aspect of a previous invention by the inventor—realizing n-value logic functions with gates and inverters—it is possible to process all signals with n-valued digital logic functions. In that case an A/D converter is not required.

The data that were written to the disk may have been coded. In many cases, the data are Error-Correcting Coded (ECC) 108. A certain amount of mistakes in detecting the appropriate data can be made without serious consequences, as the mistakes can be detected and corrected by the decoder.

The multi-value data, in accordance with one aspect of the present invention, is scrambled before being written onto the disk 100, and must therefore be descrambled when being read from the disk 100. If user data has been scrambled, a descrambler 109 is then required during the read process.

The data tracks on the disk may be separated into segments or sectors which may have to be identified individually. This may take place through the recognition of a synchronization pattern or sequence, which may or may not be comprised of multi-value signals. Such a synchronization sequence may be scrambled, in accordance with another aspect of the present invention. It also may be scrambled in a way different from the end-user data. The system, according to one aspect of this invention, then may need a unit 114 that will descramble the scrambled synchronization data, specific to its scrambling method. Unit 114, according to another aspect of this invention, can detect the presence of the synchronization sequence. Unit 114 provides a signal (after sync detection) to the user data/control data separation unit 110 that indicates that the data following the alert will be end-user data. User-data is outputted on output 110. Other system control data may be provided externally (such as track selection, not shown in the diagram) and may be provided through connection 112 to control processing unit 105.

Writing multi-level data to a disk may apply a similar method as shown in FIG. 1a, but with the optical signals going into a reverse direction, and applying a D/A converter to change data from binary to multilevel format.

Figure 1B:
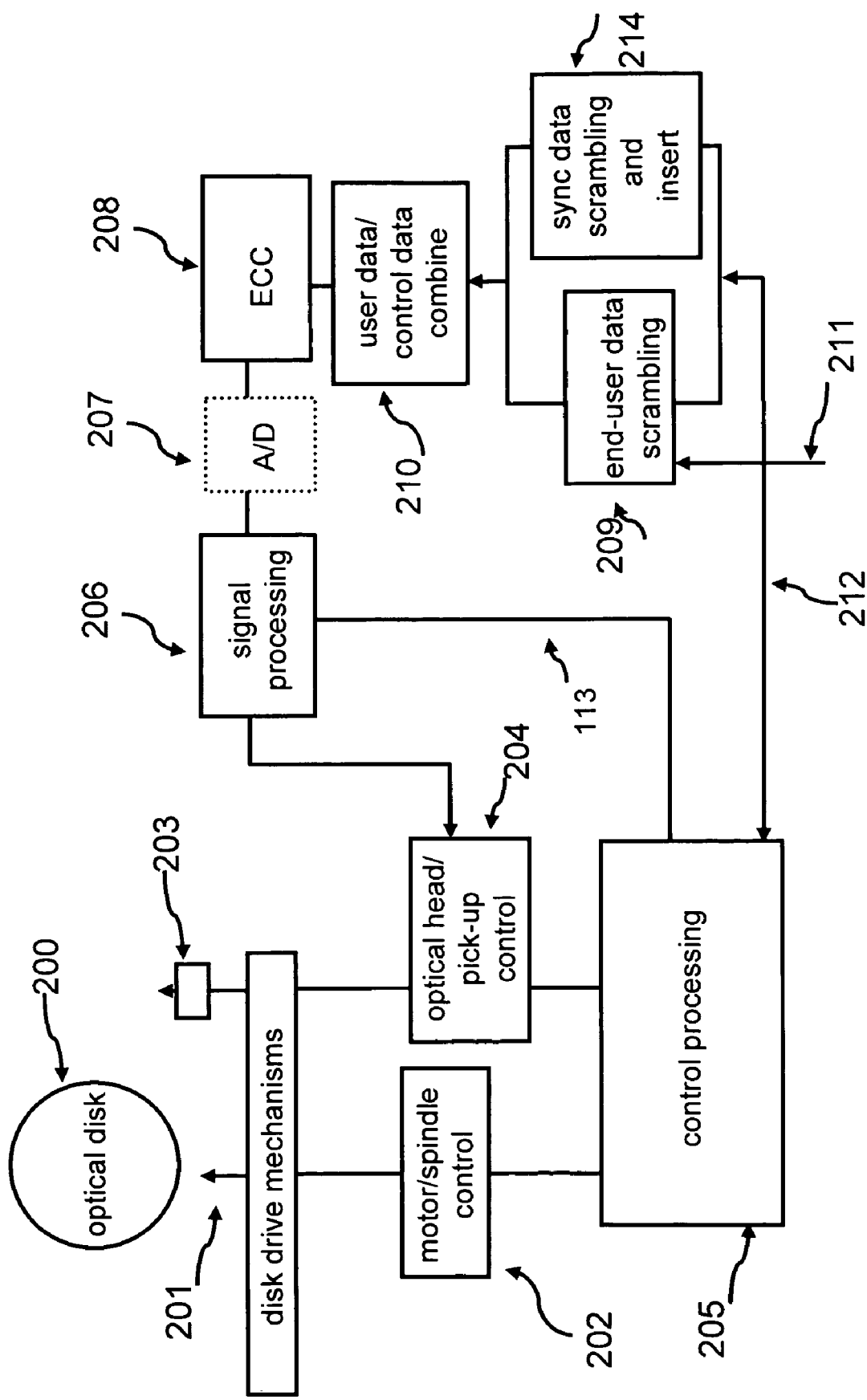
FIG. 1b is a diagram of an optical disk writing system.

This is shown in FIG. 1b. The purpose of the circuit in FIG. 1b is to write (multi-level or binary) digital data inputted on input 211 to an optical disk 200. In the case of an aspect of the present invention, multi-value data is written.

The writing source, such as a laser, may be contained in a pick-up unit 203. The tracking and synchronization mechanisms for an optical disk work in the same way as in the reading process. A control unit 205 controls tracking as well as spindle speed. It may also keep track of the number of symbols written to the disk. It is assumed that the system writes its own synchronization data to the disk. The writing process then starts with generating a first synchronization sequence which may also be scrambled in 214. Unit 210 passes the scrambled synchronization data to an error-correcting coding unit 208. The data may already be in multi-level format or may have been processed as binary words. If they have been processed as binary words they are transformed into multi-valued symbols by a digital/analog converter 207.

Further processing, which may include pulse shaping and/or signal modulation, takes place in unit 206. The signal is then outputted to the pick-up 203 with the writing source such as a laser. Feedback from the written data, as well as from a separate tracking source may generate a signal that will assist in controlling the pick-up head 203 and the speed of the spindle 201. Once the writing of the synchronization data is completed a signal will be provided indicating to unit 210 that the following data is user-data, which will be passed from input 211 through scrambler 214 to ECC unit 208.

The reading and writing process may involve other signals (such as clock signals) and mechanisms such as data-buffers and measures to suppress effects such as jitter. While important to the proper working of the operation of the optical disk process, these measures are known and may not be essential to the scrambling and descrambling methods. They are noted and recognized but not shown in the diagrams of FIGS. 1 and 1a.

The data on the disk may be arranged in frames or sectors. One aspect of the correct operation of reading (and writing) the disk is the determination and knowledge of what part of the disk is being read. Pre-determined blocks of data may contain a unique pattern that is used as a synchronization pattern for the control mechanisms and processing of the data.

Synchronization patterns should be unique, so that they will not be confused with 'user data'. Its pattern should also allow to sharply and exactly determine the reading position of the drive. In other words, the data reading or writing mechanisms should not make a false decision on where a 'user-data sector' starts.

Binary synchronization patterns are used in, for instance, CDMA wireless communication. In that case, a unique sequence is transmitted to a receiver, which also locally has a copy of the expected sequence. The received and locally available binary sequences are compared by way of correlation techniques. This allows the receiver to decide if it is synchronized or not or if a sequence was intended for the receiver.

Binary sequences used for synchronization and communication purposes have, in general, a single and high auto-correlation value when synchronized, and lower and restricted cross-correlation values when not synchronized.

Figure 2:
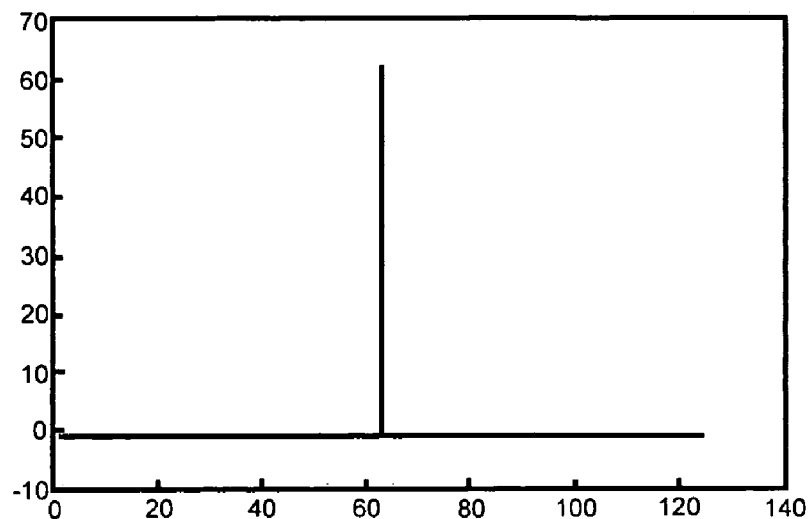
FIG. 2 shows a correlation graph of a binary m-sequence.

As an illustrative example, a binary sequence will be generated by a binary Linear Feedback Shift Register generator with 6 shift elements, with feedback taps at element 5 and 6; the taps are the inputs to a binary XOR function. The output of the function is fed back into the first element of the shift register. The length of the unique (pseudo-noise) binary sequence will be $2^6-1=63$ bits. FIG. 2 shows its traditional correlation graph.

The correlation between two sequences of equal length is determined by assigning each sequence a starting point or origin, where its first symbol occurs. In a next step, the value of each symbol in corresponding positions are compared. When symbols in corresponding positions are identical a positive value (such as 1) is added to a sum. When two symbols are not equal, a negative value (such as −1) is added to a sum. When two identical sequences are perfectly aligned and in synchronization, the correlation value is maximal and equal to the total number of individual symbols in a sequence under the stated rule. When not aligned and not in sync, the correlation value is usually lower than its value for correct synchronization. To make the correlation value of practical use, the difference between the correlation value when sequences are in sync and when they are not in sync should be significant and unambiguous, even under conditions of a certain level of errors and interferences in individual symbols.

To obtain a picture of the correlation performance of a multi-symbol sequence, one copy of the sequence is phase-shifted one symbol and compared to the original sequence, by determining the correlation value. When the length of a sequence is 'p' symbols, this shift and compare is usually done (p−1) shifts to the left, (p−1) shifts to the right and one matching step. The total correlation then contains 2*p−1 individual correlation values.

One way of determining the correlation of binary sequences is usually described as assigning the value −1 to a bit with value 0 and value 1 to bits with value 1. This method, however, does not yield optimal results when correlating sequences of multi-value data.

The following table shows how the correlation can be determined between two binary sequences seq_a and seq_b each of length 15 bits, in accordance with one aspect of the present invention. The sequence seq_a will be represented by val_a wherein all 0s are replaced by −1s. The same applies for seq_b with val_b.

| | | | | | | | | | | | | | | | | |
|---|---|---|---|---|---|---|---|---|---|---|---|---|---|---|---|---|
| seq_a | 1 | 1 | 0 | 1 | 0 | 0 | 0 | 1 | 1 | 0 | 1 | 0 | 1 | 1 | 1 | correlation |
| seq_b | 1 | 1 | 1 | 1 | 0 | 0 | 1 | 0 | 1 | 0 | 0 | 1 | 0 | 1 | 1 | |
| val_a | 1 | 1 | −1 | 1 | −1 | −1 | −1 | 1 | 1 | −1 | 1 | −1 | 1 | 1 | 1 | |
| val_b | 1 | 1 | 1 | 1 | −1 | −1 | 1 | −1 | 1 | −1 | −1 | 1 | −1 | 1 | 1 | |
| product | 1 | 1 | −1 | 1 | 1 | 1 | −1 | −1 | 1 | 1 | −1 | −1 | −1 | 1 | 1 | 3 |

It should be clear that the maximum value of the correlation can be 15 when the sequences are 15 bits long and two sequences are identical.

FIG. 2 shows the correlation for the 63 bits pseudo-noise sequence with the shifted version of itself as mentioned before. When the two sequences are aligned the correlation value is 63. When the sequences are not aligned the correlation is −1. This provides a way to determine when the two sequences are synchronized, which is the case when the correlation is 63. Another advantage of the selected sequence is that the correlation is very low when the sequences are not aligned. This means that in case of disturbances, such as noise that may change some of the bits in a transmitted binary sequence, it still is possible to determine the point of synchronization.

A correlation circuit may do the following: when two inputs to a circuit are identical, a 1 is generated and a 1 is added to a sum or a counter. When the two inputs are different, a −1 is generated or a 1 is subtracted from the sum. It is somewhat of a disadvantage to determine the correlation value in this way as it requires two different circuits (add and subtract).

The literature defines correlation of two signals as:

$$K_{FF}(\theta_v) = \lim_{\theta \to \infty} \frac{1}{\theta} \int_{-\frac{\theta}{2}}^{\frac{\theta}{2}} F(\theta)F(\theta + \theta_v)d\theta.$$

(source: page 70 of Transmission of Information by Orthogonal Functions. by Henning F. Harmuth. Springer-Verlag 1972.)

The term $K_{FF}$ in this expression is the autocorrelation of a function F over a period θ. One can also determine the cross-correlation between a function F and G, in which case the phase shifted function $F(\theta+\theta_v)$ should be replaced with $G(\theta+\theta_v)$.

When using discrete signals the correlation function may be replace by:

$$C(j) = \frac{1}{N}\sum_{i=1}^{N} a_i a_{i+j}$$

This expression determines the autocorrelation of the function A with N elements $a_i$. For the cross-correlation of two different functions A and B with N elements $a_i$ and $b_i$ the following expression determines the cross-correlation:

$$C(j) = \frac{1}{N}\sum_{i=1}^{N} a_i b_{i+j}$$

The discrete expressions are from: Generalized d-sequences and their Application to CDMA Systems, by Radhika Vaddiraja, 2003, Master's Thesis. Both the established analog and discrete correlation expressions have in common that all the values of (normalized) functions are multiplied. While useful in connection with applications involving for instance power spectra of signals, there is no need for synchronization purposes to calculate every term of the correlation function. In fact the established way of calculating the correlation value may require unnecessary complex circuitry, or may not optimize the correlation value.

Figure 3:
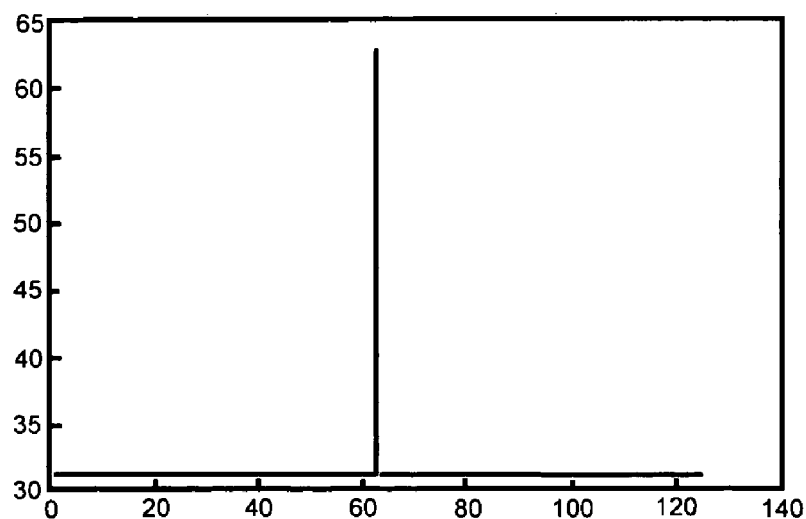
FIG. 3 is shows a correlation graph of a binary m-sequence applying a different correlation method than of the graph of FIG. 2.

One way to limit the number of circuits, in accordance with another aspect of the present invention, is to determine the correlation in the following way: a 1 is added when symbols are the same and nothing is done (not added nor subtracted) when they are different. This approach will circumvent the issue of the subtraction. However the range of the correlation values has then diminished, and may make it more sensitive to noise and other disturbances. The graph of this approach for determining the correlation is shown in FIG. 3.

One can also increase the dynamic range of the correlation values by making the approach more complex. For instance one can add 2 when two bits are identical and subtract 1 when they are different. For the example above, this will create a dynamic range of final correlation values of 126 and 30.

Just adding a certain number when the bits of two sequences are equal and adding nothing when they are different is of limited help in improving the dynamic range of the correlation values compared to the process of adding and subtracting. The reason for this is that in the binary sequence here used about 50% of the bits are 0 and about 50% are 1. About 50% of the bits will be different, but about 50% are equal under any symbol shift. That means that in about 50% of the 63 bits (actually for 31 of them) the bits will make a contribution to the correlation value. This means that, with subtraction, contributing and non-contributing bits cancel each other out. It should be clear that adding 2 instead of 1, but no subtraction when the symbols are not equal, will not make a difference. However adding 3 when bits are identical (and nothing when the bits are different) will improve the dynamic range to 189-93.

Any of these correlation methods can be used to determine synchronization of data that includes multi-value data, in accordance with an aspect of the present invention.

Binary sequence applications, such as in CDMA wireless communication, sometimes prefer rigid correlation properties as shown in FIG. 2. In that case the correlation, when sequences are synchronized, has a sharp, single high (or autocorrelation) value. When not synchronized, the correlation value should be much lower and the same for each phase shift. Sequences with this property are called maximum length or m-sequences.

In U.S. patent application Ser. No. 10/935,960 titled 'Ternary and Multi-value Digital Signal Scramblers, Descramblers and Sequence Generators', the inventor has shown as one aspect of his inventions, how to create n-valued m-sequences with n a prime number and using LFSR based sequence generators.

As will be shown as one aspect of the present invention, application of multi-valued symbols in synchronization sequences has significant benefits, especially when combined with or executed in a multi-valued logic fashion.

As an illustrative example a 4-element LFSR based ternary sequence generator will be used to generate a ternary sequence of 80 elements. It should be clear that other ternary functions, different tap-configurations, and a different valued logic will also lead to ternary and n-valued sequences, though potentially of a different length. Consequently this method is not limited to a specific n-valued logic, a specific register length or LFSR configuration.

Figure 4:
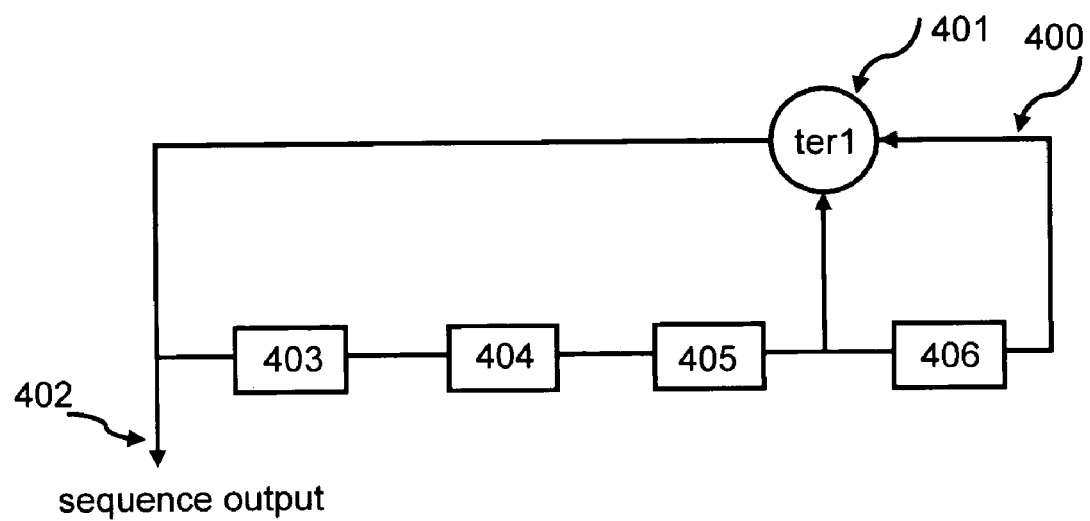
FIG. 4 is a diagram of an LFSR based sequence generator.

FIG. 4 shows a diagram 400 of the ternary LFSR based sequence generator here used in the example, with a 4 element shift register with elements 403, 404, 405 and 406. A ternary sequence is outputted on 402. The in FIG. 4 applied ternary logic device 401 has a function 'ter1' with the following (non-commutative) truth table:

| ter1 | 0 | 1 | 2 |
|---|---|---|---|
| 0 | 1 | 2 | 0 |
| 1 | 0 | 1 | 2 |
| 2 | 2 | 0 | 1 |

| ter− | 0 | 1 | 2 |
|---|---|---|---|
| 0 | 0 | 1 | 1 |
| 1 | 1 | 0 | 1 |
| 2 | 1 | 1 | 0 |

In this and other diagrams of scramblers, descramblers and sequence generators the controlling clock signal and circuitry are not shown, in order to keep the drawings as simple as possible, but are known and should be assumed to be present.

Figure 5:
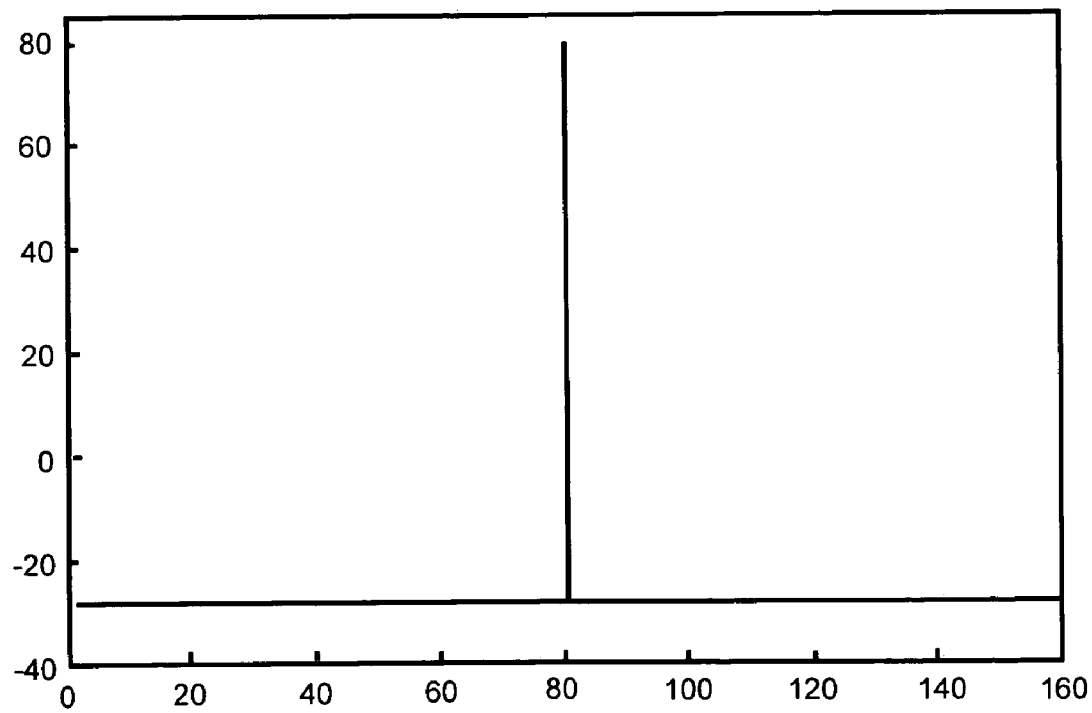
FIG. 5 shows a correlation graph of a non-binary sequence.

FIG. 5 shows a correlation graph for the sequence outputted on 402 in FIG. 4. The correlation rule used here is 'add 1 when symbols are identical' and 'subtract 1' when symbols are not equal. The dynamic range of the correlation is from 80 to −28 or over 100. Even when taking into account that the length of the sequence is greater than the previous binary one, it should be clear that the dynamic range in correlation is in general greater for ternary sequences than for binary sequences when the sequences have the same number of symbols. Consequently ternary sequences have better synchronization performance than binary sequences of the same length, or shorter ternary sequences can have an equal or a better synchronization performance than longer binary ones. In general one may conclude that n-valued sequences with good correlation, may show better synchronization performance than p-valued sequences with equal length and good correlation when n is greater than p.

Figure 6:
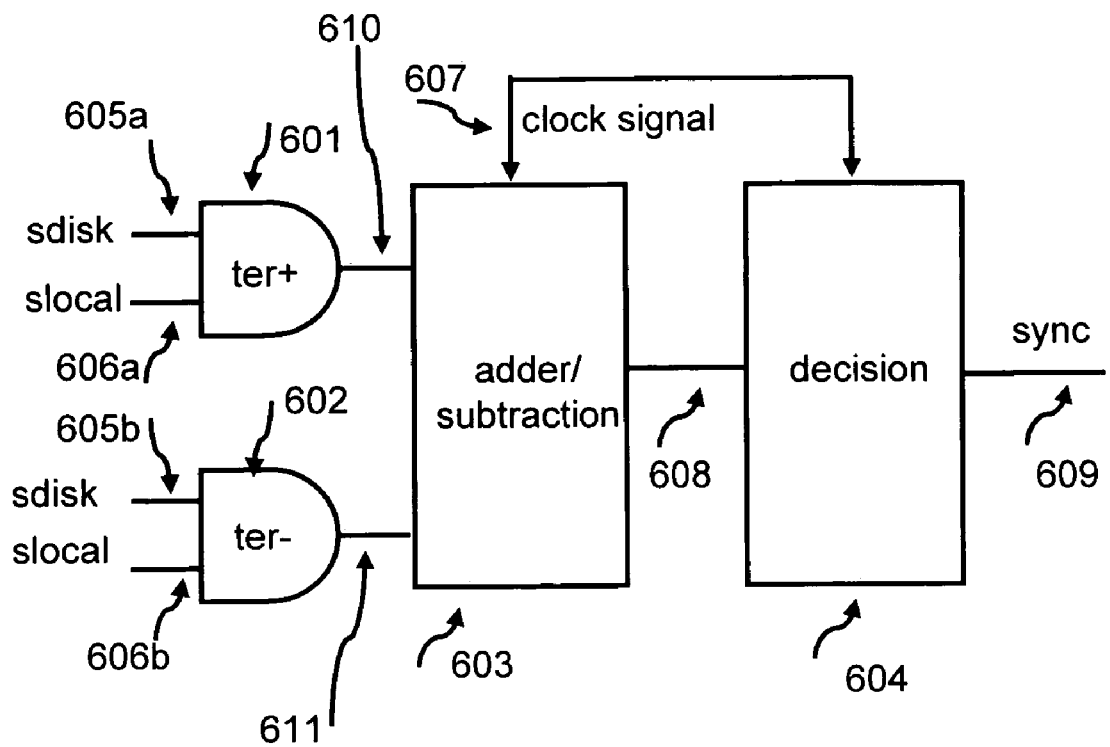
FIG. 6 is a diagram of a synchronization circuit.

FIG. 6 shows a diagram of a ternary logic circuit that can be used to determine synchronization in accordance with an aspect of the present invention. The signal 'sdisk' is the sequence coming from the disk and is provided to a first input 605a of ternary circuit 601 and to a first input 605b of circuit 602. The signal 'slocal' is the sequence generated (or obtained from a memory device) in the local synchronization logic and is provided to a second input 606a of circuit 601 and to a second input 606b of circuit 602. Thus, the circuit of FIG. 6 compares a local synchronization circuit to the signals from an optical disk to determine synchronization. The circuit shown in FIG. 6 may be used in the synchronization circuits 114 and 214 in FIGS. 1a and 1b, respectively.

The ternary logic function 'ter+' has the following truth table:

| ter+ | 0 | 1 | 2 |
|---|---|---|---|
| 0 | 1 | 0 | 0 |
| 1 | 0 | 1 | 0 |
| 2 | 0 | 0 | 1 |

The device 601 with function 'ter+' will generate a 1 on output 610 when symbols in sequence 'sdisk' and 'slocal' are identical. It will generate a 0 on 610 when the symbols are different. The output 610 of 601 provides the generated 0 or 1 of 601 to the adder/control unit 603, which will add an incoming 1 to the total sum, and remain unchanged when a 0 was generated.

The truth table of the ternary logic function 'ter−' is shown in the following table.

The device 602 with function 'ter−' will generate a 1 on output 611 when 'sdisk' and 'slocal' are not equal. It will generate a 0 on 611 when 'sdisk' and 'slocal' are identical. The output 611 of 602 will provide a 0 or 1 to the adder control unit 603, which will subtract the value of signal coming from 602 from the total sum. The add/subtract unit may be controlled by a clock signal 607. Every clock cycle the new sum is calculated and outputted on output 608, which is also input to decision circuit 604. The decision circuit decides whether synchronization is detected. For example, the decision circuit 604 may decide that synch is detected when the correlation between the signal from the disk and a local signal exceeds a threshold. A reset signal (not shown) will reset the sum when is was decided that no synchronization was achieved. The reset signal is generated after a certain number of clock cycles or after a certain amount of time. Several of these circuits may run in parallel but with clocks shifted whole cycles in phase. The reason for this is that it will take some cycles to determine if a no synchronization situation exists. However during that period the beginning of the actual synchronization sequence may occur and should be identified from the beginning. Different correlation strategies are known and can be applied. One such strategy could be that if the running sum of correlation values is greater than a pre-determined value, then it is certain that two sequences are synchronized. The end of the synchronized sequences may be determined by a known and unique pattern. It is then certain that following this pattern the next data are user-data.

Figure 6A:
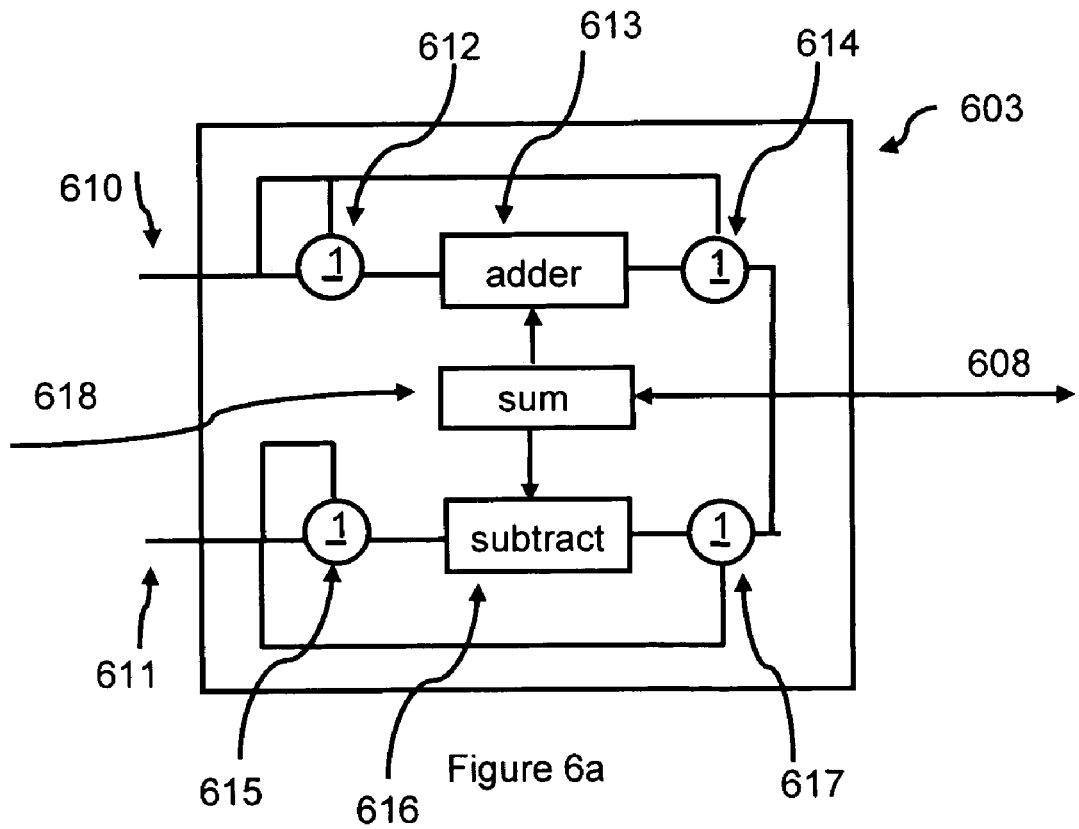
FIG. 6a is a diagram of a correlation circuit.

One possible realization of unit 603 is shown in FIG. 6a. This circuit (and variations which will be described here) can also be realized by, for instance, a programmable microprocessor with or without A/D converters as needed. Input 610 will provide a signal 1 when inputted symbols of the signal read and the local sequence are equal. The input 610 is used as an input to an adder 613 as well as the control inputs to individually enabled gates 612 and 614. When 610 provides a 1, gate 612 is conducting and will provide a 1 to a first input of the adder. A second input will provide the current sum in memory 618 to the adder, which will create the new sum. Because gate 614 is also conducting, the newly generated sum will be stored in memory 618 from the adder. When the symbols of the sequences are not equal, a 0 will be outputted on 610. Consequently the adder will not increase the sum. When the symbols are not equal 611 will provide a 1, but to a subtraction circuit 616. Consequently the sum will be lowered by 1 and a new updated sum will be put in memory 618. The current value of the sum will be provided on 608 to a decision circuit. Not shown, but assumed, are other control signals, such as a reset signal to reset the sum to 0.

Figure 6B:
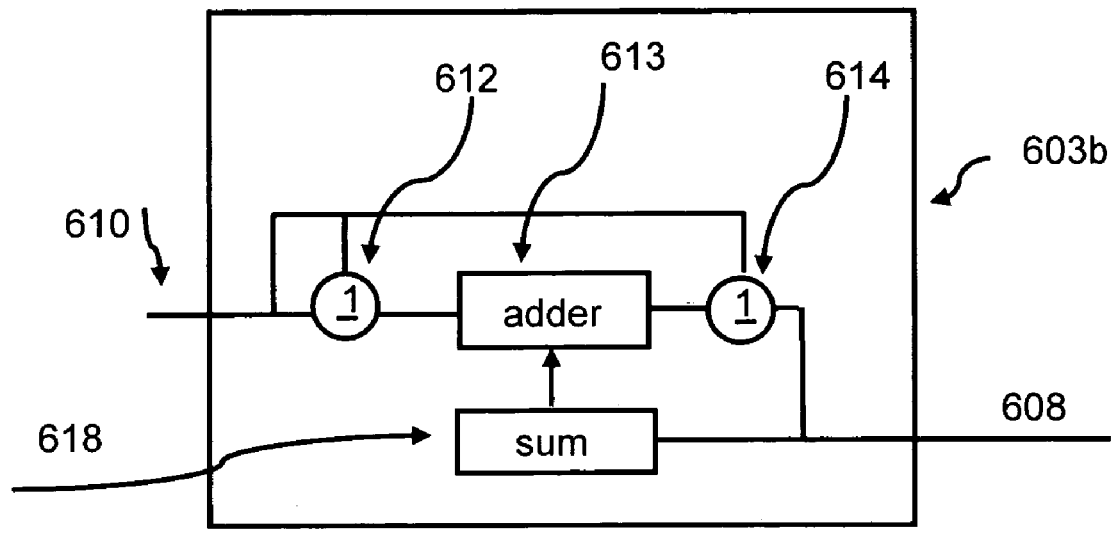
FIG. 6b is another diagram of a correlation circuit.
Figure 6C:
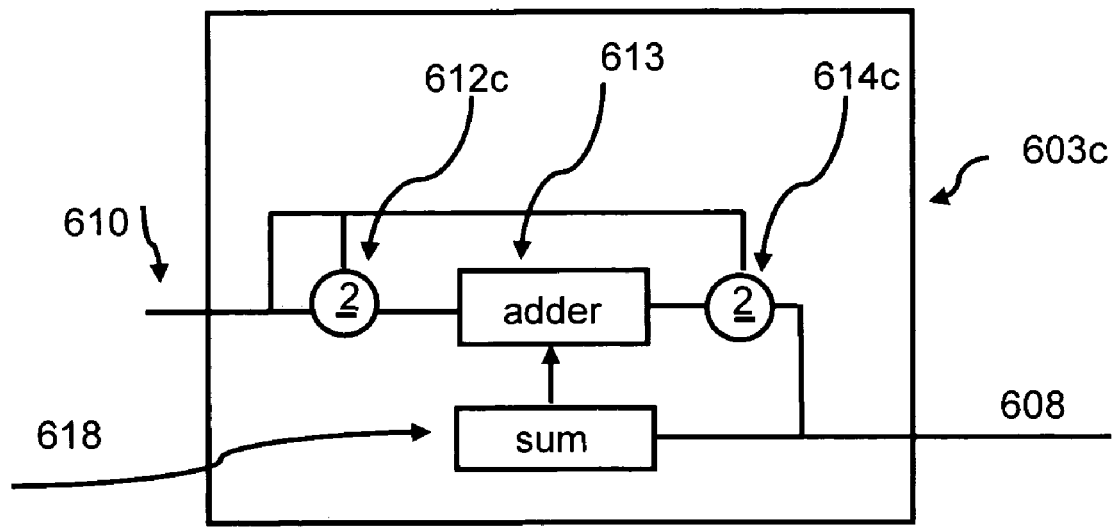
FIG. 6c is another diagram of a correlation circuit.
Figure 6D:
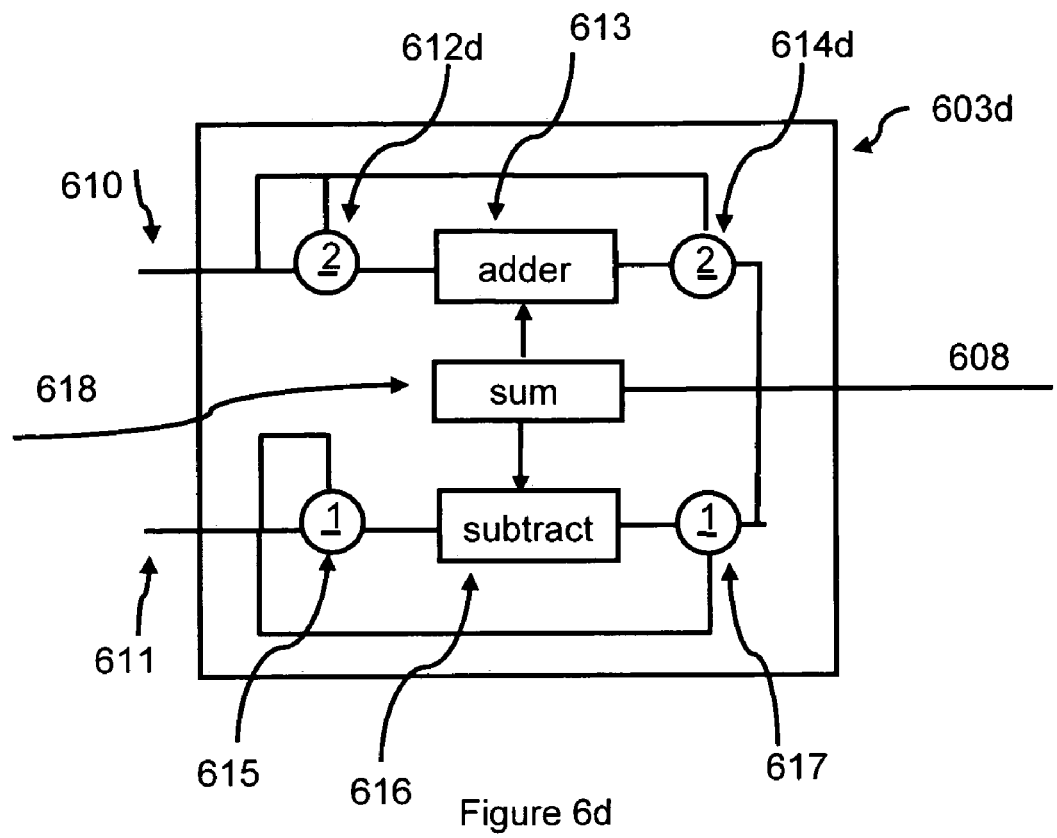
FIG. 6d is another diagram of a correlation circuit.

This circuit of FIG. 6a, with the logic functions described above, implements the correlation technique wherein +1 is added when the signals (the local one and the read one) are the same and −1 is added when they are different. By changing the logic functions, other correlation techniques can be implemented. For example, FIG. 6b shows the circuit 603b that will determine the correlation value by adding 1 when symbols are equal and nothing when symbols are not equal. The numerals of FIG. 6b have the same meaning as in FIG. 6a. In FIG. 6b, the function ter– in FIG. 6 is nto needed. Another example is provided in FIG. 6c with circuit 603c which realizes the correlation value by adding 2 when symbols are identical and nothing when they are different. Most of the numerals in FIG. 6c have the same meaning as in FIG. 6b. The only differences are the individually controlled gates 612c and 614c which are conducting when the input 610 will provide a signal 2. In the case of FIG. 6c, the function ter– from FIG. 6 is not needed, and the function ter+ is modified so that a 2 is output when the input signals are the same. Another example is provided in FIG. 6d with a diagram of circuit 603d which calculates the correlation value by adding 2 when symbols are equal and subtracts 1 when symbols are not equal. Most numerals in FIG. 6d have the same meaning as in FIG. 6a with gates 612d and 614d as differences. These gates are conducting when 610 provides a signal 2. In the case of FIG. 6d, both ter+ and ter– from FIG. 6 are used, but ter+ is modified so that it outputs a 2 whenever the input signals are the same.

Functions 'ter+' and 'ter–' can be combined, for instance into a function 'ter+–' with the following truth table:

| ter+– | 0 | 1 | 2 |
|---|---|---|---|
| 0 | 1 | 2 | 2 |
| 1 | 2 | 1 | 2 |
| 2 | 2 | 2 | 1 |

Figure 6E:
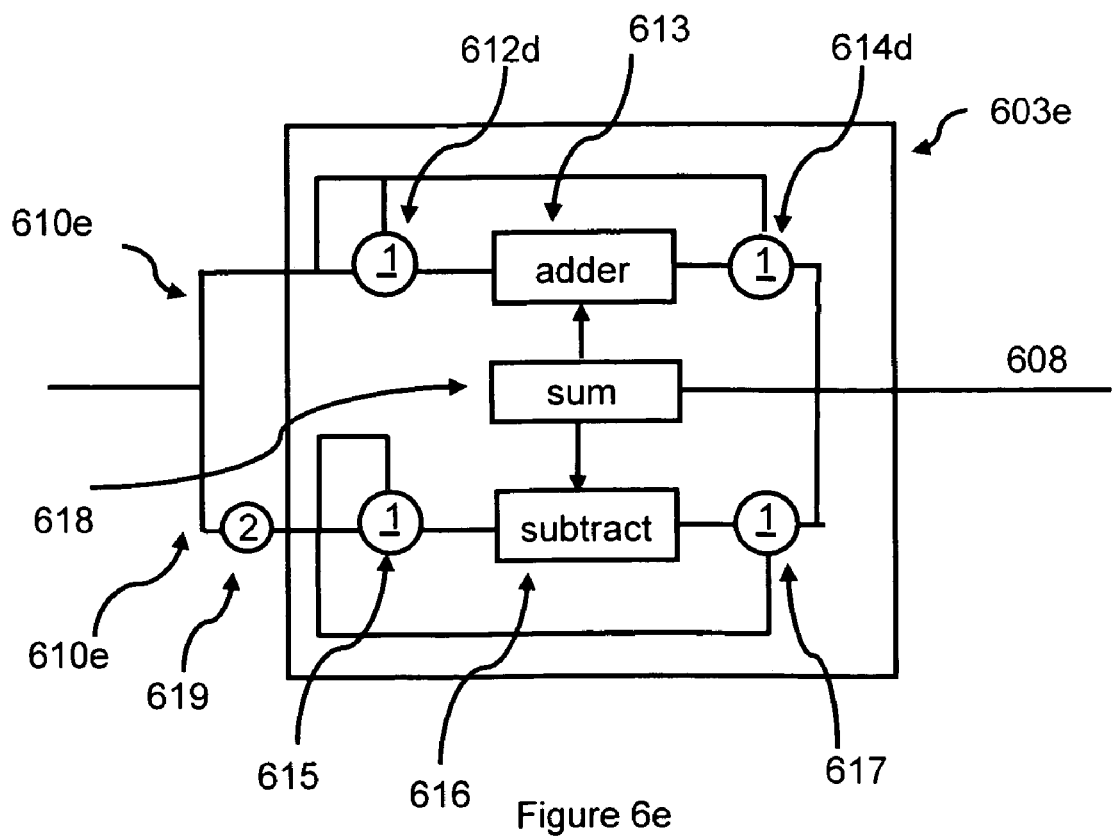
FIG. 6e is another diagram of a correlation circuit.

When ter+– is used, the device with this function will supply a single output to the circuit 603e as illustrated in FIG. 6e. The circuit 603e is almost identical to 603 in FIG. 6a. The first difference is that inputs 610 and 611 of FIG. 6a are now combined to one input 610e, being the output of a single device with function 'ter+–'. Another difference is that a ternary inverter 619 is inserted. This inverter will transform a state 2 into a state 1 signal. However it will change all other states not into 1. So one possible inverter could then be [2 0 1] with changes 0 to 2; 1 to 0 and 2 to 1. The logic of 603e is now such that a 1 will be added to the sum when the output of the function 'ter+–' is 1; a 1 is subtracted from the sum when the output of 'ter+–' is 2.

A simpler solution is of course when 'ter+–' is identical to 'ter+'. This means that a 1 is added to the sum when the signals 'sdisk' and 'slocal' are identical. Nothing will happen when the signals are different. The range for the correlation for the sequence of the example then varies between 80 and 26. This may be sufficient for synchronization in a situation with limited noise or interferences. This correlation method is realized in the circuit of FIG. 6b.

A dramatic improvement in correlation value range can be achieved in accordance with one aspect of the present invention by creating, what can be called, an 'unbalanced' correlation mechanism, meaning adding more than 1 when symbols are identical and subtracting nothing (or for instance 1) when symbols are different. For instance one can add 3 when symbols are identical and subtract 1 when symbols are different. The correlation value will range between 240 and 24 in that case.

Figure 7:
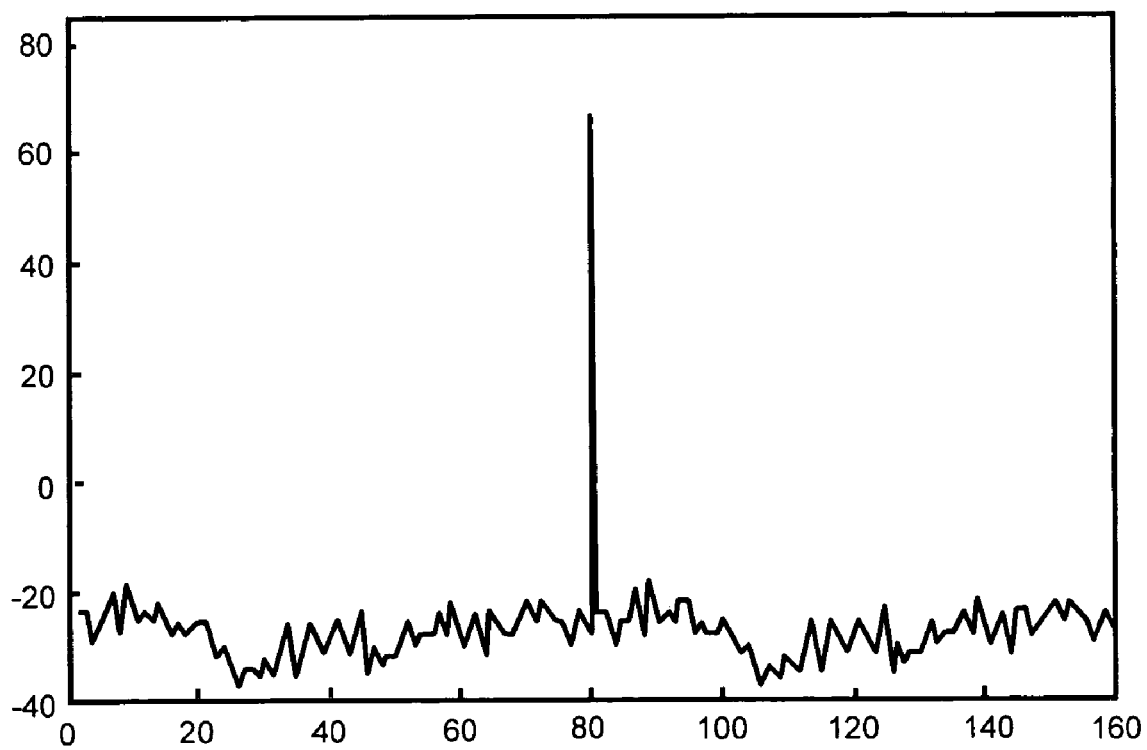
FIG. 7 shows a correlation graph of a non-binary sequence.

The multi-valued (in this case ternary) pseudo-noise like sequences also have better performance than binary ones of equal length under error bursts. FIG. 7 shows the correlation graph for the 80 elements ternary sequence with a continuous error burst of 10 elements.

Clearly ternary and multi-valued sequences, generated by previously invented and here applied sequence generators, perform very well as synchronization sequences. One can further tune the performance by either using simple correlation mechanisms and lower performance or more complex correlation mechanisms and better performance.

Instead of actually generating the sequences locally, one can also store the sequences in a local memory and use these from memory when writing the synchronization signal to a disk 100 or other physical media.

While, for illustrative purposes, ternary m-sequences are used, it should be clear that other LFSR generated ternary sequences will perform very well for synchronization purposes when the autocorrelation value is high and the correlation value, when sequences are not synchronized, or with any other sequence of equal length (called cross-correlation) is very low. The same applies to other n-valued sequences, including when n is not a prime number.

One aspect of this invention clearly demonstrates that calculating the correlation properties can be adapted to requirements related to error performance.

The following table shows the dynamic range of different correlation methods for situations with no errors and for situations where a burst of 10 "all equal symbols" occurs within the frame of a synchronization sequence. The ternary sequence used is the 80 chips sequence generated by the circuit of FIG. 4.

| correlation between two sequences c and d of length 80 with no error burst | | | | | |
|---|---|---|---|---|---|
| method when c and d symbols are identical | +1 | +1 | +c(k) | +c(k) | +c(k) |
| method when c and d symbols are different | 0 | –1 | 0 | –1 | –c(k) |
| maximum 1 | 80 | 80 | 160 | 160 | 160 |
| maximum 2 | 26 | –28 | 52 | –2 | –56 |
| correlation range: Δ | 54 | 108 | 108 | 162 | 216 |

| correlation between two sequences c and d of length 80 with 10 chips error burst | | | | | | |
|---|---|---|---|---|---|---|
| method when c and d symbols are identical | +1 | +1 | +c(k) | +c(k) | +c(k) | +4 |
| method when c and d symbols are different | 0 | –1 | 0 | –1 | –c(k) | –1 |
| maximum 1 | 70 | 60 | 136 | 127 | 127 | 275 |
| maximum 2 | 31 | –18 | 56 | 7 | –33 | 75 |
| correlation range: Δ | 39 | 78 | 80 | 120 | 160 | 200 |

The correlation range in the example is determined by putting the 10 chips error burst as a consecutive sequence of identical symbols in different parts of the 80 chips sequence. The above table shows the minimum correlation range, which may occur at different positions in a sequence. This explains why the maximum correlation values can be different while using a same method.

Most sequence generators are based on prime numbers GF(n) LFSR based pn-generators. In U.S. Provisional Patent Application No. 60/575,948 titled 'Multi-value Coding of Sequences and Multi-value Memory Devices', the inventor describes as one aspect of multi-valued logic, n-valued pn-like sequences with n being a non-prime number. A 4-valued example will be provided in a later section. The inventor has also developed novel methods to create Gold-like n-valued sequences, with n being prime and non-prime, with very sharp and easy to distinguish correlation peaks and very low cross-correlation. All these and other n-valued sequences generated by LFSR based sequence generators with n-valued logic functions, created from reversible n-valued inverters, can serve very well as synchronization sequences in optical disk and other applications.

Other Performance Criteria.

In the application of synchronization sequences there are at several important issues to consider. One aspect of this invention is the matching of a digital sequence on the storage medium against a locally generated sequence, as a synchronization process.

Another aspect is the desirable low correlation of the locally generated sequence with any other sequence or series of digits on the disk. It is undesirable that the correlation of the locally generated sequence with any data sequence (except the synchronization sequence) is too high, so that false synchronization decisions are avoided. This issue can be articulated as a low cross-correlation between the synchronization sequence and other data on the disk.

Figure 8:
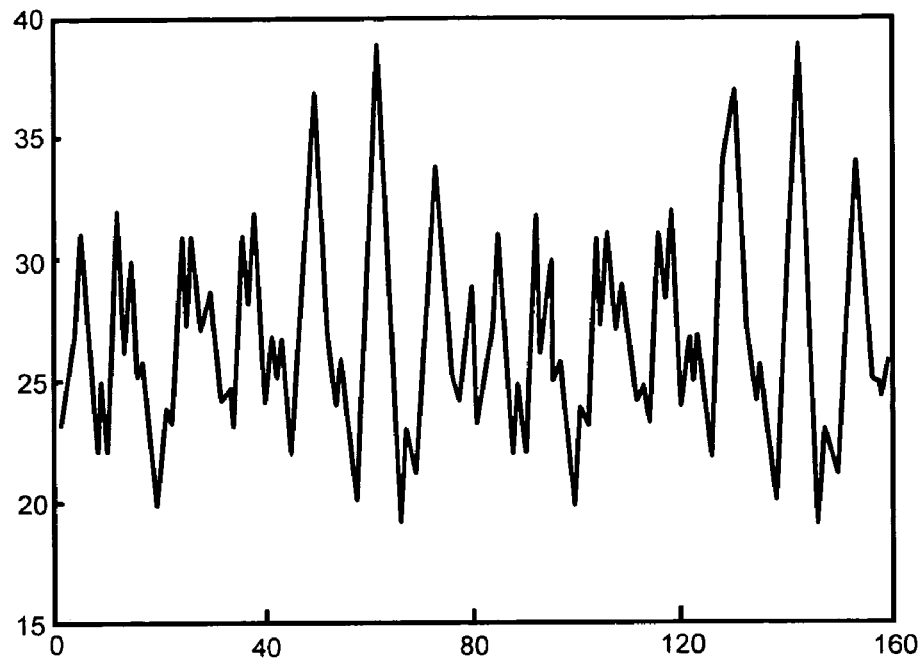
FIG. 8 shows a cross-correlation graph.

FIG. 8 shows a cross-correlation between the sequence generated by the generator as shown in FIG. 4 and a sequence consisting of 4 0s, followed by 4 1s, followed by 4 2s and then repeating itself until 80 symbols are in the sequence. One can see that the cross-correlation does not reach 40 when applying a correlation method that adds a 1 when symbols are identical. A correlation method that also subtracts 1 when symbols are different will generate a cross-correlation that is lower than 0.

Another aspect of this invention is the scrambling of the user-data. In order to be able to separate synchronization data from user-data, the structure of an LFSR based synchronization sequence generator should use different functions and preferably different taps than the user-data scrambler. LFSR based multi-valued scramblers and non-LFSR multi-valued scramblers can be used when scrambling the synchronization sequence or user data.

Descrambled N-Valued Sequences.

In already cited U.S. patent application Ser. No. 10/935,960 it has been established that n-valued LFSR based sequence generators are related to n-valued LFSR based scramblers and descramblers.

This property may be applied to create a novel and simple way to determine synchronization points on a multilevel optical data storage disk. The method may require a high confidence and low probability of symbol errors over the duration of the sequence. Based on an overall low symbol error ratio and a sufficiently competent error correcting code, the assumption of a high confidence in an error free sequence is likely justified. In a high symbol error environment this method may not work.

Figure 9:
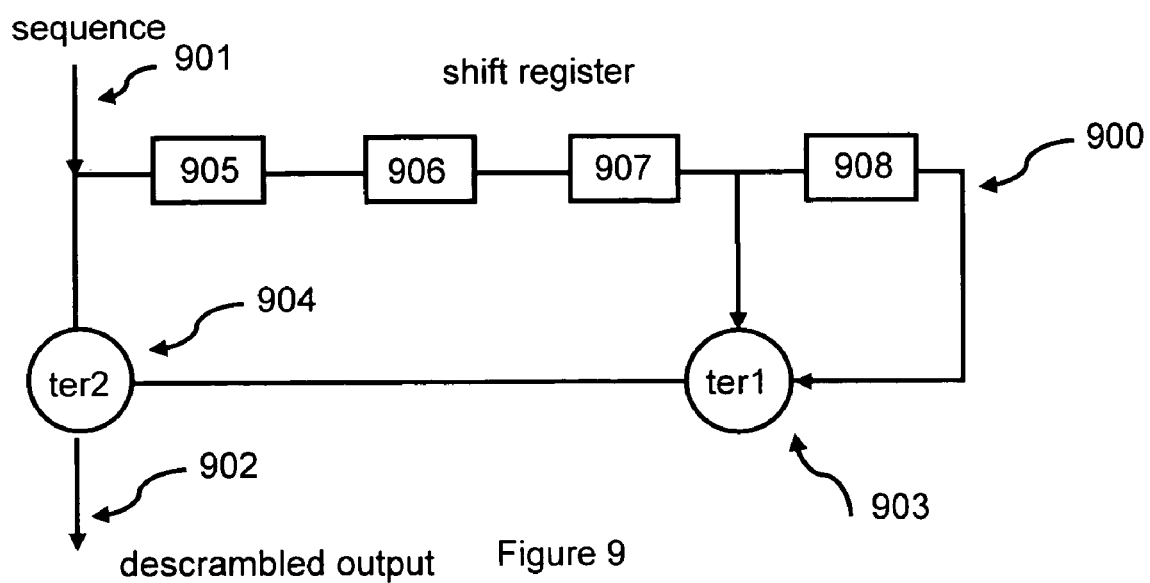
FIG. 9 is a diagram of an LFSR based descrambler.

Assuming the use of a ternary sequence generated by the circuit of which a diagram is shown in FIG. 4, a descrambler is shown in FIG. 9. The circuit of FIG. 9 can be used in circuit 109 in FIG. 1a to descramble user data on the disk 100.

This descrambler has two ternary logic functions. The function 'ter1', of which the truth table is shown in the following table.

| ter1 | 0 | 1 | 2 |
|---|---|---|---|
| 0 | 1 | 2 | 0 |
| 1 | 0 | 1 | 2 |
| 2 | 2 | 0 | 1 |

The descrambler also comprises a function 'ter2' of which the truth table is shown in the next table.

| ter2 | 0 | 1 | 2 |
|---|---|---|---|
| 0 | 1 | 2 | 0 |
| 1 | 2 | 1 | 0 |
| 2 | 0 | 2 | 1 |

The resulting output of the descrambler will be all 1s when the initial content of the shift registers of the sequence generator and descrambler are identical. When the content of the shift registers are not identical, the shift register of the descrambler will be 'flushed' in 4 cycles, during which period the output may not be identical to all 1s The output signal of this descrambler will always be all 1s after the first 4 symbols.

By using the following truth table for 'ter2' the descrambler can produce an all 0s output.

| ter2 | 0 | 1 | 2 |
|---|---|---|---|
| 0 | 0 | 1 | 2 |
| 1 | 1 | 0 | 2 |
| 2 | 2 | 1 | 0 |

And by using a function 'ter2' with the following truth an all 2s output can be created.

| ter2 | 0 | 1 | 2 |
|---|---|---|---|
| 0 | 2 | 0 | 1 |
| 1 | 1 | 2 | 0 |
| 2 | 0 | 1 | 2 |

Thus one can create a sequence generated by an n-valued LFSR based sequence generator, which, when descrambled, will contain predetermined patterns of all 0s, 1s or 2s.

In many cases it may be useful to provide an all identical symbol sequence with a known prefix sequence and that perhaps will end with a known pattern sequence. In that case one can create a desired sequence with an LFSR based scrambler and provide the desired sequence as its input. The scrambled sequence can be error-coded and modulation coded and then put on the optical disk as a synchronization sequence.

After demodulation and error-decoding the sequence can be descrambled by its matching LFSR based descrambler.

As an illustrative example a sequence can be created with 10 0s and 9 1s. A special synchronization descrambler should be used, different from a descrambler used for user-data descrambling.

The 19 symbols generated ternary sequence, represented a scrambled sequence of 10 ternary 0s and 9 ternary 1s is provided in the following table.

| scrambled synchronization sequence | 1112112012111200110 |
|---|---|
| descrambled synchronization sequence | 0000000000111111111 |

The scrambled sequence can be descrambled with the descrambler 900 of which a diagram is provided in FIG. 9. The scrambled sequence is provided to the input 901 of the descrambler, of which the ternary 4-element shift register with elements 905, 906, 907 and 908 should have the content [0 0 0 0].

The scrambler 900 has two ternary logic devices: 903 with function 'ter1' and device 904 with function 'ter2'. The truth tables of these functions are provided in the following tables.

| ter1 | 0 | 1 | 2 |
|---|---|---|---|
| 0 | 1 | 2 | 0 |
| 1 | 0 | 1 | 2 |
| 2 | 2 | 0 | 1 |

| ter2 | 0 | 1 | 2 |
|---|---|---|---|
| 0 | 2 | 1 | 0 |
| 1 | 1 | 2 | 0 |
| 2 | 0 | 1 | 2 |

A signal 'descrambled output' is outputted on output 902. It should be clear that the first 4 symbols of the descrambled sequence outputted on output 902 may be different from 0 if the initial content of the shift register is not [0 0 0 0]. However after 4 clock pulses (not shown in the diagram) the shift register is 'flushed' and the outputted sequence from then on is identical to the correctly descrambled sequence. Symbolically one may present the descrambled sequence as shown in the following table.

| Correctly descrambled synchronization sequence | 0000000000111111111 |
|---|---|
| uncertain descrambled synchronization sequence | xxxx000000111111111 |

The 'uncertain descrambled synchronization sequence' reflects a situation where the initial content of the shift register was not [0 0 0 0]. It is evident that the descrambled synchronization sequence always has at least 6 0s. These zeros may be used to initiate a counter/adder.

Figure 10:
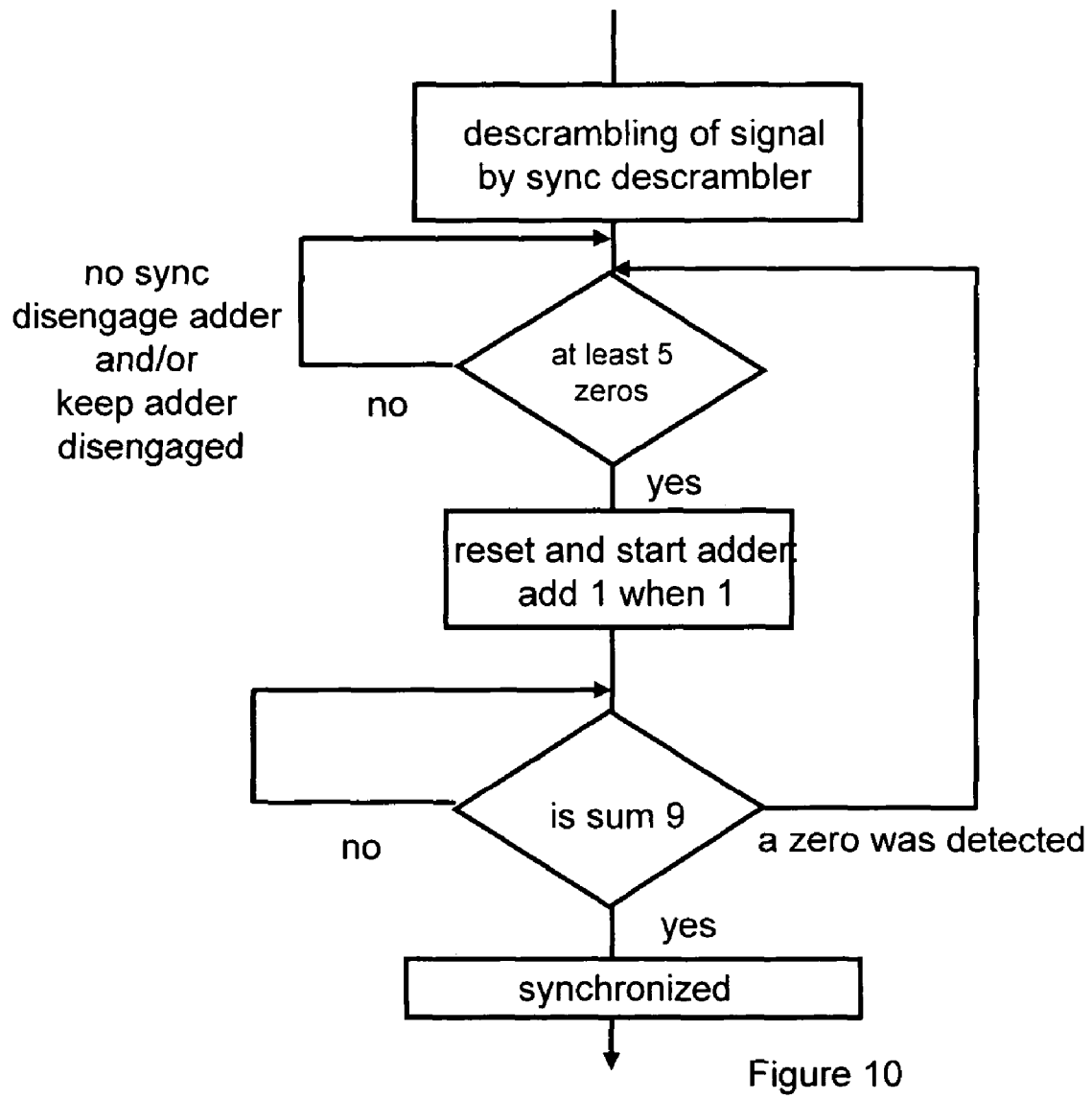
FIG. 10 is a flow diagram of a synchronization method.

FIG. 10 shows a flow diagram of a possible process to determine synchronization. The process is performed by circuits 109 and 114 in FIG. 1*a*. Initially an adder is disengaged. A rule may be included that engages an adder (reset to 0 and start adding) when at least 5 zeros have been detected. When the descrambler of FIG. 9 has outputted for instance at least 4 zeros, it may already have processed the first 8 symbols of the synchronization sequence. If the synchronization sequence is being processed, at a minimum two more 0s will be generated before the 9 1s will be received. The adder will engage after 5 zeros and set at 0 and will start adding 1 when a 1 is received and nothing when a symbol is 0 or 2. When a 0 is received after receiving a 1 and before the required sum was reached, the sequence being processed was not a synchronization sequence and the adder disengages and the process starts all over.

The adder is assumed to be a ternary adder. When the third digit of the sum becomes 1, 9 1s have been added, the system is synchronized and the next symbol may be assumed to be user-data.

It should be clear that one can create different rules for engaging the adder and include different adding rules. One can create different unscrambled synchronization sequences, for instance by including higher value numbers. As long as the symbols of a sequence are scrambled and descrambled in a contiguous way, the descrambled sequence, using an LFSR based descrambler, is completely identical to the unscrambled sequence when the initial start contents of the shift registers of scrambler and descrambler are identical. When the content of these shift registers is not identical the symbols of the descrambled sequence may differ from the unscrambled sequence by a number of symbols equal to the length of the shift register.

Several checks may be included to prevent synchronizing against unwanted signals. For instance a pulse counter, that counts clock pulses, may be used to check against sequences that have non 1s in the relevant portion of the sequence. When there is a disparity between the adder and the counter a non-1 symbol was encountered in the sequence. The counting sequence may also be followed by a small known sequence that can easily be checked. For instance a pattern like [2 1 0 2 1 0] would serve that purpose. These measures have as purpose to protect against statistically unlikely, but possible patterns.

The benefit of using a digital sum for synchronization, based on descrambling a known sequence, is that no sequence comparison technology, including a local copy of the sequence, is required. The digital sum circuit 'knows' that after reaching a certain number, the following symbol will be user data.

The enabling technology behind this simple synchronization approach is the ability to create special purpose scrambled sequences. These special purpose sequences can be descrambled into sequences with pre-determined content. The advantage is that the scrambled sequence has noise-like properties. It can be used to synchronize the data transfer process from an optical disk by de-scrambling the sequence and applying the method of determining the digital sum. One can create scrambled sequences that have low cross-correlation properties.

One can further apply other aspects of this invention to make synchronization more difficult for unauthorized users by providing critical information required for correct synchronization, including descrambling methods on the disk. This can be done is such a way that synchronization without such information is more difficult to achieve. Use of the synchronization data then requires access to the disk.

All of the above synchronization and correlation methods and apparatus can be used in accordance with one aspect of the present invention to generate and detect, ulti-value synchronization signals for use by circuits 109 and 114 in FIG. 1*a* and by circuits 209 and 214 in FIG. 1*b*.

Multilevel Data-Scrambling and Security.

There may be different reasons to scramble multilevel data before they are written to a storage medium such as an optical disk. Avoidance of repetitive patterns may be one reason. Protecting the data from unauthorized usage may be another reason.

In general the applied coding schemes, such as those for Error-Correcting coding or modulation coding, for publicly available storage media, are well known and usually published as part of a standard. Such coding schemes may provide some protection of user-data, but decoding schemes can be implemented and applied by unauthorized users to read the user-data.

Another aspect of this invention is a novel method to scramble multilevel data for storage on media, like optical disks, by way of multi-valued scrambling.

For illustrative purposes the ternary or 3-valued case will be explained in detail. It should be understood that this method applies to any n-valued scrambling solution, with n being an integer greater than 2.

Figure 11:
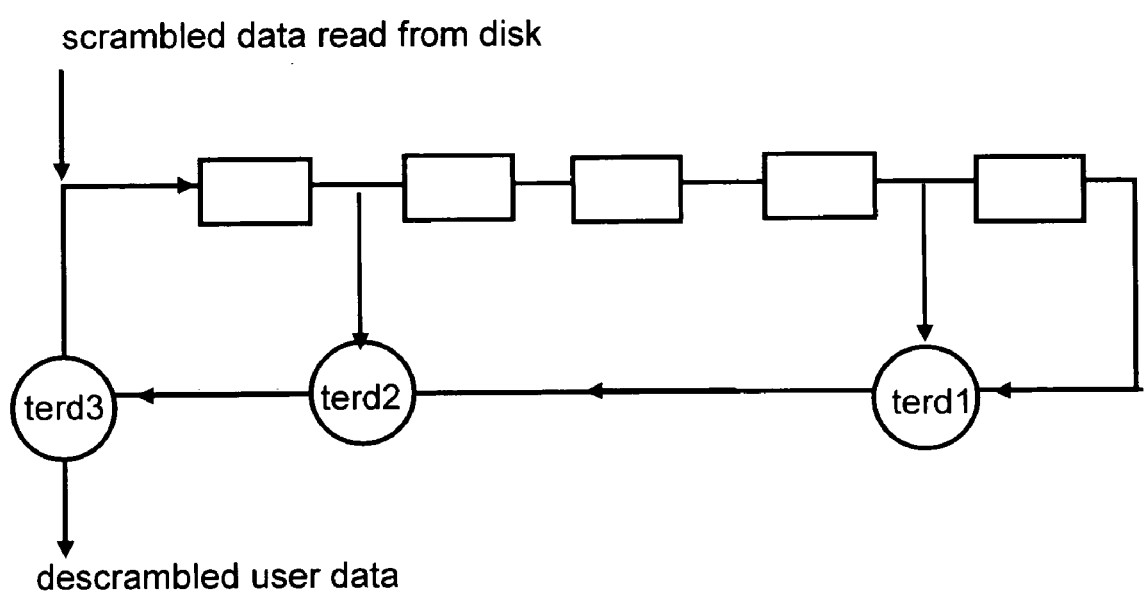
FIG. 11 is a diagram of an LFSR based descrambler.

Another aspect of the invention related to multi-valued descrambling of user data is shown in FIG. 11. This multi-valued descrambler used for user-data descrambling should be different from the one for the synchronization sequence as shown in FIG. 9. Different here can mean, different functions, different number of functions, different tap configurations and different length of shift register. The different configuration may comprise just one or any of the differences identified. For illustrative purposes the LFSR circuit for user-data scrambling and descrambling is assumed to have a 5 elements shift register and contains three different scrambling functions as shown in FIG. 11. The descrambler of FIG. 9 has a 4-element shift register and different ternary functions. The scramblers and descramblers are controlled by a clock signal, which is not included in the drawings.

Figure 12:
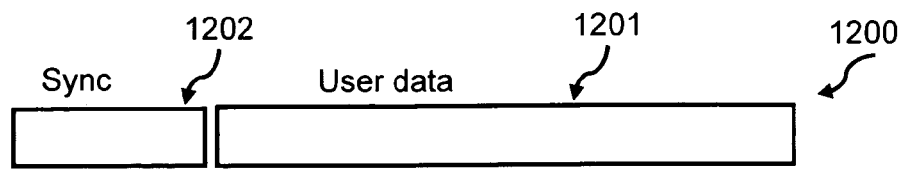
FIG. 12 is a diagram of a data track on a storage medium.
Figure 13:
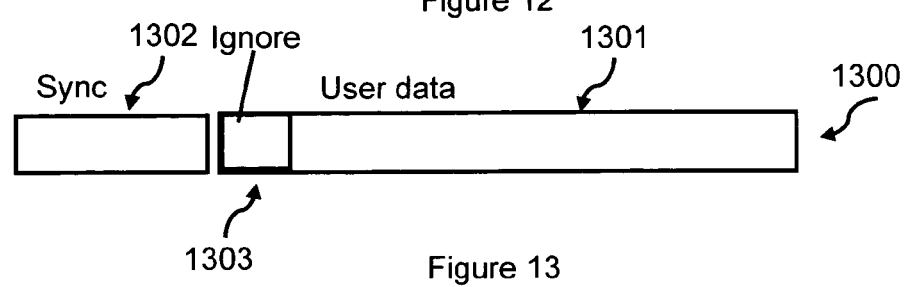
FIG. 13 is a diagram of a data track on a storage medium.

A synchronization circuit will indicate when descrambled data can be interpreted as user data. FIGS. 12 and 13 show a diagram of possible data tracks on the optical disk. FIG. 12 shows a diagram 1200 of part of a track on an optical disk. The user data segment 1201 appears right after the synchronization data 1202 on the track. This requires the initial setting of the shift register of FIG. 12 to have the same content as the scrambler at the time of synchronization. There are several ways to achieve that. One way would be to put the initial settings of the shift register in the synchronization track, for instance as its first 4 or its last 4 symbols.

FIG. 13 shows a diagram of different solution, showing segment 1300 as part of a data track on an optical disk. Because the shift register will be 'flushed' after 5 clock cycles in the illustrative case using the diagram of FIG. 13, one may create a data-track 1301 of which the first 5 symbols in 1303 right after synchronization sequence 1302 may be ignored. At the $6^{th}$ symbol the descrambler is generating the correctly de-scrambled user-data.

Another aspect of this invention applies a different approach in scrambling and descrambling. The configuration in FIG. 13 has a security drawback. While easy to operate, because of its 'flushing' effect of the shift registers, unauthorized users can try different descramblers, until one will work. With higher value logic it will become statistically more unlikely to find the correct configuration by chance.

Stronger security can be obtained by connecting correct descrambling capabilities to the specific data carrier or optical disk. This is especially true when a specific sequence, used in phase with the scrambled data is required to descramble the user data. For instance one can assign a specific user-data segment on the disk as a descrambling sequence. This segment can be descrambled by a descrambler and stored in memory by the data reading system. This stored sequence is then used as a second input, together with the scrambled data at the first input, to another descrambling device.

Figure 14:
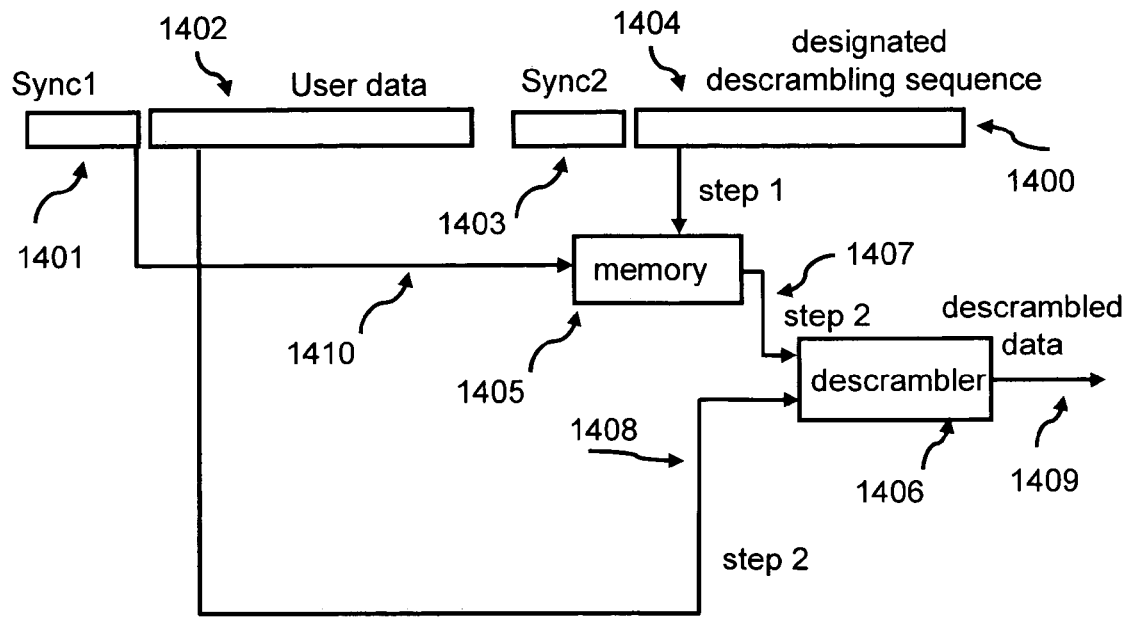
FIG. 14 is a diagram of a synchronization method using parts of a data track on a storage medium.

FIG. 14 shows the diagram of the descrambling process according to one aspect of this invention. It shows part of a data-track 1400 with 4 multi-valued data segments: a first segment 1401 with a first synchronization sequence, a second segment 1402 with multi-valued user data, a third segment 1403 with a second synchronization segment and a fourth segment 1404 with a multi-valued descrambling sequence. In step 1 a descrambling sequence 1404 is located following synchronization segment 1403 with sequence Sync2. The descrambling sequence from 1404 is read from the designated data-segment (identified by a sequence Sync2) and stored in a memory device 1405. In step 2 the user-data segment 1402, identified by a sequence Sync1 in 1401 of a track of the optical disk is inputted to a first input 1408 of descrambler 1406. In phase with the user-data of segment 1401 the content of memory element 1405 is inputted to a second input 1408 of descrambler 1406. The correct phase of descrambling is being derived from synchronization sequence Sync1 in 1401 by generating a signal outputted on 1410 to memory 1406. This signal can also be used by the descrambler but is not shown, but should be assumed. The correct descrambled user-data is outputted by descrambler 1406 on output 1409 in a step 3.

One should keep in mind that as an illustrative example ternary signals and ternary devices are used. The here invented method works for all n-valued signals and logic devices.

Assume that the ternary descrambling device executes a ternary descrambling function described by the following ternary truth table:

| Descram | 0 | 1 | 2 |
|---|---|---|---|
| 0 | 2 | 1 | 0 |
| 1 | 1 | 0 | 2 |
| 2 | 0 | 2 | 1 |

This function is a self-reversing scrambler/descrambler function. It is also commutative. Assume that the user-data were scrambled with a certain sequence, containing unpredictable ternary symbol patterns. The only way to correctly descramble the scrambled data is by descrambling the descrambled data with the above function, applying exactly the same said sequence exactly in phase with the scrambled data.

The process is demonstrated for scrambling and descrambling a ternary user-data signal of 40 symbols in the following table.

| | | |
|---|---|---|
| 1 | Data sequence | 2011221021122201221201200001000212112101 |
| 2 | scrambling sequence | 1112001012221221121011220120210012121111 |
| 3 | scrambled sequence | 2102000222212100210010102101012001022010 |
| 4 | descrambling sequence | 1112001012221221121011220120210012121111 |
| 5 | descrambled sequence | 2011221021122201221201200001000212112101 |
| 6 | descrambling sequence | 1120010122212211210112201202100121211111 |
| 7 | descrambled sequence | 2000212211101211102100222222110100022101 |

The table shows the symbolic representations of sequences of 40 ternary consecutive symbols. Row 1 shows an unscrambled user-data sequence. Row 2 shows the scrambling sequence. Row 3 shows the result of scrambling the sequence of row 1 with the sequence of row 2 with the ternary scrambling/descrambling function 'descram'. The scrambled sequence of row 3 can be written as user-data (possibly after error-coding) on a multilevel optical disk.

The sequence as shown in row 3 will be read from the optical disk and (potentially after error decoding) descrambled with a locally available descrambling sequence as shown in row 4 with a device executing descrambling function 'descram'. The result is the descrambled sequence as shown in row 5 of the table. The sequences of row 1 and row 5 are identical.

Row 6 shows a descrambling sequence which is a phase shifted version of the sequence of row 4. The sequence as shown in row 6 is the sequence of row 4 but shifted 1 position to the left. The original first element in the sequence of row 4 (a symbol 1), now has become the last symbol of the sequence of row 6.

The scrambled sequence and the descrambling sequence are out of phase and inputting the sequences of row 3 and row 6 to the descrambling function 'descram' will generate the sequence as shown in row 7 of the table. The sequences of row 1 (the original user-data) and row 7 are clearly different.

Additional security may be provided by not storing the descrambling sequence in a directly usable form on the optical disk. Additional security may be provided by distorting the stored descrambling sequence on the disk in a known way, such that a circuit in the descrambling unit can restore it to a complete, in-phase, descrambling sequence that can be applied for correct descrambling of the scrambled sequences.

Another aspect of this invention is to secure stored data on media such as multilevel optical disks by putting the method of descrambling on the removable medium. Without access to the maintenance data on the actual disk, and access to descrambling methods it will be difficult to descramble the user-data.

One aspect of a previous invention as described in U.S. patent application Ser. No. 10/912,954 titled 'Ternary and higher Multi-value Digital Scramblers/Descrambler' is a method to combine different scrambling functions, with different scrambling sequences to create a composite multi-valued data scrambler.

It is possible to create a composite n-valued scrambler, comprising k cascaded individual n-valued scramblers. A descrambler of such a composite scrambler can be created by a composite descrambler comprising individual descramblers, cascaded in reverse order when compared to the composite scrambler. Each individual descrambler in the composite descrambler should have as one of its inputs the same (and in-phase) sequence as its corresponding individual scrambler in the composite scrambler.

It has been shown that composite scramblers, comprising self-reversing individual scramblers, can act as its own descrambler, when the number of individual scramblers is odd.

Figure 15:
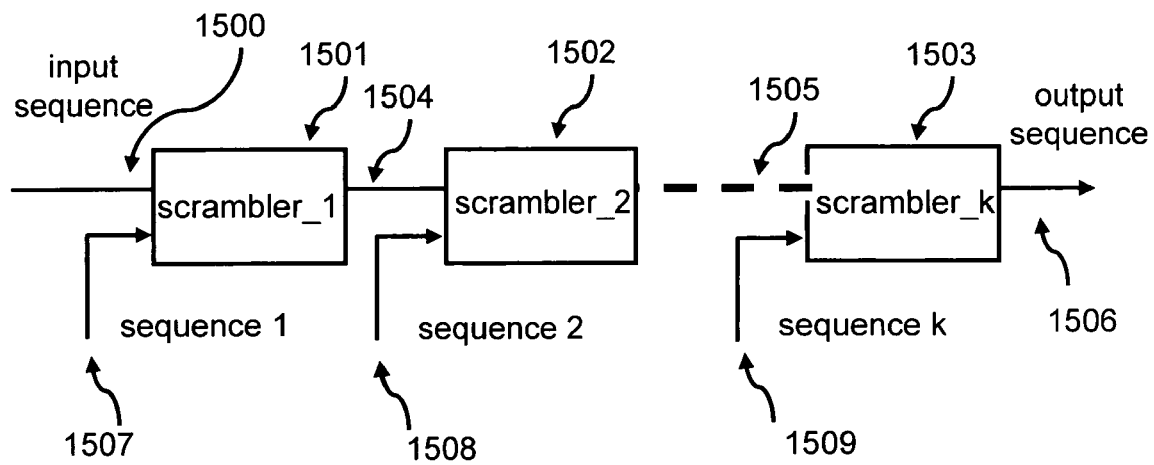
FIG. 15 is a diagram of a composite scrambler applying a plurality of individual scramblers.

FIG. 15 shows a diagram of a composite scrambler, having k individual scramblers, of which are shown 1501 scrambler_1, 1502 scrambler_2 and 1503 scrambler_k. Each scrambler has a second input providing a scrambling sequence. Scrambler_1 has a second input 1507 providing scrambling sequence 'sequence 1', scrambler_2 has a second input 1508 providing 'sequence 2' and scrambler_k has a second input 1509 providing 'sequence k'. The first individual scrambler 1501 has external data provided at its first input 1500. The second scrambler 1502 has as its first input 1504, which is also the output of the scrambler 1501. The last scrambler 1503 has as its first input 1505, which is the output of its preceding scrambler. All consecutive individual scramblers (except the first one) have the output of their previous individual scrambler as its first input. The scrambled sequence is outputted on output 1506. The scrambler of FIG. 15 can be used to scramble the data in circuits 209 and 214 of FIG. 1b.

For illustrative purposes it is assumed that the individual scramblers of the composite scrambler all operate within the duration of one symbol, in such a way that within the duration of a symbol, a symbol at the input determines the symbol at the output. No time delay effects are assumed, though to those skilled in the art it will be clear that the system may be adapted to delays, by for instance applying registers or memory elements between the individual scramblers and a relevant clock signal.

One can now create a composite scrambler, using different scrambling sequences for individual scramblers and scramble user data. Both scrambled user data and scrambling sequences will be available from the disk.

It may be assumed that the reading mechanism is designed with full knowledge of the scrambling sequences and scrambling functions. A composite descrambler can then be constructed, with the right individual descrambling functions in the right order and the correct descrambling sequences, read from the disk. The scrambled user-data can then be descrambled.

It has been shown in previously cited U.S. patent application Ser. No. 10/935,960 that n-valued logic scrambling functions have truth tables that can be considered realized from individual n-valued reversible inverters.

The following table shows the 6 ternary reversible inverters.

| i1 | i2 | I3 | i4 | i5 | i6 |
|----|----|----|----|----|----|
| 0  | 0  | 1  | 1  | 2  | 2  |
| 1  | 2  | 0  | 2  | 0  | 1  |
| 2  | 1  | 2  | 0  | 1  | 0  |

The inverter i1 is the identity. Inverters i1, i2, i3 and i6 are self reversing inverters. The columns of the truth table of ternary scrambling function 'descram' can be realized with the inverters i6 for its first column, i3 for its second column and i2 for its third column. All columns of the function 'descram' can be represented by self-reversing inverters. The function 'descram' is a self-reversing ternary function.

As an illustrative example of one aspect of the invention a single ternary scrambler and descrambler will be designed. It is to be understood that also composite ternary scramblers and descramblers can be designed using the here described invention. It is also understood that the invention can be applied to create n-valued composite scramblers and descramblers.

Figure 16:
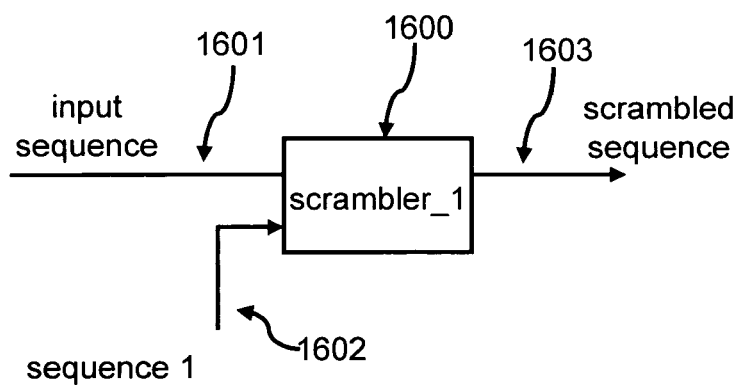
FIG. 16 is a diagram of an individual scrambler.

FIG. 16 shows an individual scrambler 1600. The individual scrambler 1600 has a first input 1601 providing a user-data sequence which has to be scrambled. The scrambler 1600 also has a second input 1602 providing a known scrambling sequence. The output 1603 of the scrambler provides the scrambled ternary sequence, which can be error-coded, modulation coded and written to an optical disk. The scrambler of FIG. 16 can be used in the circuits 209 and 214 in FIG. 1b.

As another aspect of this invention, the descrambling method will be stored on the disk. This means that without this information, no descrambler is configured at the data reading stage.

Figure 17:
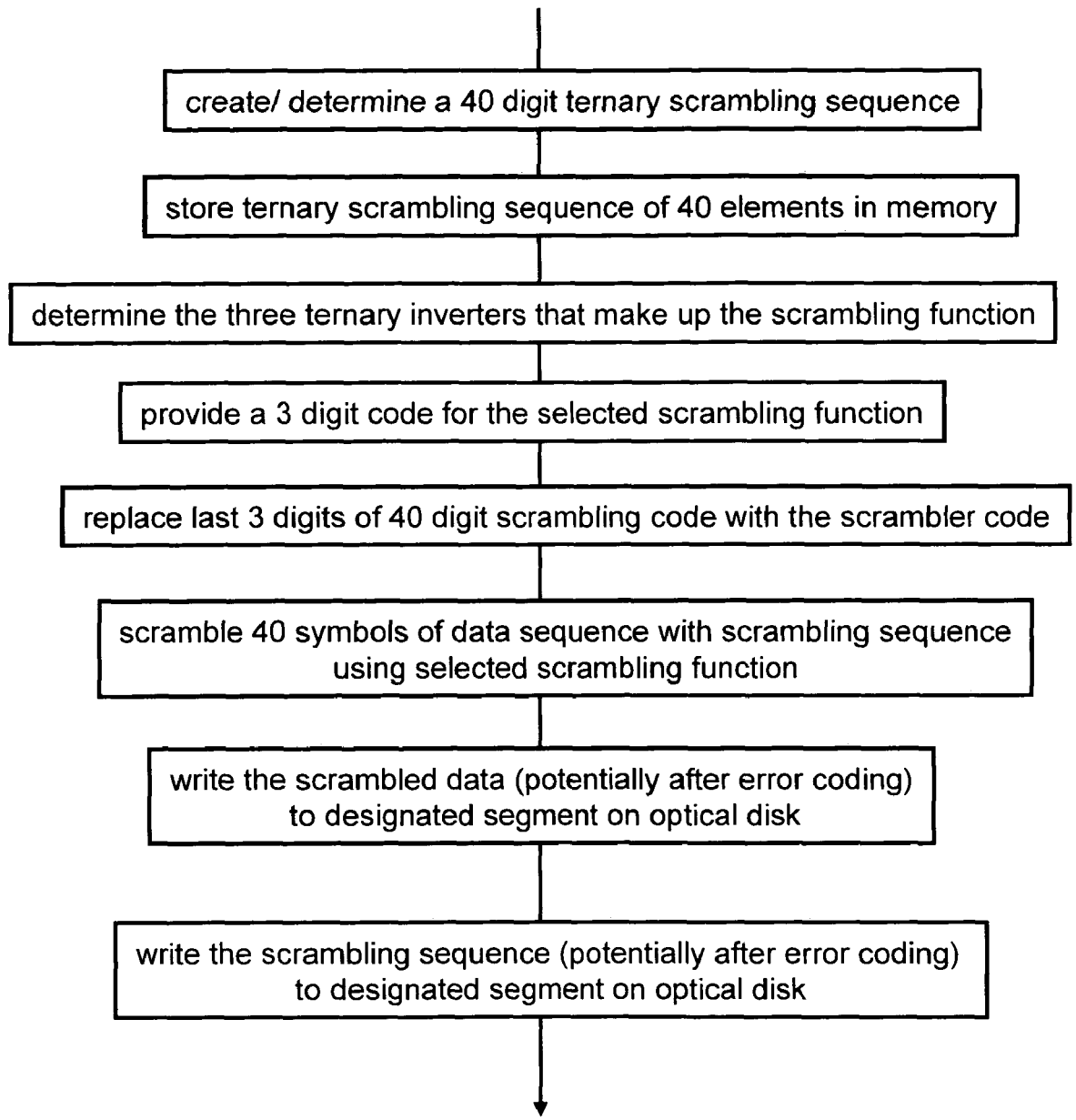
FIG. 17 is a flow diagram for a scrambling method.

The process applied to scramble the user data is shown in the flow diagram of FIG. 17. As an illustrative example the scrambling of a 40 elements ternary sequence is described. First a 40 element ternary scrambling sequence will be determined. This sequence may be stored in a memory for later use, however it can also be generated real-time at the right time if desired. The ternary scrambling function is determined. For the example it is assumed that the choice is between two scrambling functions 'scram' and 'scram_1' of which the truth tables are shown in the following tables.

| scram | 0 | 1 | 2 | scram_1 | 0 | 1 | 2 |
|---|---|---|---|---|---|---|---|
| 0 | 2 | 1 | 0 | 0 | 2 | 1 | 0 |
| 1 | 1 | 0 | 2 | 1 | 0 | 2 | 1 |
| 2 | 0 | 2 | 1 | 2 | 1 | 0 | 2 |

The scrambling function 'scram' has as its columns the self-reversing inverters i6, i3 and i2. The scrambling function 'scram_1' has as its columns the reversible inverters i5, i4 and i1.

The descrambling functions 'descram' and 'descram_1' that will correspond to descramble a signal scrambled by the functions 'scram' and 'scram_1' have truth tables that are shown in the following table.

| Descram | 0 | 1 | 2 | descram_1 | 0 | 1 | 2 |
|---|---|---|---|---|---|---|---|
| 0 | 2 | 1 | 0 | 0 | 1 | 2 | 0 |
| 1 | 1 | 0 | 2 | 1 | 2 | 0 | 1 |
| 2 | 0 | 2 | 1 | 2 | 0 | 1 | 2 |

The scrambling function 'scram' has itself as its descrambler. The function 'scram_1' is comprised of inverters i5, i4 and i1 has function 'descram_1' with inverters i4, i5, and i1 as its descrambling function.

In the example 3 digits or elements at the end of the 40 element scrambling sequence have been reserved for identifying the used scrambler function (and consequently of the required descrambling function at the receiving side).

Only a code with two different states is required to identify the required descrambling function at the receiving (or descrambling) side, however a code with more states may be used. The different states of the code may be used to access the right descrambling function. Again for illustrative purposes only, it will be shown how a 3 digit code may be applied to use a descrambling solution applying ternary gates and inverters.

The three digit ternary code [0 1 1] will be used to designate the scrambler with function 'scram' and the ternary code [2 0 2] will be used to designate the scrambler with function 'scram_1'. The purpose of this coding will become apparent when explaining the descrambling phase. The three digit code will be replacing the last 3 digits of the scrambling sequence.

In a next step the 40 elements sequence of user-data will be scrambled with the scrambling sequence by the selected scrambling function. Both the resulting scrambled sequence and the scrambling sequence will be written to the appropriate sectors on the optical disk. In fact the scrambling sequences with the right codes may be pre-written on a disk empty of data, or available for re-writing or overwriting of existing data by new data. At a later moment user-data can be scrambled with the available and appropriate scrambling sequences and written to the disk.

Figure 18:
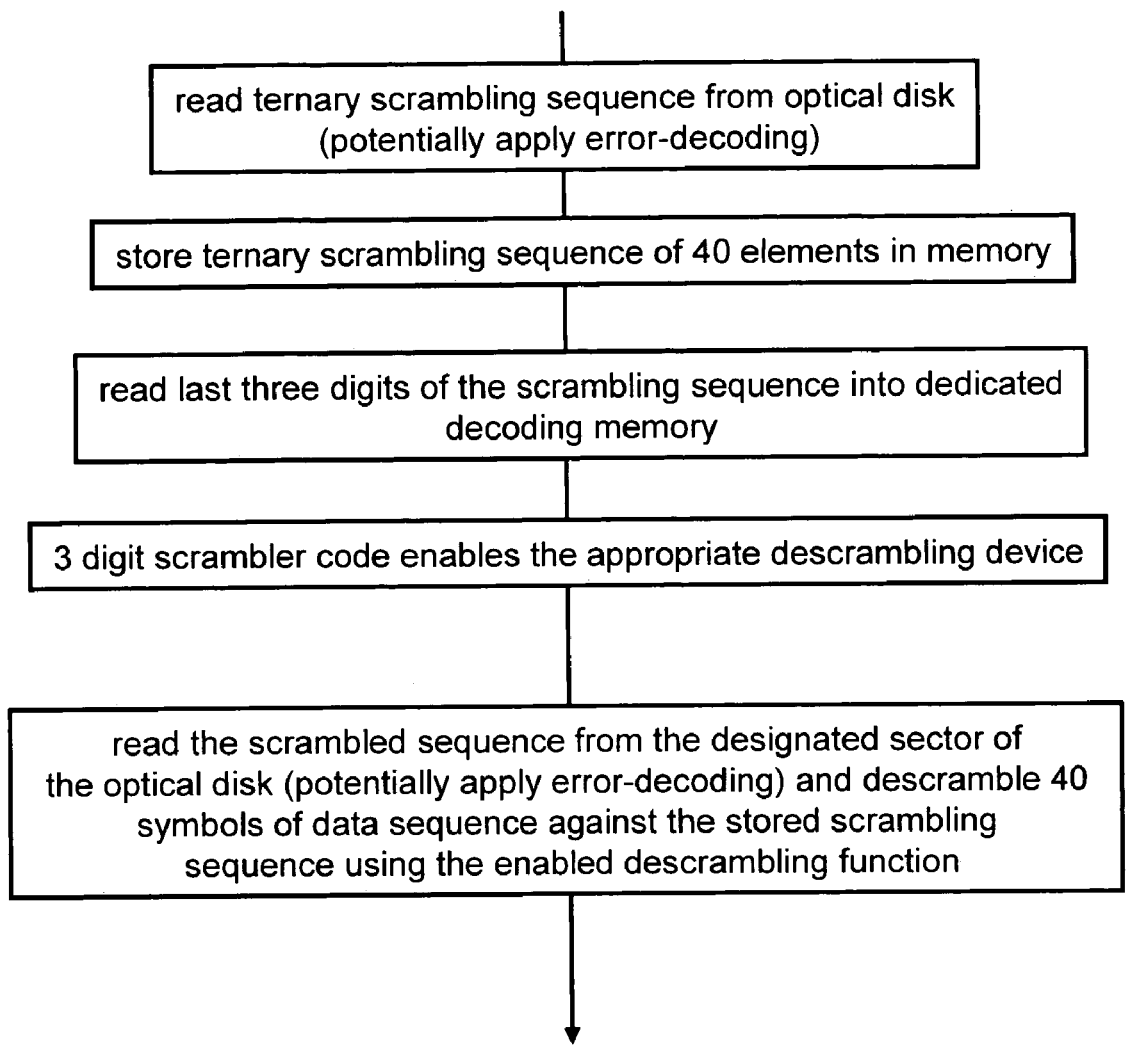
FIG. 18 is a diagram for a descrambling method.

A flow diagram for the descrambling process of the scrambled user-data from the disk is shown in FIG. 18. First the scrambling sequence is read from the disk and (including potentially error-correcting decoding) is stored in a memory device. The last 3 elements of the scrambling sequence are used to select and enable the appropriate descrambling device. If the 3-digit code is [0 1 1] the descrambling function is identical to the function 'scram'. If the code is [2 0 2] the descrambling function should be 'descram_1'.

The next step is to read the scrambled user data from the disk and descramble the scrambled user-data with the scrambling sequence by a device with ternary function 'descram_1'.

U.S. patent application Ser. No. 11/000,218 titled 'Single and composite Binary and Multi-valued Logic Functions from Gates and Inverters' by the inventor describes in detail multi-valued gates and inverters, and is hereby incorporated by reference in its entirety.

The invention of multi-value gates and inverters can be applied in this scrambling and descrambling invention.

Figure 19:
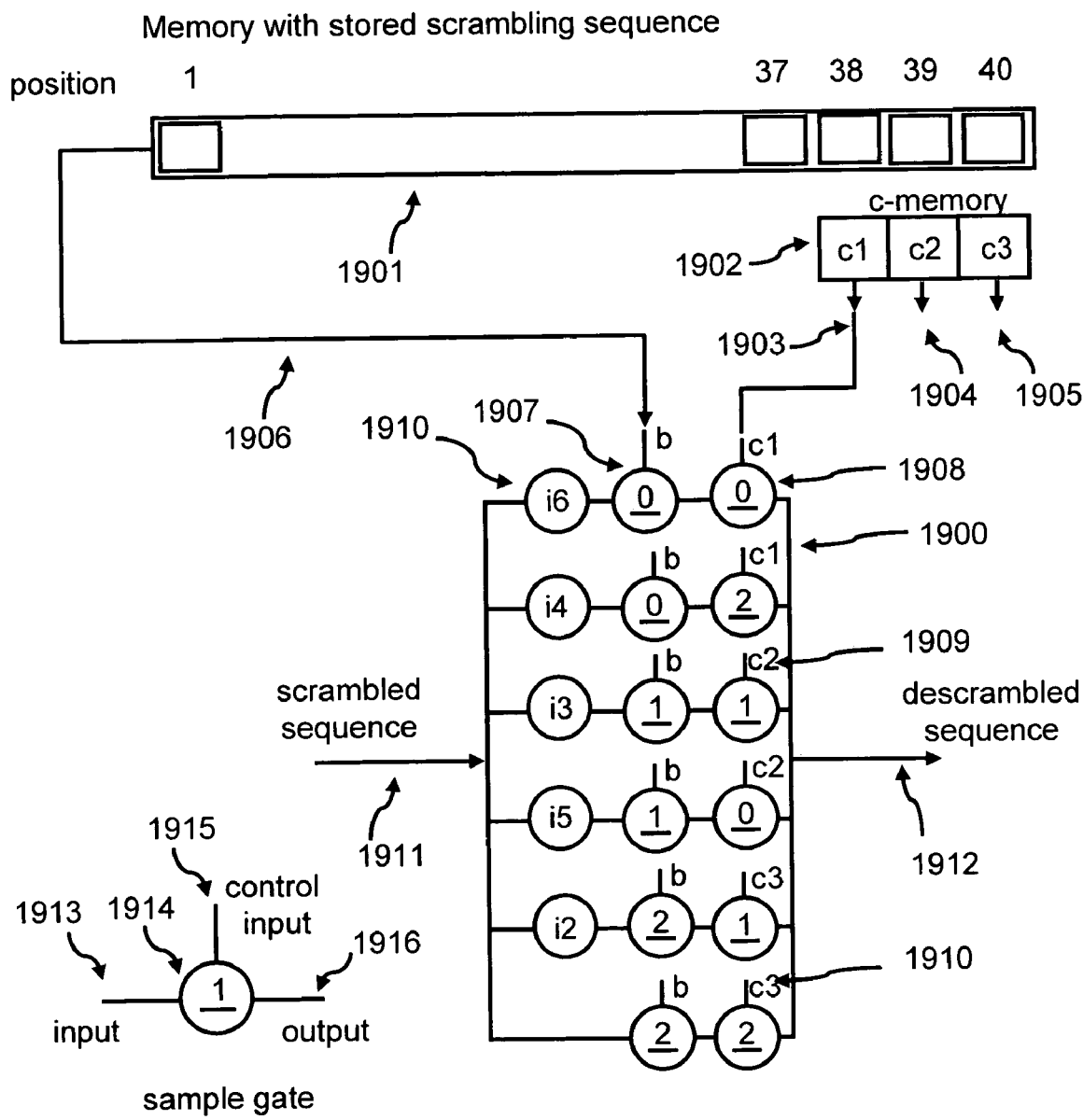
FIG. 19 is a diagram for a gate/inverter based descrambling circuit.

FIG. 19 shows a diagram of a circuit 1900 which can descramble the user-data. The scrambling-sequence 1901 of 40 elements is read from the disk and put in a memory element. Such a memory device could be a binary memory device, representing the ternary symbols as 2 bit binary words, combined with appropriate A/D and D/A converters. It can also be a truly ternary memory device as described in U.S. Provisional Patent Application No. 60/575,948 titled 'Multi-value Coding of Sequences and Multi-value Memory Devices' and in U.S. Provisional Patent Application No. 60/599,781 titled 'Multi-valued digital information retaining elements and memory devices.'

The last three elements 38, 39 and 40 of the scrambling sequence can be put in a dedicated 3 element memory device 1902. The first element of this memory device is called c1 and its content is outputted on 1903, the second element is c2 and its content is outputted on 1904 and the third element is c3 and its content is outputted on 1905. When the user-data is scrambled by function 'scram' the applied code, and consequently the values of [c1 c2 c3] is [0 1 1]. When the scrambling function was 'scram_1' the content of [c1 c2 c3] is [2 0 2].

The descrambling circuit 1900 is comprised of 6 branches containing inverters and 2 individually controlled gates. The first branch will be described in detail. It contains an inverter 1910, with function i6. A first individually controlled gate 1907 in this and each other branch is controlled by a signal 'b', representing the current element of the scrambling sequence 1901 outputted on 1906. The output 1906 which provides the current read element of the scrambling sequence 1901 is connected to all control inputs of the first gates in each branch.

As an example an individually controlled gate 1914 is shown in diagram as a circle with inside the circle a horizontal line and a number. The horizontal line means that the gate is conducting for a certain control signal provided by its control input 1915. The control signal for which the gate is conducting is shown as the number inside the circle. The gate 1914 is conducting from its input 1913 on the left to its output 1916 on the right as shown in the diagram. The 'sample gate' 1914 is thus conducting between input and output when the control input provides a signal 1.

Each branch in the circuit also has a second individually controlled gate. In the first branch this is the gate 1908. This gate is controlled by one of the three elements of the memory element with the scrambler code [c1 c2 c3]. In this case the gate 1908 has as its control input 1903, which is the first output of the memory element 1902. Two other branches have a second individually controlled gate controlled by the signal on the second output 1904 of 1902. An example of this is the gate with control input 1909. Two different and other branches have a second individually controlled gate controlled by the signal provided by the signal on the third output 1905 of 1902. The second gate with control input 1910 is an example of that.

Each branch also contains a ternary inverter, except the last branch which has no inverter and may be considered having identity inverter i1. The input to the circuit, the scrambled sequence read from the disk, will 'see' a certain inverter when both gates in a branch are conducting. Consequently when gates 1907 and 1908 are conducting the signal on input 1911 'sees' inverter 1910 and its inverted value is outputted on 1912.

As a consequence: when [c1 c2 c3] is [0 1 1] the circuit can execute the function 'scram' as the signals [0 1 1] will enable the branches with inverters i6, i3 and i2. When [c1 c2 c3] is [2 0 2] the circuit can execute the function 'descram_1' as the signals of [2 0 2] will enable the branches with inverters i4, i5 and i1.

Consequently when the scrambling sequence and the scrambled sequence are in sync the circuit of FIG. 19 will generate the descrambled user-data.

The following table shows the user-data in row 1, the scrambling sequence in row 2, the scrambled sequence according to scrambling with function 'scram' in row 3 and the result when function 'descram_1' is used to descramble in row 5, demonstrating that a matching pair of scrambling/descrambling functions has to be used.

| 1 | User-data | 20112210211222012212012000010002121121010 |
|---|---|---|
| 2 | scrambling sequence | 11120010122212211210112201202100121210111 |
| 3 | scrambled sequence | 21020002222121002100101021010120010221100 |
| 4 | | |
| 5 | descrambled sequence | 02122211022101010112211012000212111200210 |

Clearly if one does not know which scrambling function was used, the knowledge of the scrambling sequence is not sufficient to descramble the scrambled sequence.

Another way to store the descrambling method on a disk is by storing the inverters that make up the truth table of the required descrambler. The device that realizes the descrambling function is formed by a plurality of memory elements, in the example a plurality of ternary memory elements. Such elements can be formed by binary elements with A/D and D/A converters or by true ternary information retaining devices as described in U.S. Provisional Patent Application No. 60/575, 948 titled 'Multi-value Coding of Sequences and Multi-value Memory Devices' and in U.S. Provisional Patent Application No. 60/599,781 titled 'Multi-valued digital information retaining elements and memory devices.'

The individual memory elements may be addressed by the signals from the descrambling sequence and by the scrambled sequence. The content of the addressed memory element then reflects the relevant inverter value.

Assume that the following table reflects symbolically the truth table of a descrambling function 'descram1'. The truth table is created from inverters represented as columns: [a1 a2 a3]; [b1 b2 b3] and [c1 c2 c3]. Which column is active is determined by the current symbol of the descrambling sequence. The current symbol of the scrambled user-data sequence determines the row of the truth table.

| | | descrambling sequence | | |
|---|---|---|---|---|
| | descram1 | 0 | 1 | 2 |
| scrambled sequence | 0 | a1 | b1 | c1 |
| | 1 | a2 | b2 | c2 |
| | 2 | a3 | b3 | c3 |

So when for example the current symbol in the descrambling sequence is 0, then the symbol in the scrambled user-data sequence 'sees' the inverter [a1 a2 a3].

Figure 20:
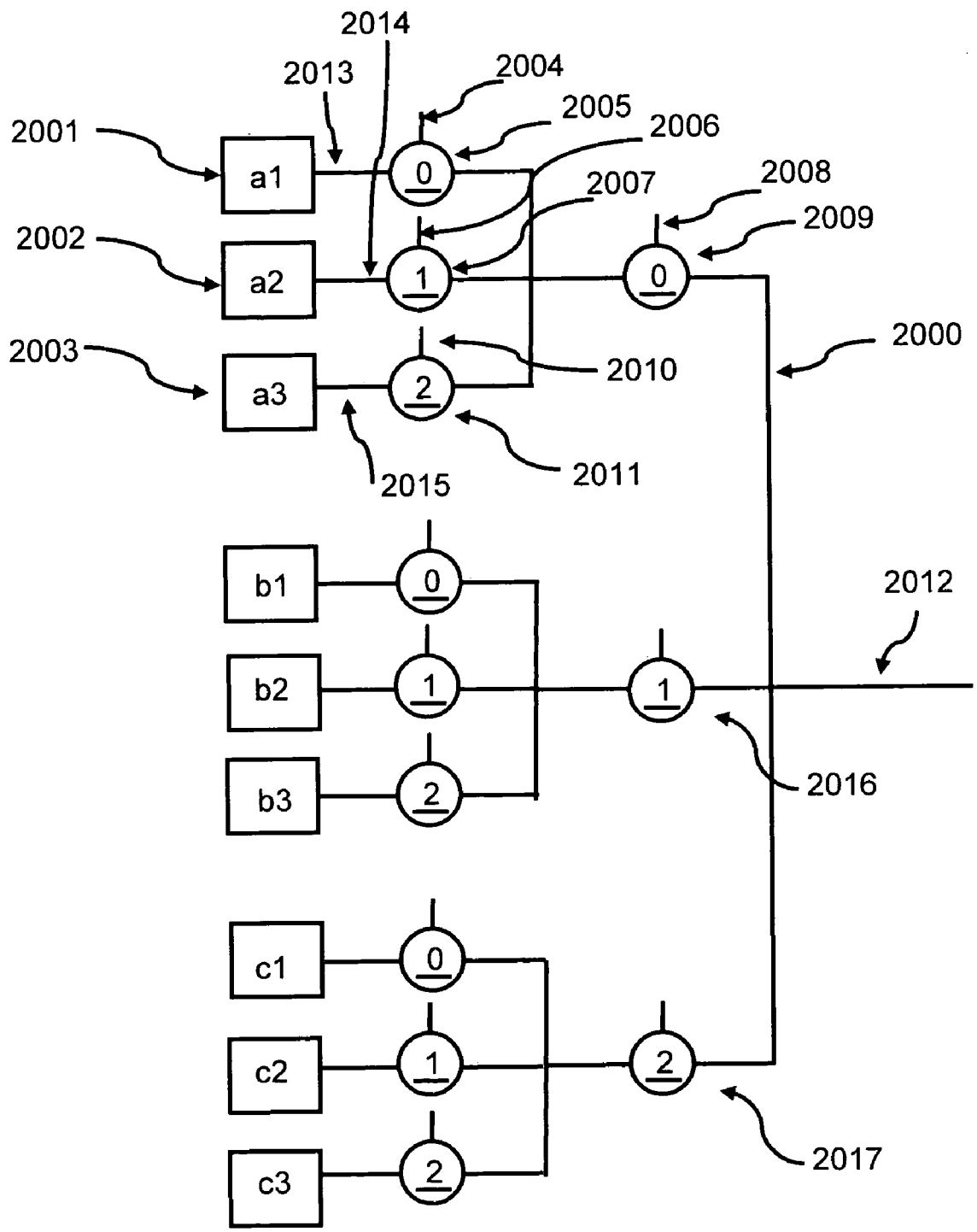
FIG. 20 shows a circuit for storing and reading descrambling information.

This method is shown in part in a diagram in FIG. 20. It is assumed that (not drawn) circuitry reads the data of the inverters from the optical disk and stores each symbol in a memory element. For instance the elements of inverter [a1 a2 a3] are stored in individual memory element 2001, 2002 and 2003. The value a1 of 2001 is outputted on output 2013, the value a2 of 2002 is outputted on output 2014 and the value a3 of 2003 is outputted on output 2015. The same method applies to the memory elements with content b1, b2 and b3 and c1, c2 and c3. One of the signals on these outputs has to be outputted on output 2012, the output of the descrambler 2000.

Only the content of the memory element, addressed by the symbol value of the descrambling sequence and the scrambled user-data sequence, should be outputted on 2012. This is achieved by applying individually controlled gates. The gate 2009 is conducting when its control input is 0. The control input 2008 provides as signal the current symbol of the descrambling sequence. So when the current symbol is 0, the circuit 2000 will generate a1, a2 or a3 on output 2012.

The gate 2016 is conducting when its control input is 1 and gate 2017 is conducting when its control input is 2. The three gates 2009, 2016 and 2017 resolve the issue of addressing the memory element by the current symbol of the descrambling sequence.

The gate 2005 is conducting when its control input 2004 provides a signal 0. The gate 2007 is conducting when its control input 2006 provides a signal 1. The gate 2011 is conducting when its control input 2010 provides a signal 2. The control inputs 2004, 2006 and 2008 provide the value of the current symbol of the scrambled user-data sequence. This method resolves the issue of addressing the memory element by the current symbol of the scrambled user-data sequence.

Consequently the circuit 2000 provides a programmable descrambler for which the method is read from the optical disk.

The descrambling process can use additional methods such as:

1. hiding and/or coding and/or scrambling of the scrambler code [c1 c2 c3]
2. by creating composite scramblers and descramblers
3. changing the actually applied scrambling sequence from the stored scrambling sequence (for instance by breaking up or re-arranging the sequence).

The appropriate use of composite scramblers requires the use of different scrambling sequences. One can create different scrambling sequences from the given scrambling sequence, for instance by starting reading the scrambling sequence from different positions.

Another aspect of this invention is the storage of an additional descrambling method or methods on the storage medium such as an optical disk.

It has been shown as one aspect of inventions described by the inventor in earlier cited patent application Ser. No.

10/935,960 that the output of n-valued LFSR based scramblers, descramblers and sequence generators depends not only on the number of elements of the shift register in the LFSR and the selected functions, and also on to which elements of the shift register a function is connected.

Figure 21A:
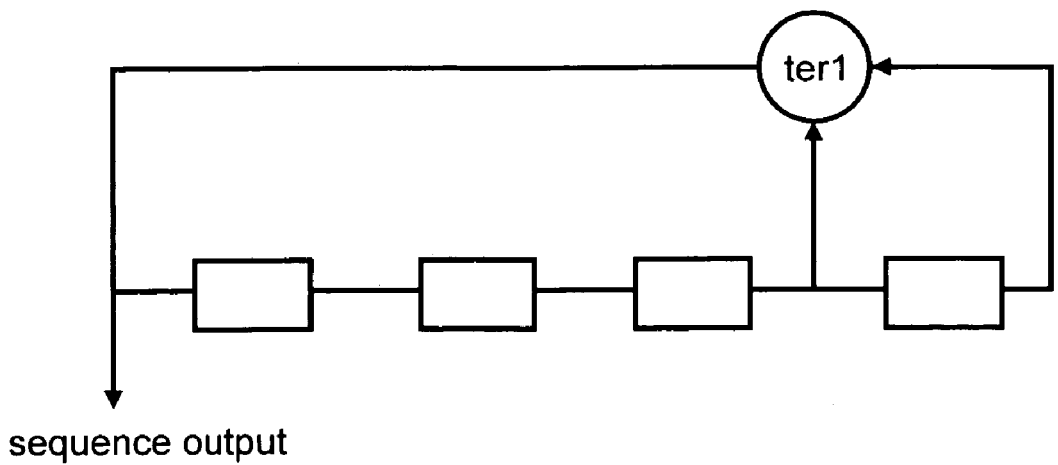
FIG. 21a is a diagram showing one realization of an LFSR based sequence generator.
Figure 21B:
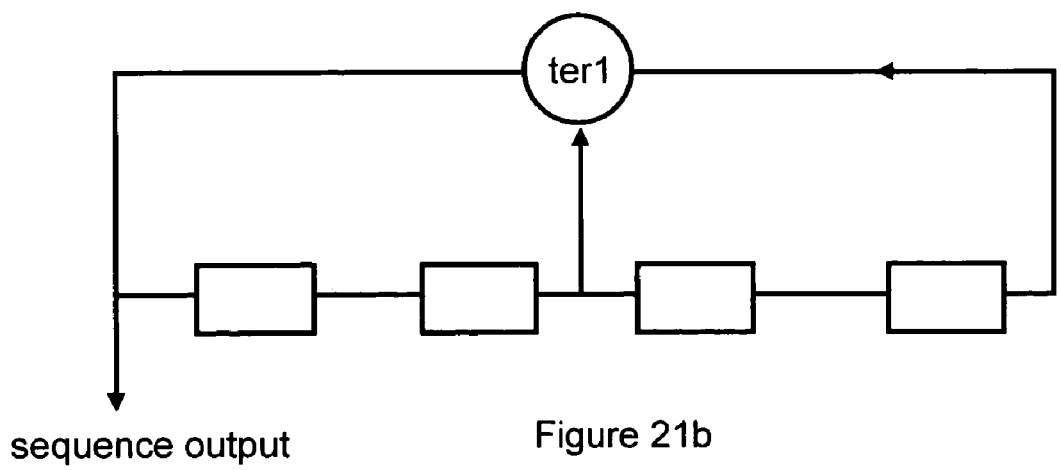
FIG. 21b is a diagram showing a realization of an LFSR based sequence generator.
Figure 21C:
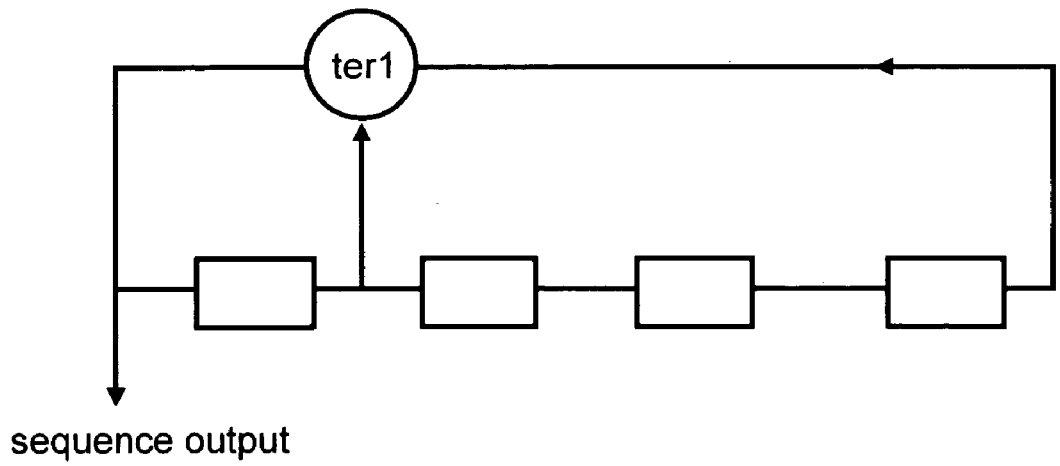
FIG. 21c is a diagram showing a realization of an LFSR based sequence generator.

For illustrative purposes, this is demonstrated in the diagram of a ternary, LFSR based, sequence generator as shown in FIGS. 21a, 21b and 21c. All three sequence generators apply the same single ternary logic function 'ter1' of which the truth table is shown in the following table.

| ter1 | 0 | 1 | 2 |
|------|---|---|---|
| 0    | 1 | 2 | 0 |
| 1    | 2 | 0 | 1 |
| 2    | 0 | 1 | 2 |

All three sequence generators have an identical 4-element shift register. However the generator of FIG. 21a has as the inputs to the ternary logic device with functions 'ter1' the output of element number 3 and 4 of the shift register.

The generator of FIG. 21b has as the inputs to the ternary logic device with functions 'ter1' the output of element number 2 and 4 of the shift register.

The generator of FIG. 21c has as the inputs to the ternary logic device with functions 'ter1' the output of element number 1 and 4 of the shift register.

Each generator, with the same initial content of the shift register at [0 0 0 0] will generate different sequences of 80 elements. (It is to be understood that a clock signal and a counter circuit needs to be included in the circuitry. In order not to make the drawings too complicated this additional circuitry has been omitted in the drawings.)

The following table shows the different ternary 80-element sequences:

| | |
|---|---|
| FIG. 20a | 11120010122212211210112201202100121211110002110102220220020100221021201102020000 |
| FIG. 20b | 11221111002200001122111100220000112211110022000011221111002200001122111100220000 |
| FIG. 20c | 12010010121211002120022011121022122211110210110102020011202112210002012202220000 |

These 3 sequences are different. In fact the sequences generated by the diagram of FIG. 21a and of FIG. 21c are m-sequences.

Consequently, if a sequence generator or descrambler is to be used locally, which has to be related to the structure of a specific generator or scrambler, then it should have the right connections between shift register outputs and function input to work correctly.

One may thus leave a local sequence generator or descrambler in a not configured or programmable state and store information of the correct configuration on the storage medium such as optical disk on a pre-determined track and a pre-determined code. The configuration information, read from the disk, can be used to correctly configure the connections between shift register elements and inputs of logic devices. This may be achieved for instance by using individually controlled gates, which are conducting when a signal provided by a control input has a certain state.

Figure 22:
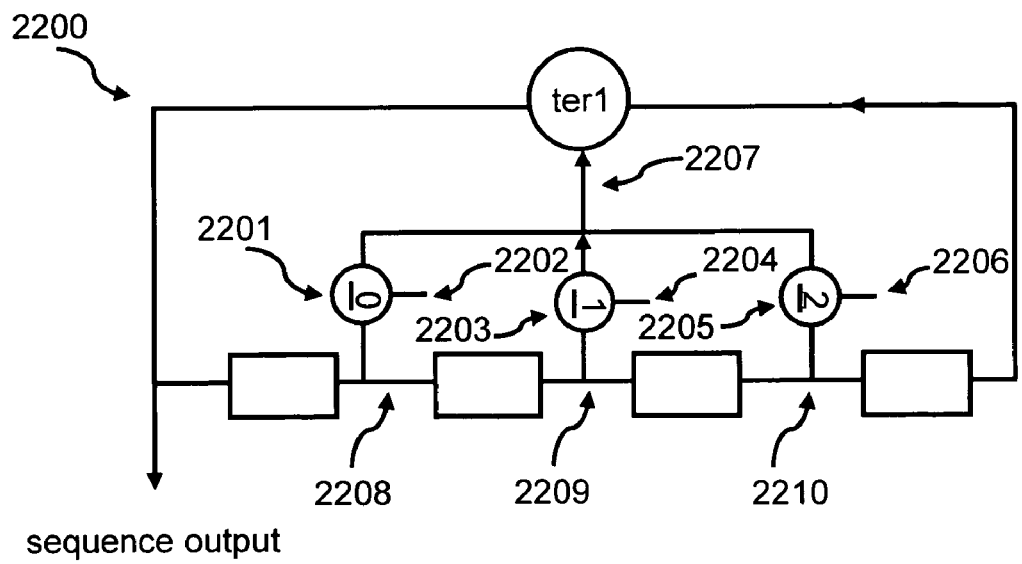
FIG. 22 is a diagram showing a realization of an LFSR based sequence generator.

The circuit of which a diagram is provided in FIG. 22 may serve as an example of this approach.

The circuit of FIG. 22 potentially can be configured to act as each of the sequence generators of FIGS. 21a, 21b and 21c. Its exact function will depend on which of the three individually controlled gates 2201, 2203 or 2205 is in a conducting state.

When the signal provided by control input 2202 is 0 then the gate 2201 will be conducting and the output 2208 of the first element of the shift register will be connected with the input 2207 of the ternary device with function 'ter1'.

When the signal provided by control input 2204 is 1 then the gate 2203 will be conducting and the output 2209 of the second element of the shift register will be connected with the input 2207 of the ternary device with function 'ter1'.

When the signal provided by control input 2206 is 2 then the gate 2205 will be conducting and the output 2210 of the third element of the shift register will be connected with the input 2207 of the ternary device with function 'ter1'.

The control inputs 2202, 2204 and 2206 all will be provided with the same signal, read from a designated position of the disk, and if necessary error-decoded and/or descrambled. That signal determines the output sequence of the sequence generator of FIG. 22. A similar approach can be applied to other LFSR based circuits, like descramblers.

Figure 23:
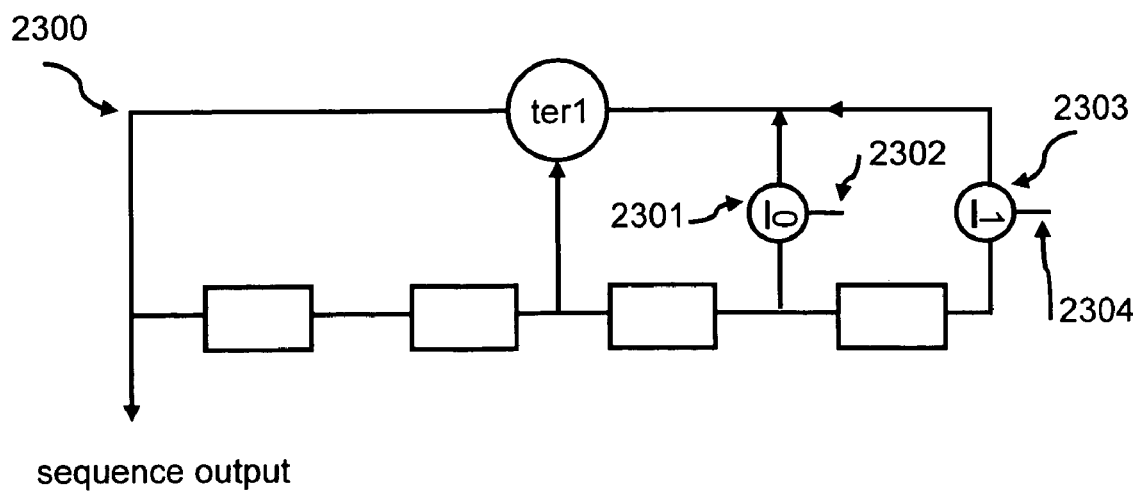
FIG. 23 is a diagram showing a realization of an LFSR based sequence generator.

Another aspect of this invention to store methods for a scrambler, descrambler or sequence generator is shown in FIG. 23, wherein the number of active elements in a shift register can be determined by an external signal. As before, that signal can be provided from reading a specific segment on a storage medium, such as an optical disk.

This aspect of the invention is demonstrated by the diagram of FIG. 23. Circuit 2300 is a ternary sequence generator. It has two individually controlled gates: 2301 and 2303. Gate 2301 is conducting when the control input 2302 provides a signal '0'. In that case the sequence generator will use 3 elements of the shift register. Gate 2303 is conducting when its control input 2304 provides a signal 1. It is assumed that the signal to inputs 2302 and 2304 are provided by the same source. Consequently the conducting state of gates 2301 and 2303 are mutually excluding and when gate 2303 is conducting then gate 2301 is non-conducting and the sequence generator will apply a 4 element shift register.

The following table shows the first 80 symbols generated by the circuit of FIG. 23 when the sequence generator is 3 elements LFSR based and when it is 4-elements LFSR based. The initial content of the register is [0 0 0 0].

| | |
|---|---|
| 3-elements | 11201022020001120102202000112010220200011201022020001120102202000112010220200011 |
| 4-elements | 11221111002200001122111100220000112211110022000011221111002200001122111100220000 |

Combining Methods.

It should be clear that by applying the different aspects of this invention, one can determine from a storage medium, such as an optical disk:

1. the functions to be used in descramblers and sequence generators
2. the length of the shift registers to be used in descramblers and sequence generators
3. the LFSR taps from shift register elements to be used in sequence generators and descramblers
4. single or multiple sequences to be used in descramblers.
5. the order of functions and devices to be used One can use these methods individually or combined.

value everywhere else. Assuming correlation calculation with adding 1 when symbols are identical and nothing when symbols are different, the correlation values are [63 15]. The statistical properties of the symbols are those of an m-sequence (16 symbols 3, 16 symbols 2, 16 symbols 1 and 15 symbols 0). For synchronization purposes it is not always necessary to have an m-sequence. One could for instance take the current sequence and remove 8 symbols, leaving 55 symbols in the sequence. That would still leave a 4-valued sequence with excellent synchronization properties, though not m-sequence like.

A 6-Valued Example.

The following table provides an example of an 80 elements 6-valued sequence with good correlation properties.

| 6-valued sequence | 22530200145110432520115423444002405231411340422435554430503515025005433535251003 |
|---|---|

Additional Examples

An important aspect of this invention is that n-valued sequences can be generated with excellent correlation properties: high correlation when sequences match and low correlation when sequences do not match. It has been shown in previously cited U.S. patent application Ser. No. 10/935,960 that for n a prime number, one can generate n-valued m-sequence type sequences. It is possible to generate m-sequence like sequences for n is not a prime number such as n=4 and n=8.

It is also possible to generate 'high matching correlation'/low non-matching correlation' sequences with LFSR based generators for n=4, n-6 and n=8.

One, 4-valued example is provided for illustrative purposes. The following 4-value sequence of 63 elements is generated by a 4-valued 3 elements shift register based LFSR sequence generator. The generator applies 2 4-valued logic functions of which the truth table are provided in the following tables.

| ter41 | 0 | 1 | 2 | 4 |
|---|---|---|---|---|
| 0 | 0 | 1 | 2 | 3 |
| 1 | 2 | 3 | 0 | 1 |
| 2 | 3 | 2 | 1 | 0 |
| 3 | 1 | 0 | 3 | 2 |

| ter42 | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

Figure 24:
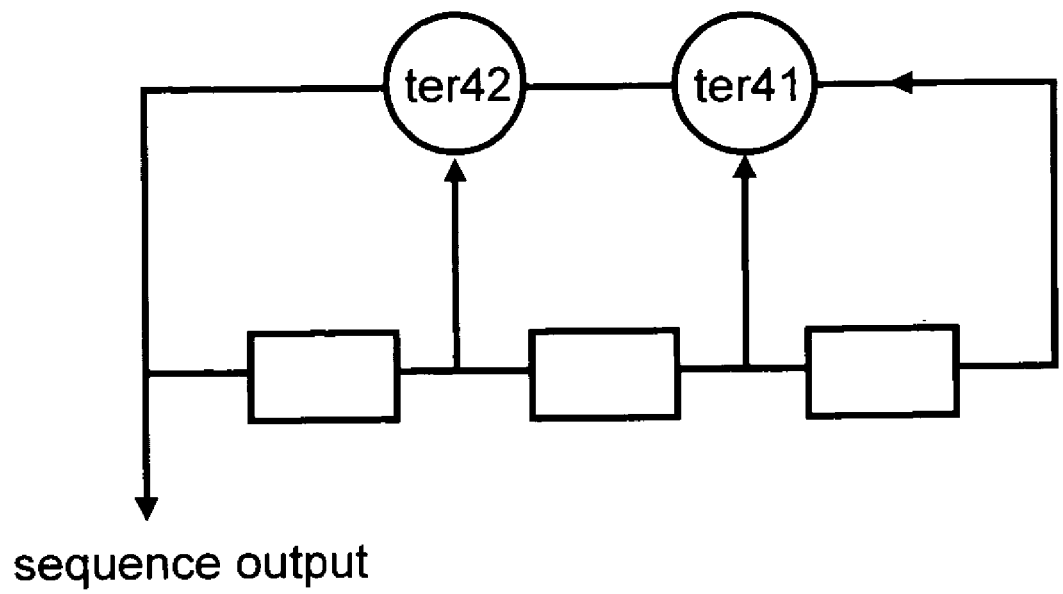
FIG. 24 is a diagram of a 4-valued LFSR based sequence generator.

The configuration of the 4-valued generator is shown in FIG. 24.

The sequence generated by this generator is shown in the following table.

Figure 25:
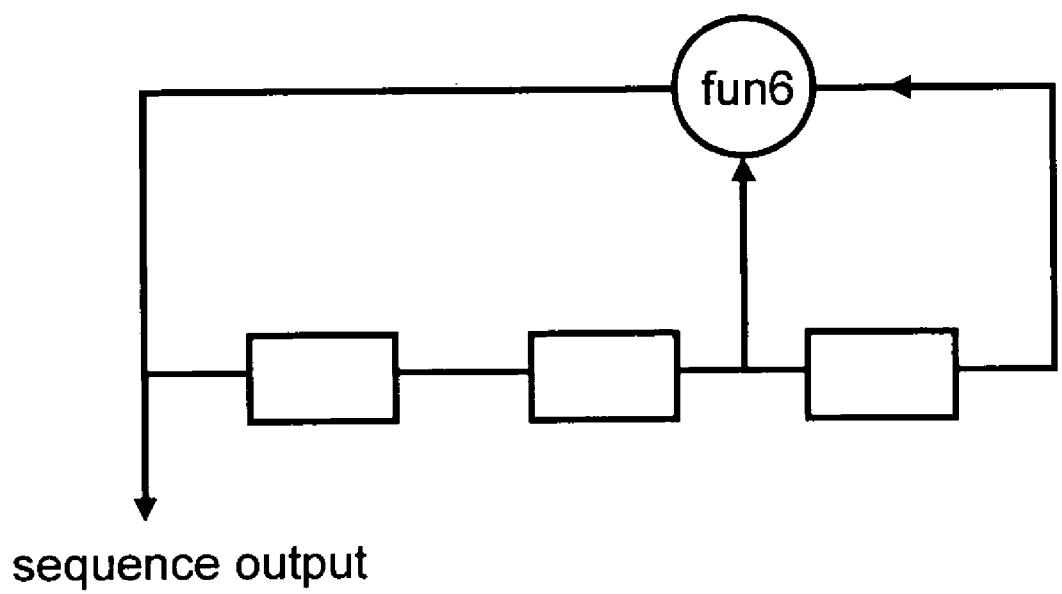
FIG. 25 is a diagram of a 6-valued LFSR based sequence generator.

A diagram of the 6-valued LFSR based sequence generator to create this sequence is shown in FIG. 25, with a 3-element shift register. The initial content of the shift register is [1 2 3]. The truth table of the 6-valued logic function 'fun6' in the sequence generator is shown in the following table.

| fun6 | 0 | 1 | 2 | 3 | 4 | 5 |
|---|---|---|---|---|---|---|
| 0 | 4 | 5 | 0 | 1 | 2 | 3 |
| 1 | 3 | 4 | 5 | 0 | 1 | 2 |
| 2 | 1 | 2 | 3 | 4 | 5 | 0 |
| 3 | 0 | 1 | 2 | 3 | 4 | 5 |
| 4 | 2 | 3 | 4 | 5 | 0 | 1 |
| 5 | 5 | 0 | 1 | 2 | 3 | 4 |

The sequence thus generated is not a maximum-length sequence. One can let the generator add more symbols if required. When limited to 80 symbols the maximum correlation value (assuming adding 1 when symbols are identical and nothing when symbols are different) is 80 and the maximum cross-correlation is 19 or written as [80 19].

One can use this 6-valued sequence for synchronization purposes, determining a digital sum or with correlation properties, in the same way as explained for the ternary example.

Some aspects of the 'descrambled sequence' method to determine a digital sum will be further explained with this 6-valued example. The sequence generated by the LFSR based sequence generator only requires an initial content of the shift register and a controlling clock (not shown, but assumed) to be generated. Internally only the 6-valued device with logic function 'fun6' can actively change the signal. There is no external signal (except the clock signal, which has a circuit control purpose) that influences the generated signal, and in that sense the generator is different from for instance an LFSR based scrambler.

| 4-valued sequence | 303212003302311121130101323001103122232210202131002201233313320 |
|---|---|

Figure 26:
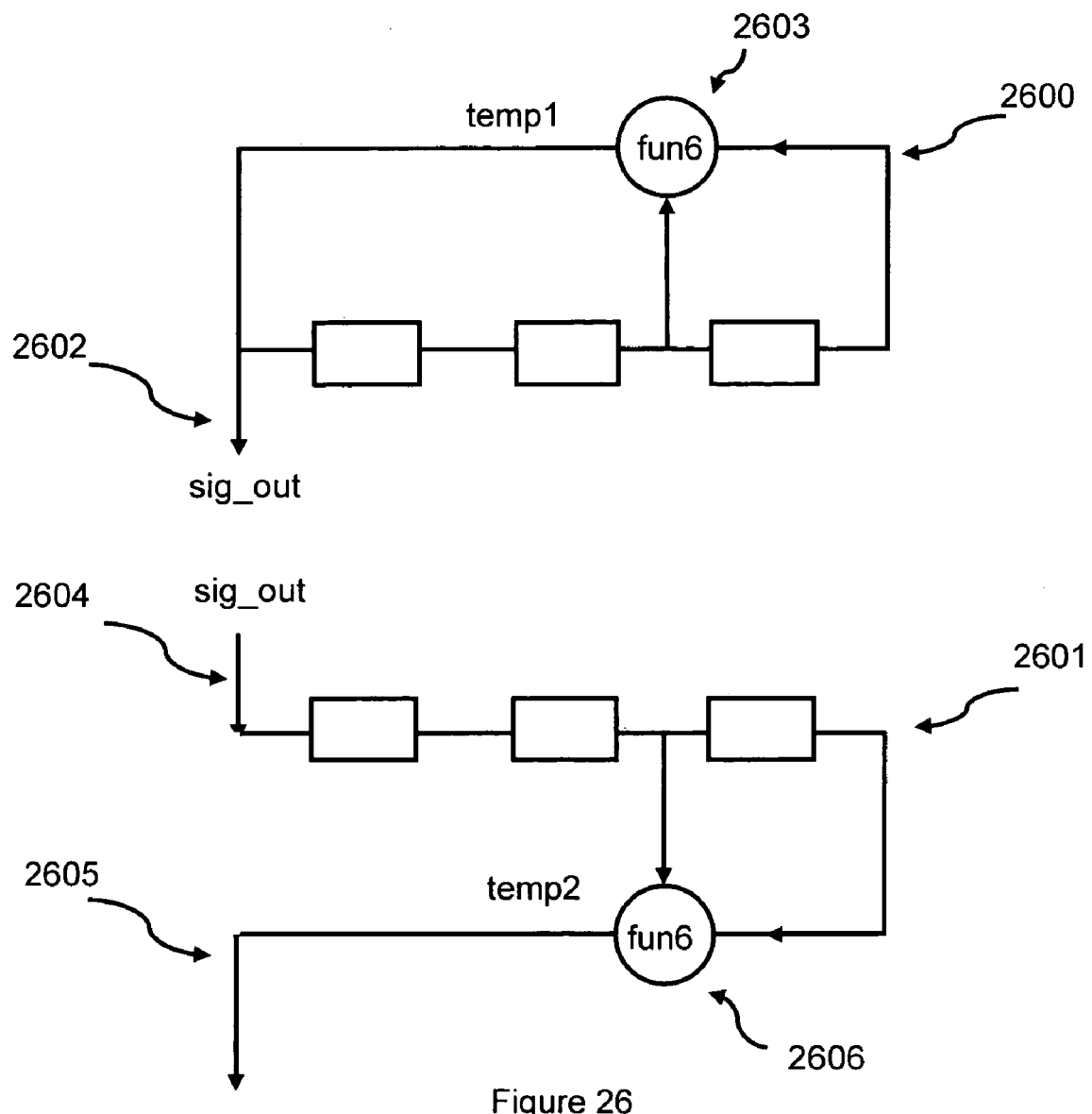
FIG. 26 is a diagram of a 6-valued LFSR based sequence generator with a descrambler.

The initial content of the shift register is [0 2 3]. The correlation of this sequence is one of a 4-valued m-sequence, with a sharp maximum value at alignment and a low constant One can create a descrambling circuit for the generator of FIG. 25. The combination of sequence generator and descrambler is shown in FIG. 26. Circuit 2600 is the sequence generator. It creates a sequence 'sig_out' at output 2602. The signal 'sig_out' is identical to the output signal 'temp1' of 6-valued logic device 2603 with logic function 'fun6'. Circuit 2601 is its descrambler. Its input 2604 provides a signal 'sig_out', identical to the output sequence of circuit 2600. The structure of 2601 is a mirror image of 2600: the same shift register and same scrambling function at the same outputs of the shift-register. The only difference with a 'common' descrambler is that in this case there is no connection between 2604 and 2605 other than through the descrambling circuit. In this 'sequence generator'/descrambler construction the output 2605 will provide a signal 'temp2' that is identical to signal 'sig_out'.

This result is an aspect of the invented 'sequence generator'/descrambler combination and applies to any n-valued logic realization of such a 'sequence generator'/descrambler combination.

Figure 27:
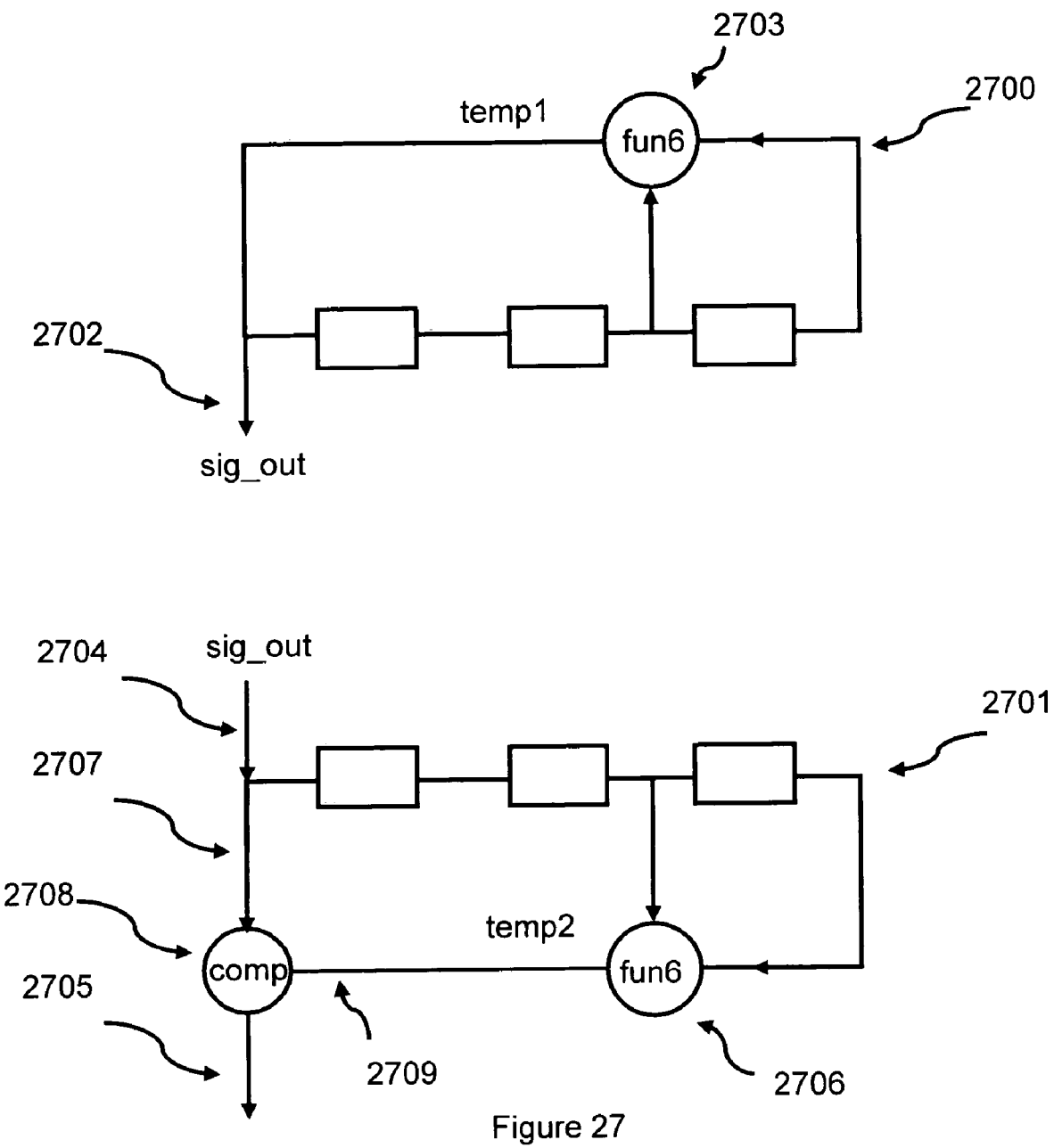
FIG. 27 is a diagram of a 6-valued LFSR based sequence generator with a descrambler.

This result allows for adding a comparing function 'comp'. This is shown in FIG. 27. The descrambling circuit 2701 is identical to the descrambling circuit 2601 of FIG. 26 with an additional comparing device 2708 with function 'comp' between the input 2704 and output 2705 through a connection 2707 and with input signals provided by input 2707 and input 2709.

The following table shows a truth table of a 6-valued truth table of the device 2708 with 6-valued function 'comp' that will generate a 1 on output 2705 when its inputs 2707 and 2709 provide identical signals.

| comp | 0 | 1 | 2 | 3 | 4 | 5 |
|------|---|---|---|---|---|---|
| 0 | 1 | 0 | 0 | 0 | 0 | 0 |
| 1 | 0 | 1 | 0 | 0 | 0 | 0 |
| 2 | 0 | 0 | 1 | 0 | 0 | 0 |
| 3 | 0 | 0 | 0 | 1 | 0 | 0 |
| 4 | 0 | 0 | 0 | 0 | 1 | 0 |
| 5 | 0 | 0 | 0 | 0 | 0 | 1 |

The signals provided by inputs 2707 and 2709, will be identical when the signal provided by 2704 will be identical to the one generated by the output 2702 of circuit 2700. One can change the function 'comp' to meet requirements related to a digital sum and expected statistical performance of other sequences inputted on 2704.

Figure 28:
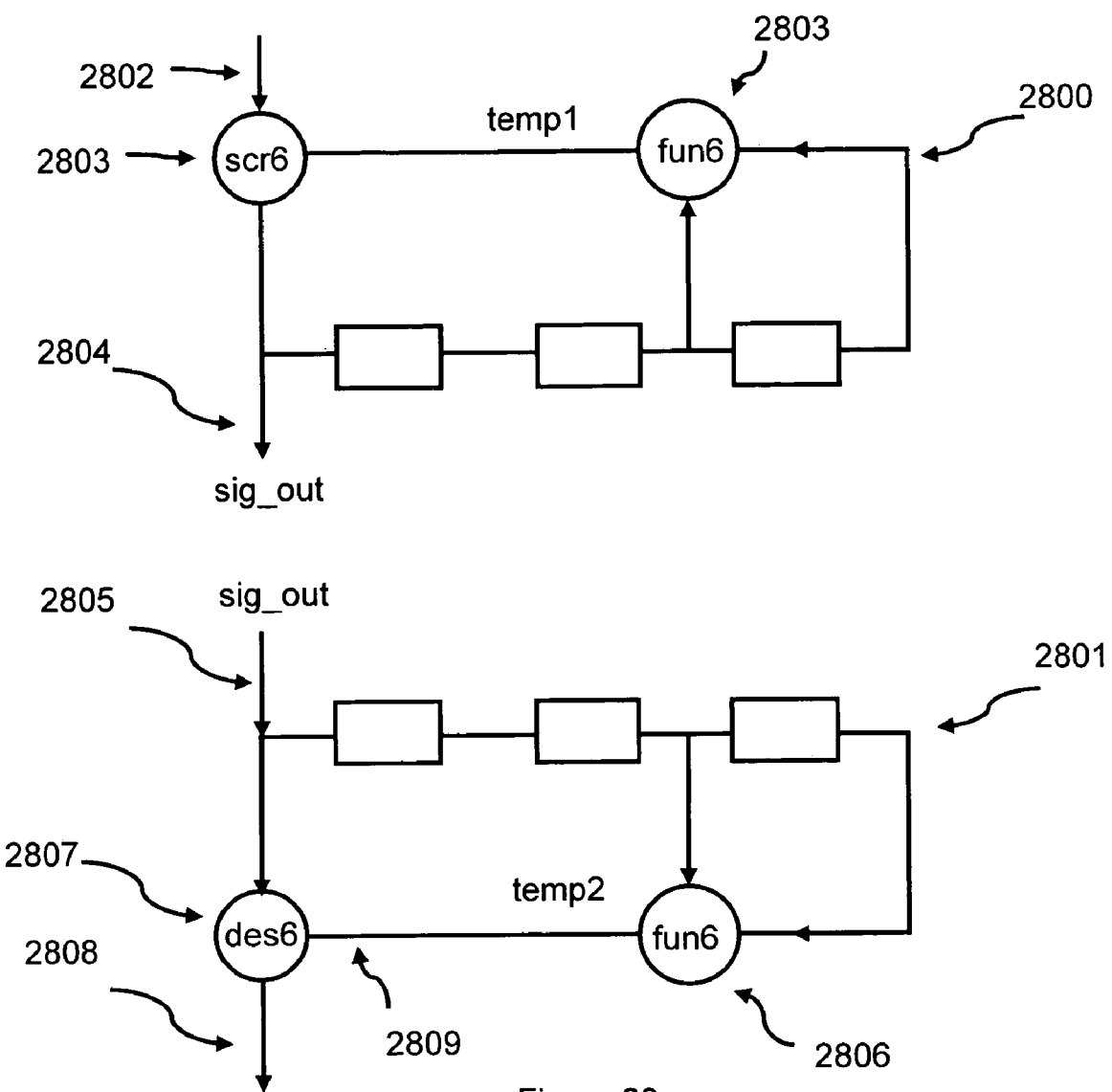
FIG. 28 is a diagram of a 6-valued LFSR based scrambler and descrambler.

In other cases, one may want a descrambled sequence that will have a series of symbols like 0s to initiate an adder, followed by a series of symbols like 1s to be added and a series of symbols with a predefined pattern, like [0 1 2 3 4 5 0 1 2 3 4 5] to validate a sequence. In those cases it may be easier to generate such a sequence externally and put it through a scrambler as shown in FIG. 28. The result of such a scrambler is a scrambled sequence outputted on output 2804. This sequence can be descrambled by the descrambler 2801 and the descrambled sequence is available on out put 2808.

The functions used in scrambler 2800 and descrambler 2801 have to comply with the rules, being one aspect of the invention described in previously cited patent application Ser. No. 10/935,960 explaining as one of the aspects of the invention that the scrambler and descrambler have the same length shift register with the same functions connected to corresponding outputs of elements of the shift register. Also the scrambling device 2803 in the scrambling circuit 2800 has to have a matching descrambling device 2807 in the descrambling circuit 2801 so that the functions of 2803 and 2807 are each others' reversing function. For the signal on output 2808 to be identical to the signal provided by input 2802 it is required that the initial content of the shift registers of 2800 and 2801 are identical. If these contents are not identical, the first 3 symbols of the signal on output 2808 may be different from the signal provided by input 2802 when the signals outputted on 2804 and provided by input 2805 are identical. However after 3 clock-pulses the shift register of circuit 2801 will be flushed and the signals on 2802 and 2808 will be identical. In case of usage in synchronization or data-scrambling one may take the flushing effect into account and make the first 3 elements of read data for synchronization or user-data irrelevant to its performance.

An 8-Valued Example.

The following table provides an 8-valued sequence comprising 127 symbols, with a correlation [127 20], which means a value of 127 when two copies of the sequence are aligned and a maximum of 20 when they are not aligned. The correlation is calculated by adding 1 when compared symbols are identical and nothing is added when they are different.

| 8-valued sequence | 02423261143637554545151020736635056103372042616431672112765567431472332101774074 4640264346772172702503312025633350061573223101 2 |
|---|---|

The sequence is generated by a LFSR based sequence generator which can be described in diagram by FIG. 4. However in this case the shift register is of course an 8-valued shift register and the function 'ter1' in FIG. 4 should be replaced by function 'fun8' of which the truth table is provided in the following table.

| fun8 | 0 | 1 | 2 | 3 | 4 | 5 | 6 | 7 |
|------|---|---|---|---|---|---|---|---|
| 0 | 5 | 4 | 3 | 2 | 1 | 0 | 7 | 6 |
| 1 | 7 | 6 | 5 | 4 | 3 | 2 | 1 | 0 |
| 2 | 6 | 7 | 0 | 1 | 2 | 3 | 4 | 5 |
| 3 | 3 | 2 | 1 | 0 | 7 | 6 | 5 | 4 |
| 4 | 4 | 5 | 6 | 7 | 0 | 1 | 2 | 3 |
| 5 | 1 | 0 | 7 | 6 | 5 | 4 | 3 | 2 |
| 6 | 2 | 3 | 4 | 5 | 6 | 7 | 0 | 1 |
| 7 | 0 | 1 | 2 | 3 | 4 | 5 | 6 | 7 |

The initial content of the 4-element 8-valued shift register is [6 2 7 1].

There are many of this type of sequences, which is to be expected. As the value of the logic is getting higher (and the logic has more different states) it is statistically unlikely that two symbols in shifted sequences match. Even with a very simple correlation scheme (add 1 when there is a match, add nothing when there is not a match) the correlation range improves. The reason for this is that fewer symbols will match at random when sequences are shifted and thus will not contribute to the correlation value.

As described in previous cases, this and other 8-valued sequences can be descrambled and used for determining a digital sum for synchronization purposes. This and other 8-valued sequences can also be used for synchronization by using correlation techniques.

N-Valued Devices.

One can create different n-valued LFSR based single device scrambler and descrambler, composite n-valued scramblers and descramblers, n-valued sequence generators and sequences, and n-valued LFSR based scramblers and descramblers by applying n-valued logic functions created from n-valued reversible inverters as columns or rows in the truth tables of these n-valued functions.

In many cases it will not be immediately apparent what the statistical performance and correlation performance of a circuit is. One way to create a desirable solution is to use a computer program that will use all available n-valued reversible inverters and create and consider all possible n-valued solutions and correlation performances. Based on pre-defined selection criteria, like occurrence of single high correlation peaks and low-cross correlation values, one may then select a preferred solution.

Using P States in N-Valued Logic.

It was suggested in U.S. Pat. No. 6,816,447 titled 'Creation of synchronization marks in multilevel optical data storage' by Lee et. al., that two-level synchronization coding can be used on multilevel coded storage disks. While possible and potentially improving the Signal/Noise ratio, the use of fewer than allowed coding levels does not take advantage of better security, synchronization and correlation performance of multilevel data symbols.

In some circumstances it may be required that one uses m-sequences for synchronization or other purposes. It has been demonstrated by the inventor in earlier cited U.S. patent application Ser. No. 10/935,960 titled 'Ternary and Multivalue Digital Signal Scramblers, Descramblers and Sequence Generators' that p-valued m-sequences can easily be generated by LFSR-based sequence generators, with p being a prime number.

Assume, for illustrative purposes an 8-valued multilevel optical disk. It may be required that a sequence of a certain length and with certain m-sequence like correlation properties is needed. It may, for example, be possible to generate a 7-valued sequence of a certain length with those desirable correlation properties, but a qualifying 8-valued sequence is not available or not easy to generate.

It should be clear that a 7-valued logic is a subset of an 8-valued logic, in which only 7 or the 8 possible states are used. So without changing any of the physical storage properties of the storage medium it is possible to generate and store a 7-valued sequence on a 8-valued multilevel disk. In a more general formulation: it is possible on an n-valued multilevel storage medium to store p-valued symbols when p is not greater than n.

Binary Applications.

Several aspects of this invention can also be applied in binary optical disk solutions. In binary logic there are only 2 reversible inverters of which one is the identity [0 1] and the other is self-reversing [1 0]. This limited number of reversible inverters make composite scramblers and descramblers less secure. However, when sufficient different binary scrambling sequences can be provided on a disk, the methods here invented can also create relatively secure composite scramblers and descramblers, which require access to the storage medium, such as the optical disk.

The two different binary scrambling functions (the Equal and XOR function) can be used to generate different sequence generators. However in some cases one binary sequence generated with a certain generator may generate an inverter version of the sequence generated by the previous generator but with one or more of its scrambling functions changed.

Clearly the method to configure binary LFSR based scramblers, descramblers and sequence generators by storing information of the to be applied configuration on the storage medium or disk, can also be applied in the binary case.

Separate User-Data, Descrambling and Synchronization Sources.

Figure 29:
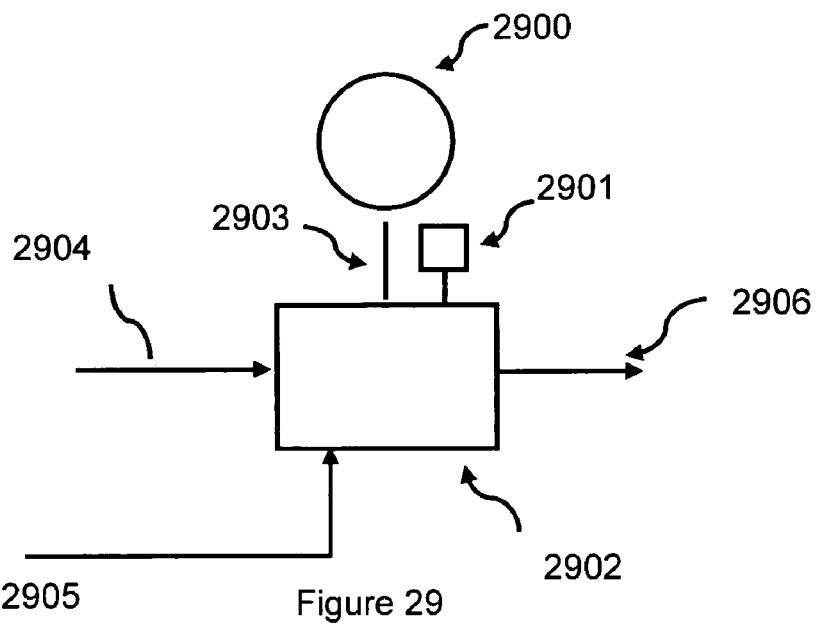
FIG. 29 is a diagram for an optical disk system wherein synchronization and/or descrambling data are provided externally.

It is beneficial to the operating convenience to have user-data, synchronization and descrambling data on the same storage medium such as an optical disk. It is another aspect of this invention to provide the required information to correctly read and descramble an optical disk by way of sources external to the disk or the reading apparatus or system. This can be done by providing critical synchronization and descrambling information from a second optical or non-optical medium, or obtaining that information through wired or wireless communication means. It is also possible to have that information provided manually through a keypad. A diagram of such a method is shown in FIG. 29.

An optical disk system has a rotating optical disk 2900. The optical signal is read from the disk by way of a pickup unit 2901, which may apply a light source and a detector. The signal read from the disk is processed and demodulated in a processing unit 2902. The signal can be used to control the rotating speed of the spindle 2903 as well as the positioning of the pick-up. The processing unit 2902 requires a sequence on the disk to start synchronizing. Such a sequence, or a method to generate a sequence, is provided by an external source 2904 on a 'synchronization and descrambling' data input of the optical disk processing system. Data on an external control input 2905 instructs the system to read a specific segment on the disk, when it is synchronized. The descrambled user-data is outputted on output 2906.

The control system guides the pickup and the spindle to read information from the disk from the right position and at the right speed. The read end-user data will be processed, demodulated, decoded and will be descrambled by 2902, applying the descrambling methods provided by the external source 2904 on the disk drive's external synchronization and descrambling data input. Thus achieving the goal of correctly providing information from an optical disk containing scrambled data.

Realization by Computer Programs.

One aspect of this invention is that the invented methods for synchronization, scrambling and descrambling or generation of sequences can be performed by way of computer programs.

An enablement of synchronization and descrambling of ternary sequences by way of computer programs will be provided as an illustrative example.

The following computer program has as its input a sequence of 38 ternary symbols. This sequence contains one sequence of 16 symbols (7 0s and 9 1s) which are scrambled according to one aspect of this invention. It is meant to serve as a synchronization sequence. A second sequence, immediately following the first sequence [01222222222222210], is meant to represent scrambled user-data. It is also scrambled according to one aspect of this invention, but with a different scrambler configuration. It is assumed that the combined ternary sequence could be a sequence read (potentially after error-decoding) from an optical disk.

According to another aspect of this invention it is possible to find the synchronization sequence and the relevant user-data, all in descrambled mode.

The following table shows the relevant sequences in this method.

```
scrambled sequence  00001022121111221010202220002112112210
'desync'            0020100000111111111xxxxxxxxxxxxxxxxxxx
'descram'           xxxxxxxxxxxxxxxxxx0112222222222210xxxxx
```

The sequence parts containing 'xxxxx . . . ' are placeholders, the system does not have to provide an output or may consider that output as irrelevant.

One can identify the flushing effect of the shift registers in the descrambled sequences, as no care have been taken in this example to provide correct initial content of the shift registers.

The following script of a Matlab computer program executes the following steps:

1. a ternary sequence is descrambled according to the descrambling method, (called 'desync.m' in this program) intended for the synchronization sequence [0 0 0 0 0 0 0 1 1 1 1 1 1 1 1]

2. a procedure 'track.m' intends to catch the 0s in the descrambled sequence and starts adding 1s when detected to a digital sum.

3. the procedure resets when a 0 is detected 4. as soon as the digital sum 9 is reached synchronization is achieved and the next 16 data symbols are user-data 5. the scrambled data representing user-data is descrambled with a method 'descram.m' and generates a sequence of descrambled user-data All programs are scripted for arrays and vectors in origin 1. Consequently one should subtract 1 from all arrays and vectors to obtain origin 0 results.

track.m

```
% find sync and start descrambling user-data
% all arrays and vectors are in origin 1
sig=[1 1 1 1 2 1 3 3 2 3 2 2 2 3 3 2 1 2 1 3 1 3 3 3 3 1 1 1
3 2 2 3 2 2 3 3 2 1];
% syncsig=1 means synchronization is achieved
syncsig=0;
% count0 counts the number of 0s
count0=0;
% count1 counts the number of 1s or digital sum
count1=0;
% lastdig checks what the last digit was
lastdig=0;
% counts down number of data symbols
countdata=0;
% maysync=1 means there are consecutive zeros
maysync=0;
lent=size(sig);
len=lent(2);
% initiates the shifregister for the synchronization descrambler
shiftreg1=[3 2 3];
% initiates the shift register for the user-data descrambler
shiftreg2=[1 2 3 2];
for i=1:len
if syncsig==0
beb=desync(shiftreg1,sig(i));
shiftreg1=beb(1:3);
temper=beb(4);
aaa=eq(temper,1);
bbb=eq(lastdig,2);
bbc=eq(lastdig,1);
bbd=eq(lastdig,3)
rrr=bbb*aaa;
rrc=bbc*aaa;
aab=eq(temper,2);
ccb=eq(maysync,1);
rrb=aab*ccb;
res(i)=beb(4);
if rrr==1
```

-continued

```
count0=1;
count1=0;
maysync=0;
elseif rrb==1
count1=count1+1;
if count1==9
syncsig=1
end
elseif rrc==1
count0=count0+1;
if count0>4
maysync=1;
end
elseif bbd==1
count0=0;
maysync=0;
count1=0;
end
lastdig=temper;
else
countdata=countdata+1
shiftreg2
sig(i)
bel=descram(shiftreg2,sig(i));
shiftreg2=bel(1:4);
data(countdata)=bel(5);
res(i)=bel(5);
if countdata==16
syncsig=0;
countdata=0;
count0=0;
count1=0;
lastdig=0;
maysync=0;
end
end
end
desync.m
function y=desync(a,b)
% descramble the sync sequence
funtempq1=[1 3 2;3 2 1;2 1 3];
funtemp1=[1 2 3;2 3 1;3 1 2];
%dfuntemp1=[1 3 2;2 1 3;3 2 1];
dfuntemp1=[1 2 3;3 1 2;2 3 1];
%shifts1=[1 3 2];
shifts1=a;
in1=shifts1(3);
in2=shifts1(2);
rtemp11=funtempq1(in2,in1);
rtemp1=dfuntemp1(rtemp11,b);
res1=rtemp1;
shifts1(3)=shifts1(2);
shifts1(2)=shifts1(1);
shifts1(1)=b;
y=[shifts1 res1];
descram.m
function y=descram(a,b)
% descramble the data sequence
funtempq1=[3 2 1;2 1 3;1 3 2];
funtemp1=[1 2 3;2 3 1;3 1 2];
%dfuntemp1=[1 3 2;2 1 3;3 2 1];
dfuntemp1=[1 2 3;3 1 2;2 3 1];
shifts2=a;
inn1=shifts2(4);
inn2=shifts2(3);
rtemp11=funtempq1(inn2,inn1);
rtemp1=dfuntemp1(rtemp11,b);
res2=rtemp1;
shifts2(4)=shifts2(3);
shifts2(3)=shifts2(2);
shifts2(2)=shifts2(1);
shifts2(1)=b;
y=[shifts2 res2];
```

Additional Shift Register Based Scrambler and Descrambler Configurations.

For operational purposes a distinction is made between scramblers and descramblers. A scrambler is a device or a method that changes the appearance of an inputted digital sequence or signal in such a way that the thus created scrambled output signal is different from its inputted signal. A descrambler is a method or a device that has as its input a scrambled signal, which, when descrambled is identical to the signal that was inputted to the scrambler.

The terms scrambler and descrambler are thus dependent on their position in a communication chain and their distinction is more of a semantic nature, because both scrambler and descrambler change a sequence in appearance, but not in content. In function the actual scrambler and descrambler may sometimes be switched in position. So sometimes a scrambler may become a descrambler and a descrambler may become a scrambler. In some cases (in composite scrambler devices for instance) a scrambler and descrambler may be even be the same devices.

Figure 30:
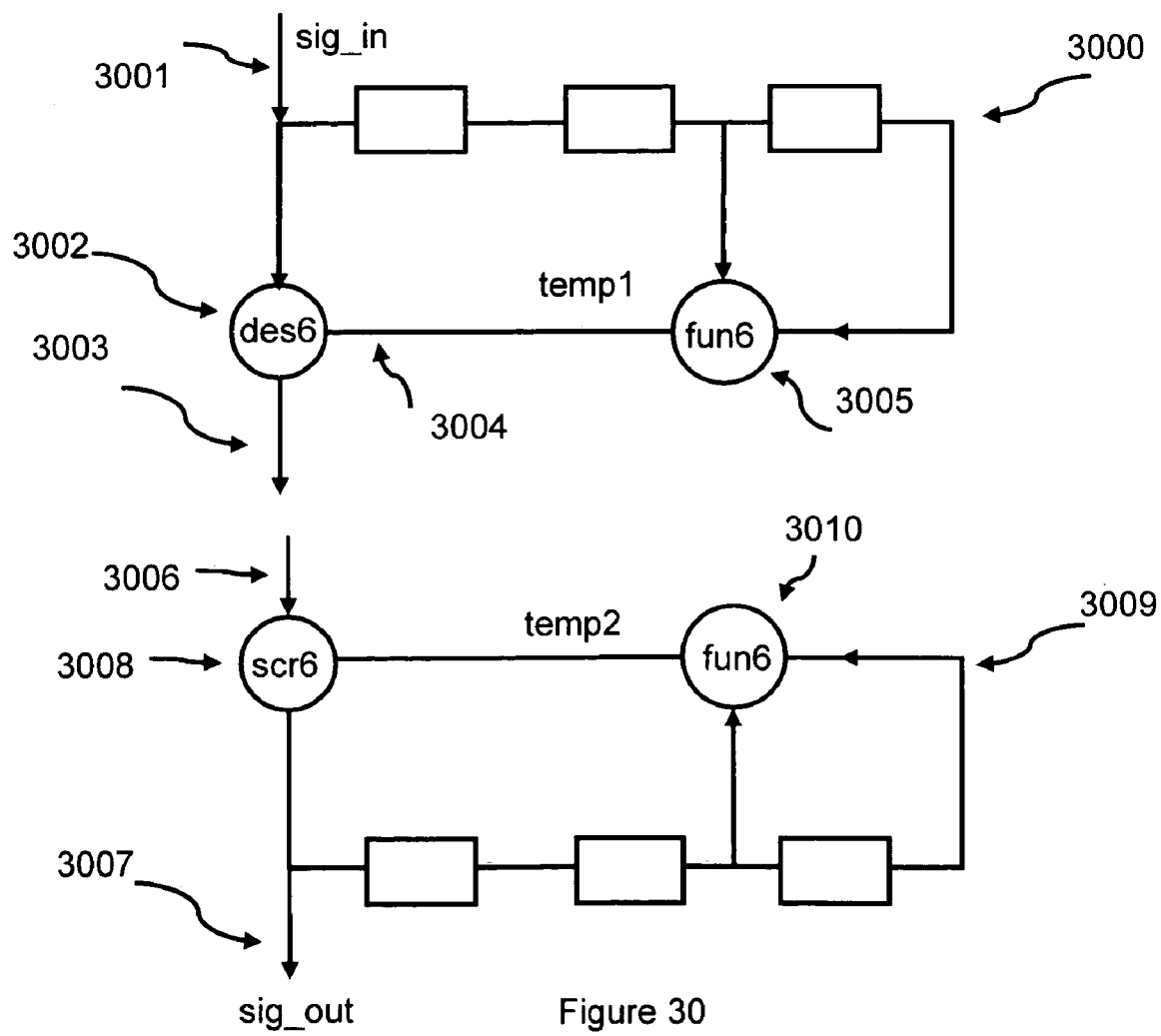
FIG. 30 is a diagram of a matching pair of LFSR-based scrambler/descrambler.

As an illustrative example the diagram in FIG. 30 is provided. This diagram is almost identical to that of FIG. 28. Only in this case the descrambler of FIG. 28 is now the scrambler of FIG. 30. And the scrambler of FIG. 28 is now the descrambler of FIG. 30. There are (especially in LFSR based scramblers and descramblers) some important considerations related to the ease and security of operations.

This principle is illustrated in FIG. 31. A device 3102 has an input 3101 and an output 3103. The device 3102 changes external signal 'sig1' provided by input 3101 by executing a function 'sc' into 'sig2' provided on output 3103 by the device. A device 3105 has an input 3104 and an output 3106. The device changes a signal 'sig2' provided by input 3104 (and on output 3103) by executing a function 'ds' into 'sig1' provided by the device on output 106. One may say 3102 changes the external signal and 3104 recovers the external signal from the changed signal.

FIG. 32 shows the same devices 3102 and 3104 with the same inputs and same signals, but in a different order. Also the signal 'sig2' is now the external signal. One may say that 3104 changes the external signal and 3202 recovers the external signal from the changed signal.

There may be conditions to be fulfilled to exchange the role of scrambler and descrambler. For instance the descrambler of FIG. 30 requires the correct initial content of the shift register to correctly descramble. One cannot apply the 'flushing effect' of the shift registers in this case. This property can be applied to increase the security if one is willing to add a synchronization and shift-register initiation circuit for correct operation of the descrambler.

The circuit of FIG. 26 implies that feedback is not always required for a descrambler to work. Building upon that one can create a descrambler of which a diagram is shown in FIG. 33. Assume that this descrambler receives a scrambled (ternary) digital signal 'sig_line' on its input 3301. The descrambler has two ternary scrambling devices: 3302 with ternary logic functions 'dsr1' and device 3303 with ternary logic function 'dsr2'. The descrambler further comprises a ternary shift register with elements 3305, 3306 and 3307. All connections (like in FIG. 26) are forward connected, without feedback. A descrambled ternary signal is outputted on output 3304. To keep things simple it is assumed that ternary scrambling functions 'dsr1' and 'dsr2' are identical and self-reversing with the following truth table.

| dsr1 | 0 | 1 | 2 |
|---|---|---|---|
| 0 | 2 | 1 | 0 |
| 1 | 1 | 0 | 2 |
| 2 | 0 | 2 | 1 |

The following table shows the ternary input signal to the descrambler 'sig_line' and its output 'sig_out' when the initial content of the shift register is [0 0 0].

| sig_line | 0110211110021022102102012011111 |
|---|---|
| sig_out | 01211220102101000202101112002 |

Figure 34:
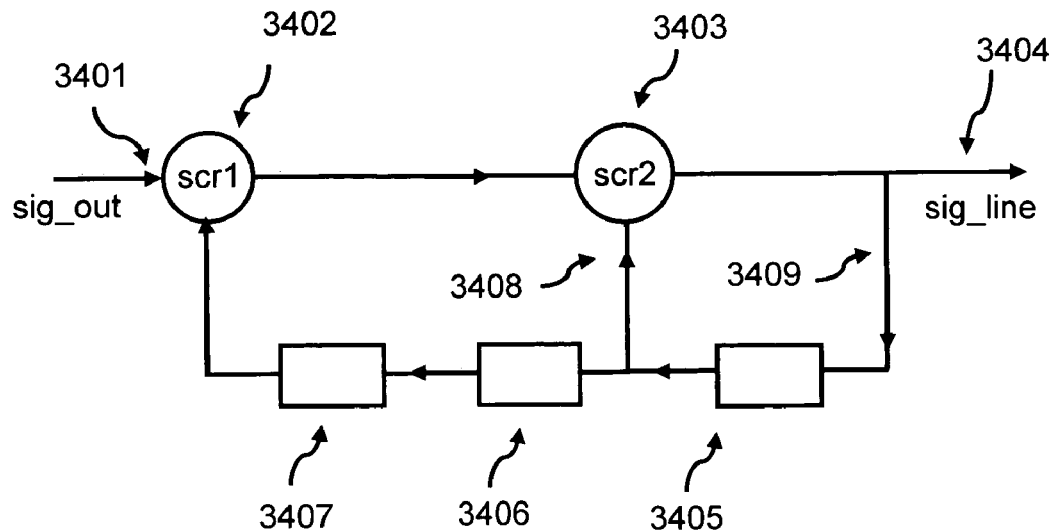
FIG. 34 is a diagram of an n-valued shift register based circuit with feedback.

By 'reversing' the path of the signal one can create a scrambler as shown in FIG. 34 that will have as input a signal on its input 3401 identical to 'sig_out' that will output a signal 'sig_line' on its output 3404 that is identical to the signal 'sig_line' inputted on 3301 of the descrambler in FIG. 33. The scrambler configuration that would work is shown in FIG. 34 with scrambling devices 3402 and 3403 with the ternary logic functions 'scr1' and 'scr2'. For the scrambler configuration to work correctly according to the conditions of the descrambler 'scr1' and 'scr2' have to be identical to the self-reversing ternary scrambling function 'dsr1' of which the truth table was provided and the initial content of the shift register with elements 3405, 3406 and 3407 has to be [0 0 0].

To those skilled in the art it should be clear that that the configurations dealt with as one aspect of the invention are different than the ones also articulated by the inventor in U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS; (3) U.S. Provisional Patent Application No. 60/547,683, filed Feb. 25, 2004, entitled TERNARY AND MULTI-VALUE DIGITAL SCRAMBLERS, DESCRAMBLERS AND SEQUENCE GENERATORS. One reason for this is that in this case the scrambler and descrambler are mirrored versions of each other. Consequently the rules for matching scrambler and descrambler when this configuration is used are different in some aspects related to the matching rules as stated in the cited patent applications. The rules for matching the current ternary and n-valued (n an integer greater than 2) shift register based scramblers and descramblers to form matching pairs in the here invented configuration are:

1. scramblers and descramblers have the same length shift register comprising k elements 2. matching n-valued scrambler and descrambler apply n-valued reversible logic functions as defined in previously cited U.S. Provisional Patent Application No. 60/547,683 and U.S. Non-Provisional patent application Ser. No. 10/935,960.

3. matching n-valued shift register based scrambler and descrambler apply the same number of scrambling functions which cannot be greater than the number k of shift register elements 4. when one of the matching pair circuits has feedback, with the content of the shift register moving from back to front (as in FIG. 34) the matching circuit has no feedback and the content of the shift register moves from front to back as shown in FIG. 33 and vice-versa.

Figure 35:
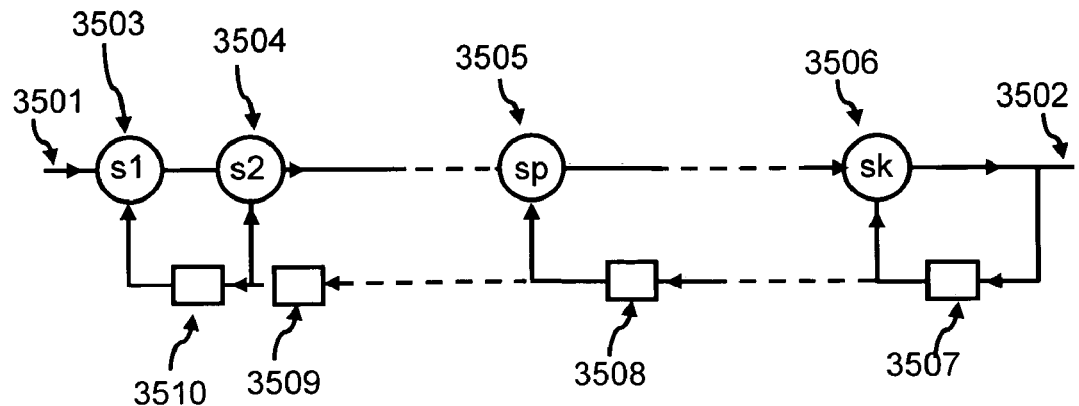
FIG. 35 is a diagram of a generic n-valued shift register based circuit with feedback.
Figure 36:
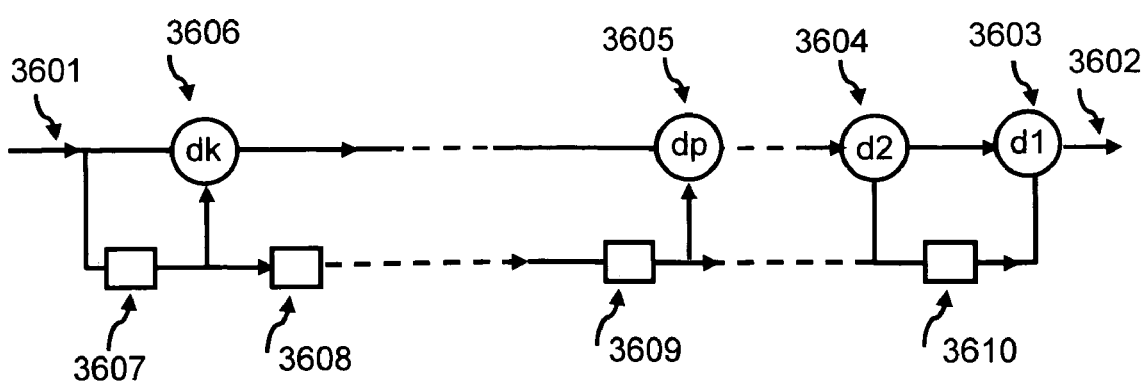
FIG. 36 is a diagram of a generic n-valued shift register based circuit without feedback.

5. in a matching pair of scrambling/descrambling circuits according to one aspect of this invention, the matching circuits have the generic configuration of the circuits of FIG. 35 and FIG. 36.

6. when the first of a matching pair of scrambler/descrambler circuits has a scrambling function 'sp' connected to the output of the $p^{th}$ element of a k-length shifts register (p being determined as counting from the circuit input up to the output) then the matching circuit has a scrambling function 'dp' connected to the output of shift register (k−p+1) being determined as counting from the circuit input up to the output.

7. an n-valued scrambling function 'sp' can be a reversible n-valued function. Its corresponding scrambling function 'dp' in the matching circuit should be the n-valued reversible function that reverses 'sp'.

Consequently in this aspect of applied shift register based scrambler/descrambler circuits the circuits are each others mirror image in structure and in function.

It is one aspect of the invention to change roles for scramblers and descramblers. It is another aspect of this invention to apply the non-feedback circuit of a matching pair as the descrambler. The non-feedback circuit will flush its shift register and will correctly descramble the signal after flushing, even if the initial content of the shift register was not identical to that of the scrambler.

It is another aspect of this invention that different n-valued scrambling functions can be used in the scrambler/descrambler configuration.

Multi-level coding and decoding devices are disclosed in United States Patent Application 2003/0063677 entitled: 'Multi-level coding for digital communication' by Jason A. Mix et. al., which is hereby incorporated by reference.

It is another aspect of this invention to limit the size of the output signal of the scrambler here described by applying the modulo-n addition or modulo-n subtraction functions.

Another aspect of this invention is the multi-valued scrambling of binary data. The scrambling and descrambling methods of this invention allow binary words, comprising n-bits (with n an integer greater than 2) to be considered as a m-valued symbol. The following tables show the truth tables of a 4-valued scrambling function Scr4 and its binary word equivalent Scr42. In this table 4-value 0=[0 0], 4-value 1=[0 1], 4-value 2=[1 0] and 4-value 3=[1 1].

| Scr4 | 0 | 1 | 2 | 3 |
|------|---|---|---|---|
| 0 | 3 | 2 | 1 | 0 |
| 1 | 2 | 1 | 0 | 3 |
| 2 | 1 | 0 | 3 | 2 |
| 3 | 0 | 3 | 2 | 1 |

| Scr42 | 00 | 01 | 10 | 11 |
|-------|----|----|----|----|
| 00 | 11 | 10 | 01 | 00 |
| 01 | 10 | 01 | 00 | 11 |
| 10 | 01 | 00 | 11 | 10 |
| 11 | 00 | 11 | 10 | 01 |

Thus treating a series of bits as a code word for a multi-valued symbol and scrambling those binary words according to the methods of multi-valued scrambling allows for a novel way of scrambling binary data.

Further Clarification of Scramblers and Descramblers.

There are many conceivable schemes, algorithms, coding mechanisms, symbol interleaving schemes and other rule based methods to scramble and descramble multi-valued data symbols. Which method to use depends on several criteria among which can be: ease of use, cost of implementation, statistical quality of the scrambled data, etc. One aspect of this invention is to provide three multi-valued scrambling and descrambling methods, wherein the position of scrambler and descrambler may be exchanged. This exchange may come at an additional cost of synchronization requirements. The first scrambling/descrambling method here provided for scrambling and descrambling of multi-level end-user and synchronization data for storage media such as optical disk is the use of single or composite scrambling functions, each function using a known scrambling sequence as one input sequence to scramble its second input sequence against. An example of this type of scrambler is provided as FIG. 18 of U.S. patent application Ser. No. 10/912,954 entitled: TERNARY AND HIGHER MULTI-VALUE DIGITAL SCRAMBLERS/DESCRAMBLER, which application is hereby incorporated by reference in its entirety. The scrambling/descrambling functions in this type of scrambler or descrambler are reversible multi-level functions defined by the rows or columns of the functions truth tables, such that all rows or all columns represent a reversible multi-value inverter as defined and explained in U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS. A second type of scrambling method applied in the present invention are Linear Feedback Shift Register (LFSR) based multi-value scramblers and descramblers. A first example of this type of multi-level scrambler has been provided in FIG. 10 of U.S. patent application Ser. No. 10/912,954 entitled: TERNARY AND HIGHER MULTI-VALUE DIGITAL SCRAMBLERS/DESCRAMBLER. An example of an LFSR based multi-value descrambler is provided as FIG. 11 of the same United States patent application. The scrambling/descrambling functions in this type of scrambler or descrambler are reversible multi-level functions defined by the rows or columns of the functions truth tables, such that all rows or all columns represent a reversible multi-value inverter as defined and explained in U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS. These functions cannot all be modulo-n addition functions in both scrambler and matching descrambler. The scramblers and descramblers do not need multipliers. Further more all combinations of modulo-n addition functions with multipliers at the inputs or output can be replaced by a single n-valued function. The taps connecting functions to the shift register and the functions should be selected such that the scrambler output sequence will have optimal statistical properties. The cited patent application also defines the rules for creating matching descramblers for LFSR based multi-level scramblers. A third method for multi-level scrambling/descrambling is the method based on shift registers and multi-level logic functions explained in a previous section of the present patent application. The scrambling/descrambling functions in this type of scrambler or descrambler are reversible multi-level functions defined by the rows or columns of the functions truth tables, such that all rows or all columns represent a reversible multi-value inverter as defined and explained in U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS. These functions cannot all be modulo-n addition functions in both scrambler and matching descrambler. The scramblers and descramblers do not need multipliers. The taps connecting functions to the shift register and the functions should be selected such that the scrambler output sequence will have optimal statistical properties.

Applications of Scrambled Synchronization Sequences.

To further explain, examples of circuits 209, 214 and 210 in FIG. 1b will be presented.

Figure 37A:
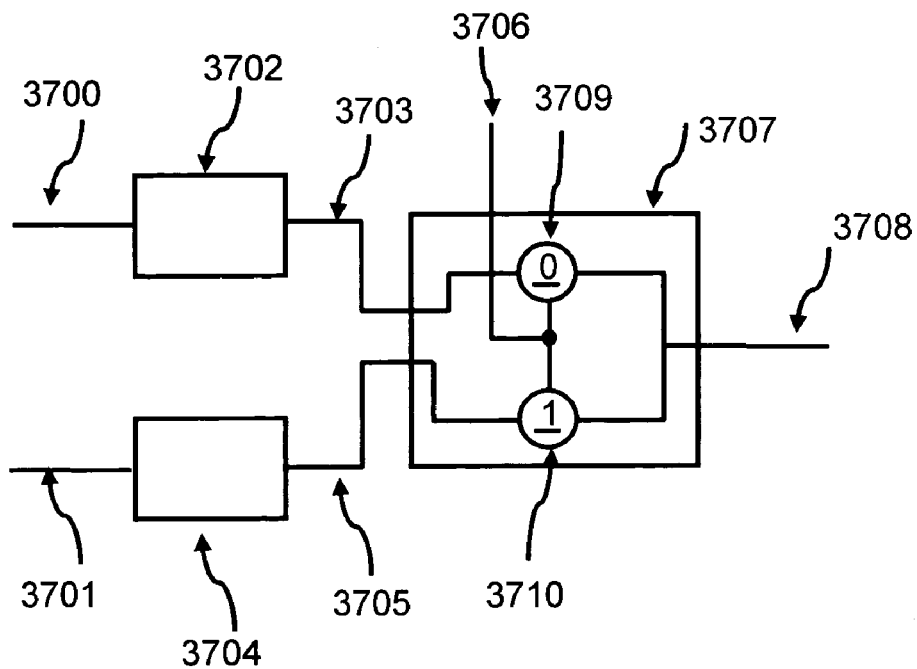
FIGS. 37a, 37b, 37c, 37d and 37e illustrate different embodiments of the circuits 109 and 114 of FIG. 1a in greater detail.

The purpose of the circuit 209 is to scramble user data. The purpose of circuit 214 is to scramble synchronization data in one aspect of this invention. The circuit may also generate a synchronization sequence. Another aspect of this invention is that the synchronization sequence in scrambled or unscrambled form is provided from another source (such as for instance 205). For this and following examples it is assumed that the sequence is provided externally from 209. The purpose of circuit 210 is to combine synchronization and user-data into one multi-valued data-stream. There are different configurations possible, which selection may depend on factors such as cost, expected statistical performance, and expected signal-to-noise performance. FIG. 37a shows one possible configuration of circuits 209, 214 and 210. User data in unscrambled form is inputted on 3700. The data is then scrambled by 3702 and outputted on 3703. The synchronization data is inputted on 3701, scrambled by scrambler 3704 and outputted on 3705. The synchronization data is a sequence that has characteristics identified earlier. The synchronization data can be generated with a circuit in circuit 214 or can be stored in the circuit 214. Both 3703 and 3705 are also inputs to circuit 3707 which will combine synchronization and user-data. Circuit 3707 has a control input 3706 that will be used to combine both data streams. One way to use the signal of 3706 is shown in FIG. 37a. The signal provided by 3706 can for example be 0 or 1. The input 3706 is the control input of individually enabled gates 3709 and 3710. Gate 3709 is conducting from input 3705 to output 3708 when the control signal is 0. Gate 3710 is conducting from input 3705 to output 3708 when the control signal, provided by 3706 is 1. The scramblers 3702 and 3704 should be different.

Figure 37B:
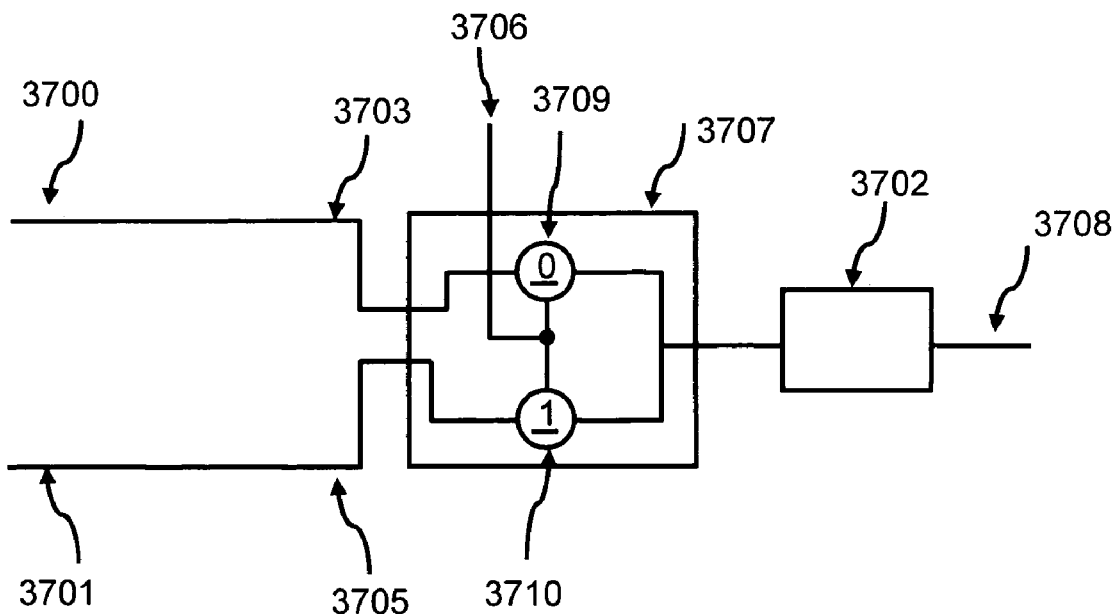

FIG. 37b shows another aspect of this invention in a different configuration of FIG. 37a wherein both user-data and synchronization data will be scrambled by the same scrambler. The meaning of the numerals in FIG. 37b is identical to those in FIG. 37a. The difference between the two diagrams is that scramblers 3702 and 3704 have been removed. One of the scramblers (3702) has now been placed in a new position, where it will scramble the combined data. One should be reasonably sure that the unscrambled synchronization sequence has a low probability of appearing as part of a data sequence.

Figure 37C:
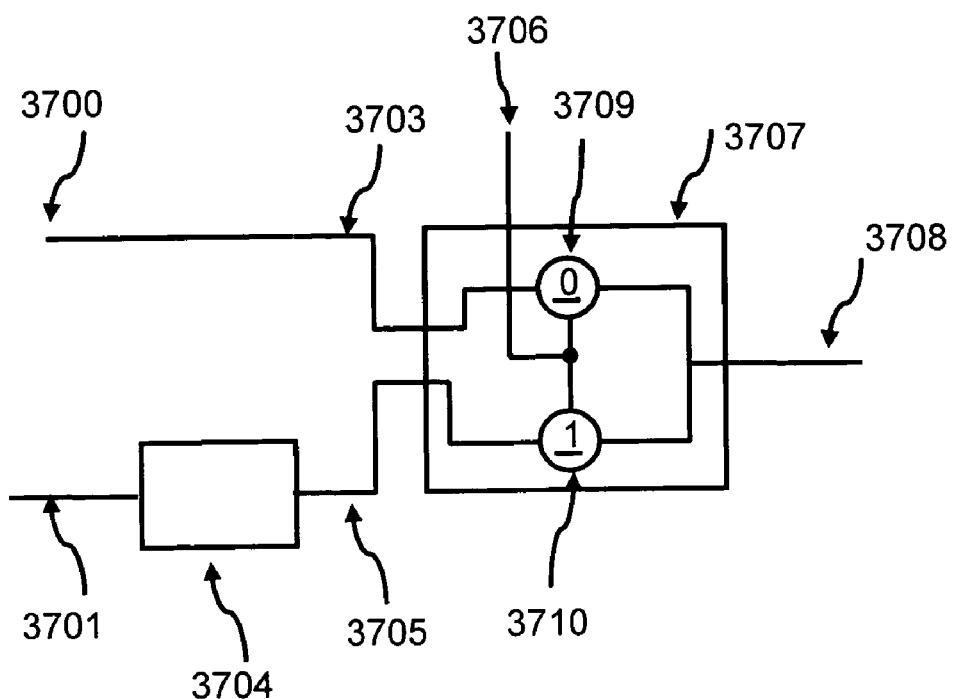

FIG. 37c shows another aspect of this invention in a different configuration of the circuit of FIG. 37a wherein the user data is not scrambled and the synchronization data is. This may be the case for instance when the point of synchronization is determined by a digital sum of for instance a series of all 1s. It is usually not desirable to have a sequence of identical symbols on the storage medium. FIG. 37c is almost identical to FIG. 37a with as a difference that scrambler 3702 has been removed. One reason for not using a scrambler for user data may be that additional coding (such as error-correcting-coding) will sufficiently break-up constant patterns and that additional security is not desired.

Figure 37D:
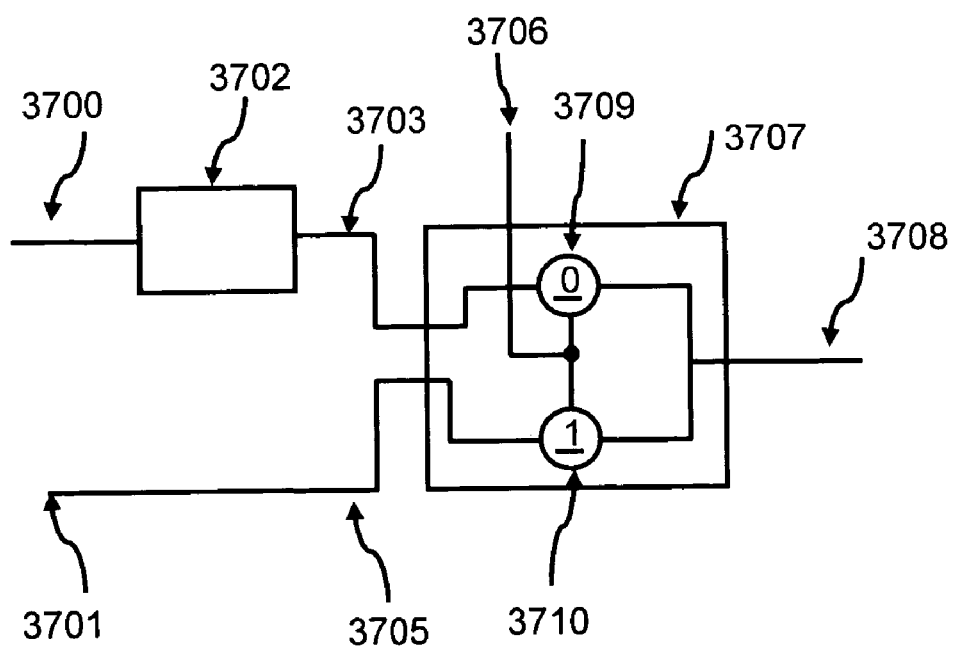

FIG. 37d shows another aspect of this invention in a different configuration of the circuit of FIG. 37a wherein the user data is scrambled and the synchronization data is not. FIG. 37d is almost identical to FIG. 37a with as a difference that scrambler 3704 has been removed. One reason for not using a scrambler for synchronization data is that the synchronization sequence is generated elsewhere (or read from memory) and has sufficient noise like properties. Further scrambling is not required.

Figure 37E:
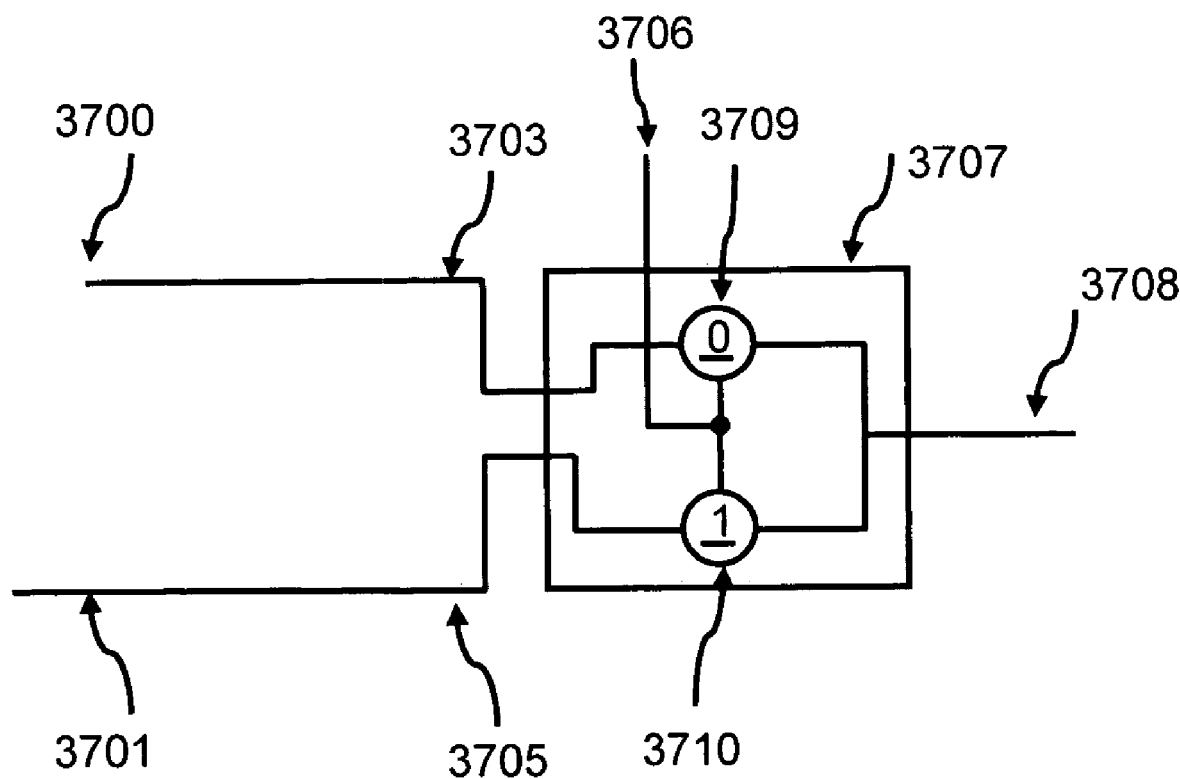

FIG. 37e shows another aspect of this invention in a different configuration of the circuit of FIG. 37a wherein the user data is not scrambled and the synchronization data is not scrambled, but the synchronization sequence inputted on 3701 is generated (including multi-valued Gold-like sequences) according to methods or apparatus invented and described in U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS and U.S. Provisional Patent Application No. 60/547,683, filed Feb. 25, 2004, entitled TERNARY AND MULTI-VALUE DIGITAL SCRAMBLERS, DESCRAMBLERS AND SEQUENCE GENERATORS and U.S. Provisional Patent Application No. 60/575,948, filed on Jun. 1, 2004, entitled MULTI-VALUE CODING OF SEQUENCES AND MULTI-VALUE MEMORY DEVICES. One example of a 4-value Gold-like sequence generator is provided in FIG. 31 of the cited Provisional Patent Application No. 60/575,948. The truth table of its applied 4-value logic function to combine two 4-valued sequences to create the Gold-like sequence is provided in FIG. 33. The correlation graph of the Gold-like 4-valued sequence is provided in FIG. 32 of the cited Provisional Patent Application No. 60/575,948, showing its usefulness as a synchronization sequence in multi-valued optical digital data storage disks.

One aspect of using synchronization sequences is to alert for instance the optical reading system that the next block or blocks of data are end-user data. This is graphically shown in FIG. 38a. A data track 3809 (which may contain multi-level data) read from left to right, comprises a non-synchronization data sequence 3810, followed by a synchronization sequence 3811, which is followed by end-user data 3812. It may be assumed that all data is scrambled, wherein the synchronization and end-user data apply different scrambling methods. It is understood that the data segments 3810, 3811 and 3812 are contiguous and can not physically be distinguished from each other. The drawn separation between the data segments is for illustrative purposes only. The data (possibly after signal processing and error-correcting-decoding) from the track is inputted on input 3801 of circuit 3800. It is assumed that at a certain moment, for instance after completion of reading and descrambling certain end-user data sectors, a signal is inputted on input 3808 of synchronization and descrambling unit 3803 to indicate that state of completion. As a consequence for instance a signal not equal to 1 will be outputted on output 3804. This signal is also inputted to end-user data descrambler 3806. The signal on output 3804 may also be used for a (not-shown) control unit as an alert when synchronization is achieved. An end-user descrambler 3806 may initialize after the signal on 3804 has become 1.

At the time synchronization unit 3803 has recognized synchronization sequence 3811 (using any of the previously discussed correlation or digital sum synchronization methods) unit 3803 may output a signal 1 on output 3804, alerting the system that data now outputted on output 3805 is a sequence 3812 containing valid end-user data and alerting end-user data descrambler 3806 to initialize. At the end of the data sequence a unique pattern may be used to indicate the end of valid end-user data and a relevant signal is outputted to 3808 starting a new synchronization cycle.

Figure 38A:
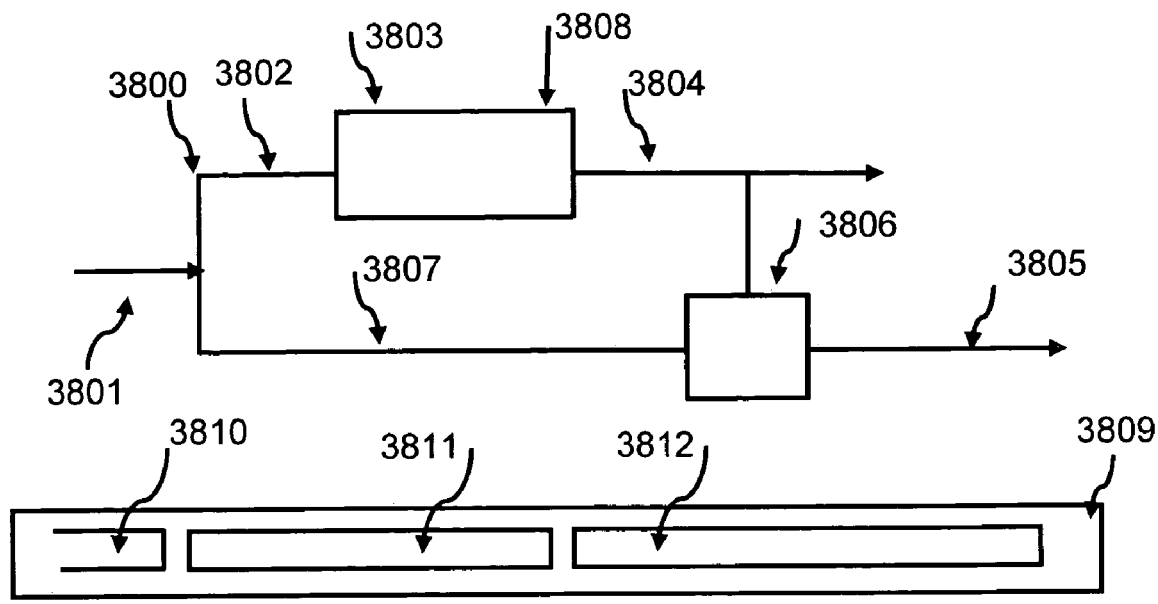
FIGS. 38a, 38b, 38c, 38d and 38e illustrate different embodiments of the circuits 209 and 214 of FIG. 1b in greater detail.

The diagram of FIG. 38a shows one realization of the circuits 109, 114 and 110 of FIG. 1a. The caption of circuit 110 in FIG. 1a says 'data separation'. While non-user data may actually be stopped from being outputted on 111, it may also be that a separate signal (like a signal outputted on 3804 in FIG. 38a) indicates that data may be ignored, because it is not recognized as user-data. The configuration as shown in FIG. 38a is the reading counterpart of the writing circuit as shown in FIG. 37a. In this configuration both synchronization data and end-user data are scrambled and need to be descrambled.

Figure 38B:
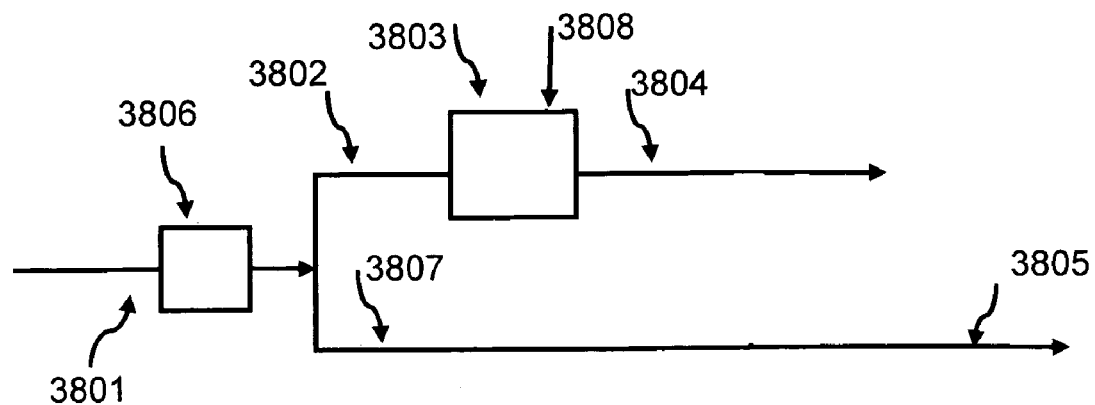

The configuration as shown in FIG. 38b is the reading counterpart of the writing circuit as shown in FIG. 37b. In this configuration both synchronization data and end-user data are scrambled and need to be descrambled. This is done by descrambler 3806. The descrambled signal is outputted on 3802 leading to synchronization unit 3803 (which in this configuration does not include a descrambler) and to end-user data output 3805. When the synchronization sequence is detected by 3803 a 'detection achieved' signal is outputted on 3804, informing additional circuitry (not shown) that data outputted on 3805 should be considered to be valid end-user data.

Figure 38C:
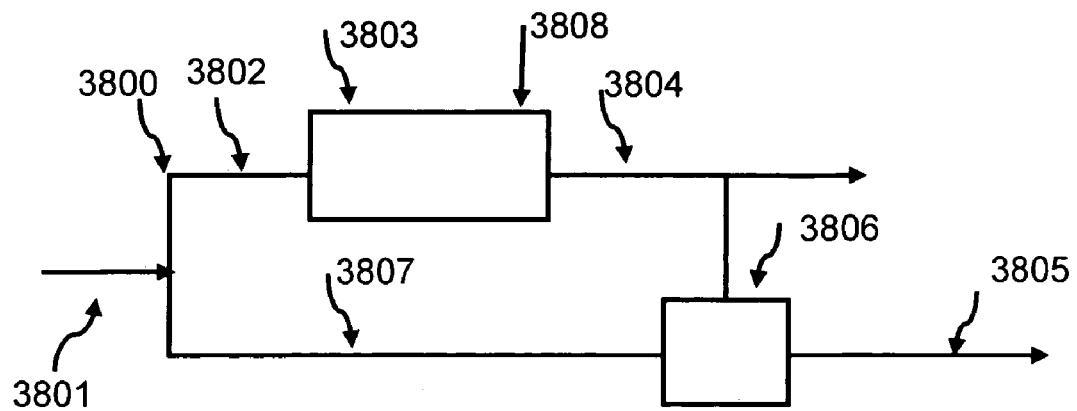

The configuration as shown in FIG. 38c is the reading counterpart of the writing circuit as shown in FIG. 37c. In this configuration the synchronization data are not scrambled (and require no descrambling) and end-user data are scrambled and need to be descrambled. FIGS. 38a and 38c are exactly the same with the same numerals. The difference is that in FIG. 38c the circuit 3803 will only perform synchronization detection by way of correlation, but will not require a separate descrambler to generate the appropriate synchronization sequence. However the applied synchronization sequences may be generated by sequence generators as one aspect of this invention. The output on 3804 may be used to initialize the descrambler 3806 and to inform other (not shown circuitry) that the signal outputted on 3805 is valid end-user data.

Figure 38D:
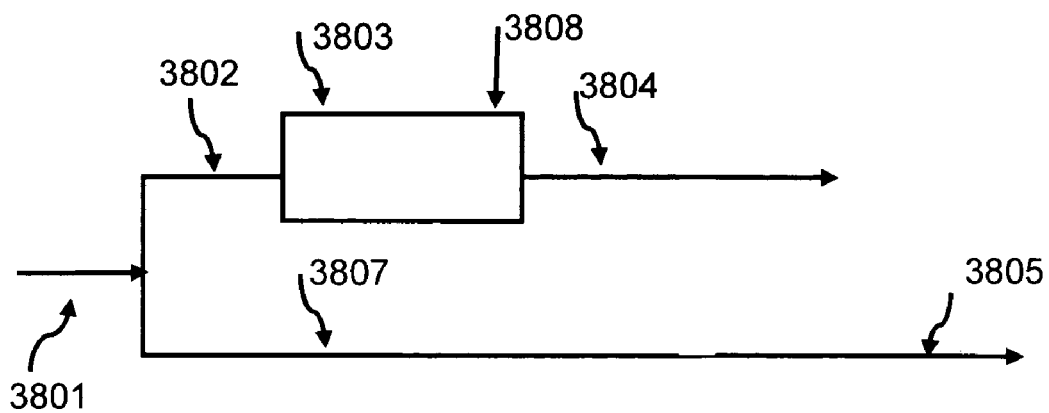

The configuration as shown in FIG. 38d is the reading counterpart of the writing circuit as shown in FIG. 37d. In this configuration the synchronization data are scrambled and require descrambling and end-user data are not scrambled and require no descrambling. FIG. 38d differs from FIG. 38a in such a way that descrambler 3806 has been removed. The synchronization circuit 3803 now also contains a descrambler. The output 3804 of circuit 3803 in FIG. 38d will provide a signal that indicates to other (not shown) circuitry that the signal outputted on 3805 is valid end-user data.

Figure 38E:
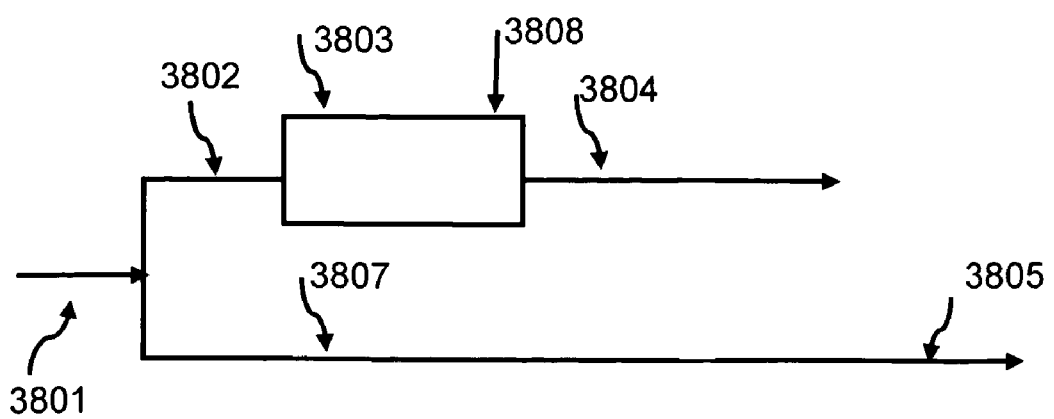
Figure 39:
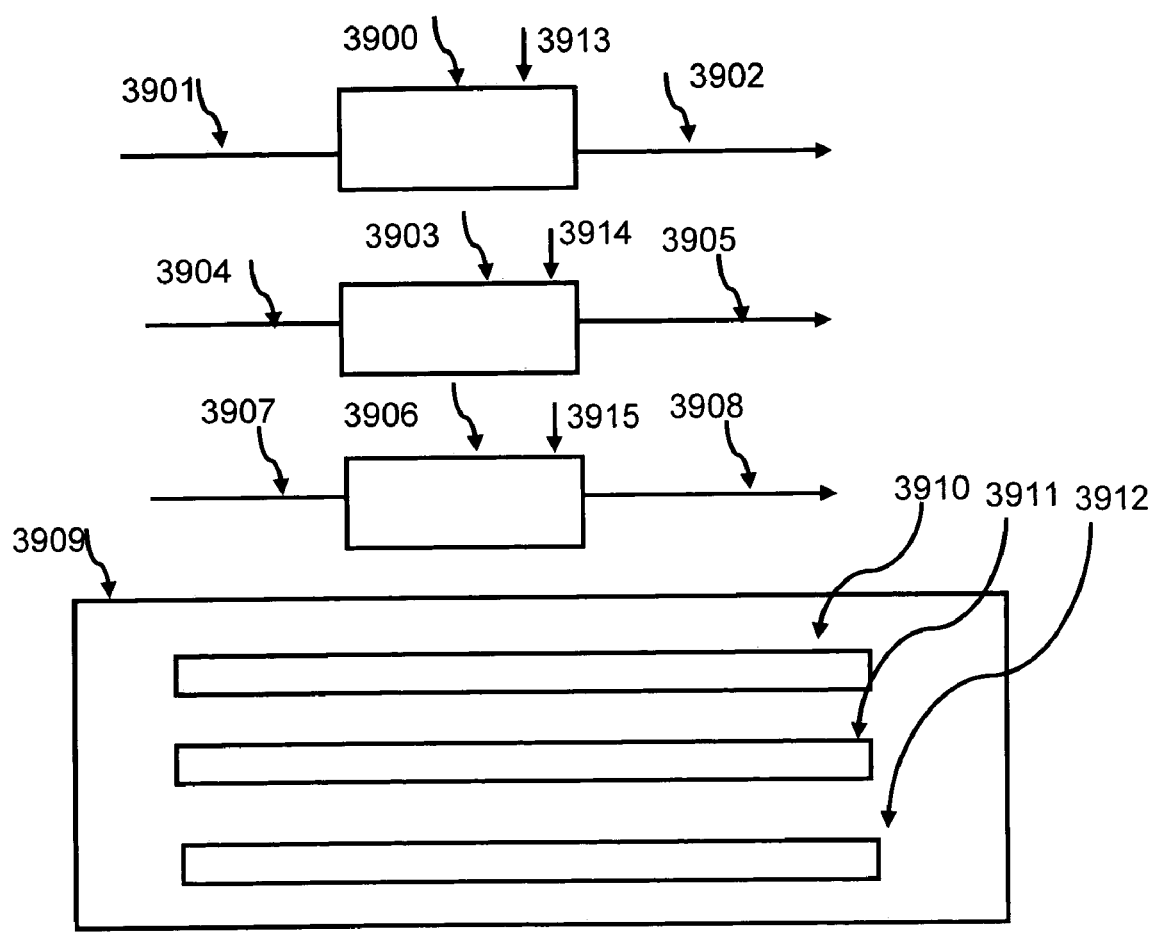
FIG. 39 illustrates the use of multiple tracks in accordance with another aspect of the present invention.

The configuration as shown in FIG. 38e is the reading counterpart of the writing circuit as shown in FIG. 37e. In this configuration the synchronization data are not scrambled (and require no descrambling) and end-user data are not scrambled and require no descrambling. FIGS. 38e and 38d are exactly the same with the same numerals. The difference is that in FIG. 38e the circuit 3803 will only perform synchronization detection for instance by way of correlation, but will not require a separate descrambler to generate the appropriate synchronization sequence. This configuration covers as one aspect of the invention the use of correlation by applying sequences generated by methods or apparatus as for instance described in U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS and U.S. Provisional Patent Application No. 60/547,683, filed Feb. 25, 2004, entitled TERNARY AND MULTI-VALUE DIGITAL SCRAMBLERS, DESCRAMBLERS AND SEQUENCE GENERATORS; and U.S. Provisional Patent Application No. 60/575,948, filed on Jun. 1, 2004, entitled MULTI-VALUE CODING OF SEQUENCES AND MULTI-VALUE MEMORY DEVICES. The output signal on 3804 may be used to inform other (not shown circuitry) that the signal outputted on 3805 is valid end-user data.

A novel method is to use multiple data tracks on an optical disk. This may require multiple pick-ups or other mechanisms to read several optical tracks at the same time. It also may require a fixed position between the reading mechanisms of each track in order to establish an absolute relation or position to each other. This can currently be achieved at relatively low reading speeds. Assume an optical data disk 3909 of which are shown 3 parallel tracks 3910, 3911 and 3912. Assume track 3910 to contain one or a plurality of serial synchronization data sequences. Track 3911 and track 3912 contain scrambled end-user data. Circuit 3900 is a synchronization unit with an input 3901 which will provide the read data from the synchronization track 3910. Input 3913 provides a signal that indicates a request for synchronization. Output 3902 will provide a signal (for example equal to 1) on input 3914 of end-user descrambler 3903 and on input 3915 of end-user descrambler 3906 indicating when synchronization is achieved and that the end user descramblers should be initialized. The data read from track 3911 is inputted on input 3904 and the data read from track 3912 is inputted on input 3907. When the signal on output 3902 of synchronization circuit 3900 is 1 the data on outputs 3905 and 3908 are valid end-user data. At the end of an end-user data track a unique sequence may reset the signal at input 3913 and thus starting a new synchronization cycle.

It should be clear that the synchronization methods can also be used to identify, search for and find certain (address based) data segments. The use of multi-track optical data storage allows for a higher data throughput at the same disk rotation speed as a single track system or a lower speed of rotation with the same data throughput as a single track system.

The following patent applications, including the specifications, claims and drawings, are hereby incorporated by reference herein, as if they were fully set forth herein: (1) U.S. Provisional Patent Application No. 60/575,948, filed on Jun. 1, 2004, entitled MULTI-VALUE CODING OF SEQUENCES AND MULTI-VALUE MEMORY DEVICES; (2) U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS; (3) U.S. Provisional Patent Application No. 60/547,683, filed Feb. 25, 2004, entitled TERNARY AND MULTI-VALUE DIGITAL SCRAMBLERS, DESCRAMBLERS AND SEQUENCE GENERATORS; (4) U.S. Non-Provisional patent application Ser. No. 10/936,181, filed Sep. 8, 2004, entitled TERNARY AND HIGHER MULTI-VALUE SCRAMBLERS/DESCRAMBLERS; (5) U.S. Non-Provisional patent application Ser. No. 10/912,954, filed Aug. 6, 2004, entitled TERNARY AND HIGHER MULTI-VALUE SCRAMBLERS/DESCRAMBLERS; (6) U.S. Provisional Patent Application No. 60/501,335, filed Sep. 9, 2003, entitled TERNARY (3-VALUE) AND HIGHER VALUE DIGITAL SCRAMBLERS/DESCRAMBLERS IN DIGITAL COMMUNICATIONS; (7) U.S. patent application Ser. No. 11/000,218, filed Nov. 30, 2004, entitled SINGLE AND COMPOSITE BINARY AND MULTI-VALUED LOGIC FUNCTIONS FROM GATES AND INVERTERS; (8) U.S. Provisional Patent Application No. 60/599,781, filed Aug. 7, 2004, entitled MULTI-VALUED DIGITAL INFORMATION RETAINING ELEMENTS AND MEMORY DEVICES; and (9) U.S. patent application Ser. No. 11/018, 956, filed Dec. 20, 2004, entitled MULTI-VALUE DIGITAL CALCULATING CIRCUITS, INCLUDING MULTIPLIERS.

What is claimed is:

1. A method of storing p n-valued symbols on an optical disk with $p \geq 1$, comprising:
   scrambling the p n-valued symbols, each of the p n-valued symbols having one of n states with n>2, with an n-valued scrambler implementing at least one reversible n-valued logic function by a device that processes an n-valued signal into p scrambled n-valued symbols of which each n-valued symbol has one of n states; and
   writing the p scrambled n-valued symbols on the optical disk, wherein each scrambled n-valued symbol is written on the optical disk as a mark that can assume one of n states and that will generate a non-binary signal when being read.

2. The method as claimed in claim 1, further comprising: encoding the p scrambled n-valued symbols with an error correction code.

3. The method as claimed in claim 1, wherein the scrambling is performed by an n-valued LFSR scrambler.

4. The method as claimed in claim 3, wherein the n-valued LFSR scrambler does not use a multiplier.

5. The method as claimed in claim 1, wherein the scrambling is performed by an n-valued non-LFSR scrambler.

6. The method as claimed in claim 1, further comprising: reading the p scrambled n-valued symbols from the optical disk; and descrambling the p scrambled n-valued symbols.

7. The method as claimed in claim 6, further comprising: processing the p scrambled n-valued symbols read from the optical disk to correct possible errors in the n-valued data.

8. The method as claimed in claim 6, wherein the descrambling is performed by an n-valued LFSR descrambler.

9. The method as claimed in claim 6, wherein the descrambling is performed by an n-valued non-LFSR descrambler.

10. A method of reading p scrambled n-valued-symbols with n>2 and p>1 from an optical disk, comprising:
    reading the p scrambled n-valued symbols from the optical disk, each of the p scrambled n-valued symbols having one of 3 or more states, each read scrambled n-valued symbol generating a non-binary signal; and
    descrambling the p scrambled n-valued symbols with an n-valued descrambler implementing a reversible n-valued logic function by a device that processes an n-valued signal.

11. The method as claimed in claim 10, further comprising: processing the p scrambled n-valued symbols read from the optical disk to correct possible errors in the p scrambled n-valued symbols.

12. The method as claimed in claim 10, wherein the descrambling is performed by an n-valued LFSR descrambler.

13. The method as claimed in claim 12, wherein the n-valued LFSR descrambler does not use a multiplier.

14. A method of storing and retrieving p n-valued symbols with n>2 and p>1, comprising:
    scrambling the p n-valued symbols into p scrambled n-valued symbols with a scrambler implementing a reversible n-valued logic function, each n-valued symbol having one of 3 or more states; and
    storing the p scrambled n-valued symbols on a data storage medium, which is an electronic medium, wherein reading a stored n-valued symbol from the data storage medium generates a non-binary signal.

15. The method as claimed in claim 14, wherein the p n-valued symbols are scrambled by using an n-valued Linear Feedback Shift Register.

16. An apparatus for retrieving p scrambled n-state symbols with $p \geq 1$ and n>2, comprising:
    a storage medium storing the p scrambled n-state symbols, wherein reading an n-state symbol from the storage medium generates a non-binary signal; and
    an n-state descrambler enabled to process p n-state symbols into p descrambled n-state symbols, the n-state descrambler implementing at least one reversible n-state logic function by a device that processes a non-binary signal.

17. The apparatus as claimed in claim 16 wherein the storage medium is an optical medium.

18. The apparatus as claimed in claim 16, wherein the storage medium is a magnetic medium.

19. The apparatus as claimed in claim 16, wherein the storage medium is comprised of an electronic storage medium.

20. The method as claimed in claim 1, further comprising: storing on the optical disk a plurality of symbols to create a descrambler that includes an n-valued logic function.

21. The method as claimed in claim 10, further comprising: reading from the optical disk a plurality of symbols to create the n-valued descrambler.

22. The method as claimed in claim 14, further comprising: storing on the optical disk a plurality of symbols to create a descrambler that includes an n-valued logic function.

23. The apparatus as claimed in claim 19, wherein the storage medium stores a plurality of symbols to create the n-state descrambler.

* * * * *